(12) United States Patent
Cho

(10) Patent No.: US 11,068,079 B2
(45) Date of Patent: *Jul. 20, 2021

(54) ELECTRONIC DEVICE HAVING MULTI-FUNCTIONAL HUMAN INTERFACE

(71) Applicant: INNOPRESSO, INC., Seongnam-si (KR)

(72) Inventor: Eunhyung Cho, Yongin-si (KR)

(73) Assignee: INNOPRESSO, INC., Seongnam-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/859,861

(22) Filed: Apr. 27, 2020

(65) Prior Publication Data

US 2020/0257382 A1    Aug. 13, 2020

Related U.S. Application Data

(63) Continuation of application No. 15/735,552, filed as application No. PCT/KR2017/009626 on Sep. 1, 2017, now Pat. No. 10,635,192.

(30) Foreign Application Priority Data

Oct. 25, 2016  (KR) .................. 10-2016-0139196

(51) Int. Cl.
    *G06F 3/033*    (2013.01)
    *G09G 5/08*    (2006.01)
    (Continued)

(52) U.S. Cl.
    CPC .............. *G06F 3/0354* (2013.01); *G06F 3/02* (2013.01); *G06F 3/038* (2013.01)

(58) Field of Classification Search
CPC ...... G06F 1/1616; G06F 1/162; G06F 1/1632; G06F 1/1649; G06F 1/1652;
(Continued)

(56) References Cited

U.S. PATENT DOCUMENTS 4,246,452 A   1/1981   Chandler
7,433,179 B2   10/2008   Hisano et al.
(Continued)

FOREIGN PATENT DOCUMENTS

CN       102339133 A     2/2012
CN       102364654 A     2/2012
(Continued)

OTHER PUBLICATIONS

International Search Report issued in corresponding PCT application No. PCT/KR2015/003913, dated Sep. 17, 2015.
(Continued)

*Primary Examiner* — Insa Sadio
(74) *Attorney, Agent, or Firm* — Maschoff Brennan

(57) ABSTRACT

A multi-functional human interface device includes a control unit and a first multi-functional input button. The first multi-functional input button includes a cover unit configured to receive a touch input of a user's finger, an electrode unit including a transmitter and a receiver to form an electric field, an elastic unit configured to move from a first height to a second height when a first pressure is applied from the cover unit and configured to move back to the first height when the first pressure from the cover unit is released, and a switch unit configured to generate an electric signal representing an input of a predetermined letter.

26 Claims, 73 Drawing Sheets

(51) Int. Cl.
    *G06F 3/0354* (2013.01)
    *G06F 3/02* (2006.01)
    *G06F 3/038* (2013.01)

(58) Field of Classification Search
    CPC ...... G06F 1/1656; G06F 1/166; G06F 1/1686;
        G06F 1/169; G09F 9/301; Y10S 345/905;
        H04M 1/23; H04M 1/7258; H04M
        2250/56
    See application file for complete search history.

(56) References Cited

U.S. PATENT DOCUMENTS

| | | | |
|---|---|---|---|
| 7,817,143 | B2 | 10/2010 | Soh et al. |
| 9,285,902 | B1 | 3/2016 | Kremin et al. |
| 10,001,904 | B1 | 6/2018 | Geller et al. |
| 2003/0042123 | A1 | 3/2003 | Chun |
| 2003/0080944 | A1 | 5/2003 | Takahashi et al. |
| 2003/0212559 | A1 | 11/2003 | Xie |
| 2005/0000789 | A1 | 1/2005 | Yoneyama |
| 2005/0150393 | A1 | 7/2005 | Biderman et al. |
| 2006/0034042 | A1 | 2/2006 | Hisano et al. |
| 2007/0091070 | A1 | 4/2007 | Larsen et al. |
| 2007/0100787 | A1 | 5/2007 | Lim et al. |
| 2007/0129046 | A1 | 6/2007 | Soh et al. |
| 2007/0200823 | A1 | 8/2007 | Bytheway et al. |
| 2008/0028309 | A1 | 1/2008 | Wakuda et al. |
| 2009/0322683 | A1 | 12/2009 | Tsuji et al. |
| 2010/0149099 | A1 | 6/2010 | Elias |
| 2010/0149127 | A1 | 6/2010 | Fisher et al. |
| 2010/0200309 | A1 | 8/2010 | Yilmaz et al. |
| 2010/0231553 | A1 | 9/2010 | Yabuuchi et al. |
| 2010/0265173 | A1 | 10/2010 | Matsunaga |
| 2011/0122092 | A1* | 5/2011 | Lu .................. G06F 3/03545 345/175 |
| 2011/0205178 | A1* | 8/2011 | Yoshida ............ G06F 1/1692 345/173 |
| 2012/0019455 | A1 | 1/2012 | Jin et al. |
| 2012/0182215 | A1 | 7/2012 | Han et al. |
| 2012/0295236 | A1 | 11/2012 | Miller |
| 2013/0076542 | A1 | 3/2013 | Tanaka et al. |
| 2013/0120306 | A1 | 5/2013 | Furukawa |
| 2013/0147795 | A1 | 6/2013 | Kim et al. |
| 2013/0194230 | A1 | 8/2013 | Kawaguchi et al. |
| 2013/0321175 | A1 | 12/2013 | Kondo |
| 2013/0321275 | A1 | 12/2013 | Chou |
| 2014/0047309 | A1 | 2/2014 | Kim et al. |
| 2014/0081659 | A1 | 3/2014 | Nawana et al. |
| 2014/0104186 | A1 | 4/2014 | Bakken et al. |
| 2014/0191996 | A1 | 7/2014 | Hwang et al. |
| 2014/0215386 | A1 | 7/2014 | Song et al. |
| 2015/0160785 | A1 | 6/2015 | Wang et al. |
| 2015/0227213 | A1 | 8/2015 | Cho |
| 2016/0103830 | A1 | 4/2016 | Cheong et al. |
| 2016/0239146 | A1 | 8/2016 | Hu |
| 2017/0235408 | A1 | 8/2017 | Yang et al. |
| 2017/0242502 | A1 | 8/2017 | Gray et al. |
| 2017/0322663 | A1 | 11/2017 | Lee et al. |
| 2018/0232061 | A1 | 8/2018 | Cho |
| 2019/0056816 | A1 | 2/2019 | Hsu |
| 2019/0129512 | A1 | 5/2019 | Cho |
| 2019/0129513 | A1 | 5/2019 | Cho |
| 2019/0146595 | A1 | 5/2019 | Cho |
| 2019/0302889 | A1 | 10/2019 | Salada |
| 2019/0311172 | A1 | 10/2019 | Kang et al. |

FOREIGN PATENT DOCUMENTS

| | | | |
|---|---|---|---|
| CN | 102609100 | A | 7/2012 |
| CN | 202600625 | U | 12/2012 |
| CN | 103218047 | A | 7/2013 |
| CN | 103324326 | A | 9/2013 |
| CN | 103365451 | A | 10/2013 |
| JP | 2003-122384 | A | 4/2003 |
| JP | 2006-053678 | A | 2/2006 |
| JP | 2008-046951 | A | 2/2008 |
| JP | 2008-134620 | A | 6/2008 |
| JP | 2013-175149 | A | 9/2013 |
| JP | 2015-219663 | A | 12/2015 |
| KR | 2003-0019813 | A | 3/2003 |
| KR | 2003-0030328 | A | 4/2003 |
| KR | 2004-0104721 | A | 12/2004 |
| KR | 2007-0026384 | A | 3/2007 |
| KR | 10-2007-0047064 | A | 5/2007 |
| KR | 10-2009-0114509 | A | 11/2009 |
| KR | 2010-0002021 | A | 1/2010 |
| KR | 10-2011-0032649 | A | 3/2011 |
| KR | 2011-0023654 | A | 3/2011 |
| KR | 10-1042285 | B1 | 6/2011 |
| KR | 10-2013-0041983 | A | 4/2013 |
| KR | 2013-0037420 | A | 4/2013 |
| KR | 10-2013-053377 | A | 5/2013 |
| KR | 2014-0021197 | A | 2/2014 |
| KR | 10-2014-0075651 | A | 6/2014 |
| KR | 10-2014-0089660 | A | 7/2014 |
| KR | 2014-0098905 | A | 8/2014 |
| KR | 2014-0141408 | A | 12/2014 |
| KR | 10-2015-0032950 | A | 4/2015 |
| KR | 10-2015-0050546 | A | 5/2015 |
| KR | 10-2018-0055782 | A | 5/2018 |
| WO | 2014/193161 | A1 | 12/2014 |
| WO | 2015/160231 | A1 | 10/2015 |

OTHER PUBLICATIONS

Korean Office Action issued in corresponding application No. 10-2014-0047073, dated Nov. 19, 2015.
International Search Report issued in corresponding PCT application No. PCT/KR2015/013773, dated Jun. 29, 2016.
Korean Office Action issued in corresponding application No. 10-2011-0077540, dated Aug. 22, 2016.
Korean Office Action issued in corresponding application No. 10-2017-0015869, dated Apr. 19, 2017.
Korean Office Action issued in corresponding application No. 10-2017-0080030, dated Sep. 22, 2017.
International Search Report issued in corresponding PCT application No. PCT/KR2015/013773, dated Nov. 2, 2017.
International Search Report issued in corresponding PCT application No. PCT/KR2017/009626, dated Dec. 4, 2017.
Korean Notice of Allowance issued in corresponding application No. 10-2017-0080030, dated Feb. 12, 2018.
Chinese Office Action issued in corresponding application No. 2015800018417, dated Feb. 27, 2018.
Korean Office Action issued in corresponding application No. 10-2018-0074337, dated Nov. 4, 2018.
Korean Office Action issued in corresponding application No. 10-2018-0055098, dated Nov. 19, 2018.
Korean Office Action issued in corresponding application No. 10-2018-0055099, dated Nov. 19, 2018.
Korean Notice of Allowance issued in corresponding application No. 10-2018-0055101, dated Nov. 22, 2018.
Notice of Allowance issued in corresponding U.S. Appl. No. 16/128,256, dated Dec. 18, 2018.
Notice of Allowance issued in corresponding U.S. Appl. No. 15/364,252, dated Jan. 29, 2019.
Office Action issued in corresponding U.S. Appl. No. 15/574,156, dated Mar. 21, 2019.
Korean Notice of Allowance issued in corresponding application No. 10-2017-0112162, dated May 21, 2019.
KR Office Action dated Sep. 22, 2017 in application No. 10-2017-0080030.
International Search Report dated Nov. 2, 2017 in application No. PCT/KR2017/006674.
KR Notice of Allowance in application No. 10-2018-0055101 dated Nov. 22, 2018.
JP Notice of Reasons for Refusal in Application No. 2019-520349 dated Feb. 13, 2020.

(56) References Cited

OTHER PUBLICATIONS

KR Office Action in Application No. 10-2018-0120774 dated Feb. 26, 2020.
International Search Report dated Dec. 4, 2017 in application No. PCT/KR2017/009626.
Written Opinion dated Dec. 4, 2017 in application No. PCT/KR2017/009626.
CN Office Action in Application No. 201780001614.3 dated Apr. 24, 2020.

* cited by examiner

ELECTRONIC DEVICE HAVING MULTI-FUNCTIONAL HUMAN INTERFACE

TECHNICAL FIELD

The present inventive concept relates to a human interface: for receiving, from a user, an input of text information or pointing location information at a digital device capable of receiving the text information or pointing location information, such as a computer, a notebook, a tablet PC, and a portable phone; and transmitting the received information to the digital device.

BACKGROUND ART

Text input devices such as a keyboard have been proposed for inputting text to a personal computer or a portable digital device. Furthermore, pointing devices such a mouse have been proposed for controlling a pointing location of a pointer and for performing a function for controlling the digital device.

DISCLOSURE

Technical Problem

Conventional text input devices and pointing devices may be provided separately, or pointing input regions of the pointing devices may be provided in a location separated from text input regions of the text input devices. This may cause users hand to move too frequently under the working environment in which a text input operation, a pointing location input operation, and a pointer execution instruction input operation are frequently switched, thereby degrading work efficiency.

Another object of the present invention is to provide a pointing-device-integrated text input device capable of operating in a keyboard mode for receiving a keyboard input, a mouse mode, and a digitizer mode and capable of freely performing mode switching, and a control method thereof.

Still another object of the present invention is to provide a pointing-device-integrated text input device capable of easily adjusting an adjustment target attribute having an adjustable attribute value such as audio volume, and a control method thereof.

Still another object of the present invention is to provide a pointing-device-integrated text input device capable of processing a touch input and a hovering input and capable of selecting a touch target device through the hovering input in a multi-device environment.

Technical problems intended to be solved by the invention are not limited to the aforementioned objects, and other technical objects that are not described herein will be clearly understood by those skilled in the art from the following description and the accompanying drawings.

Technical Solution

An embodiment of the present inventive concept provides a human interface in which a pointing location information input region of a pointing device is provided on a text input region of a text input device, and a switching unit for switching between a text input mode and a pointing location information input mode is provided, thus enabling a pointing input operation to be performed with minimized movement of users hand through simple switching of an input mode during a text input operation, thereby improving work efficiency.

According to an aspect of the present invention, there may be provided an electronic device having a multi-functional human interface with a keyboard layout, the electronic device comprising: a plurality of buttons arranged according to the keyboard layout and each having a keycap configured to receive a vertical push input from a user; a button body combined with a lower portion of the keycap and configured to be moved upward or downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, wherein the controller operates in a keyboard mode in which the touch input is ignored and only a keyboard input reflecting a key value corresponding to the push input is output, a mouse mode in which a push input relative to at least some of the plurality of buttons is ignored and a mouse input indicating a movement distance and a movement direction of a pointer is output by means of a variation of the touch coordinate value, or a digitizer mode in which a push input relative to at least some of the plurality of buttons is output and a digitizer input indicating a position of the pointer is output by means of the touch coordinate value.

According to another aspect of the present invention, there may be provided an electronic device having a multi-functional human interface with a keyboard layout, the electronic device comprising: a plurality of buttons arranged according to the keyboard layout and each having a keycap configured to receive a vertical push input from a user; a button body combined with a lower portion of the keycap and configured to be moved upward or downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, wherein the controller operates in a keyboard mode in which the touch input is output and only a keyboard input reflecting a key value corresponding to the push input is output, and a touch mode in which a push input relative to at least some of the plurality of buttons is ignored and a pointer control signal reflecting the touch coordinate value is output, and wherein the controller calculates a touch coordinate value corresponding to the touch input on the basis of the scan signal when operating in the touch mode, acquires a relative coordinate value from the touch coordinate value when the touch mode is a mouse mode, and acquires an absolute coordinate value from the touch coordinate value when the touch mode is a digitizer mode.

According to still another aspect of the present invention, there may be provided a control method of an electronic device having a multi-functional human interface with a keyboard layout, wherein the electronic device includes: a plurality of buttons arranged according to the keyboard layout and each having a keycap configured to receive a vertical push input from a user; a button body combined with a lower portion of the keycap and configured to be moved upward or downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, the control method comprising: entering a keyboard mode; ignoring a touch input and outputting only a keyboard input reflecting a key value corresponding to a push input when operating in the keyboard mode; entering a mouse mode; ignoring a push input relative to at least some of the plurality of buttons and outputting a mouse input indicating a movement distance and a movement direction of a pointer by means of a variation of a touch coordinate value when operating in the mouse mode; entering a digitizer mode; and ignoring a push input relative to at least some of the plurality of buttons and outputting a digitizer input indicating a position of a pointer by means of the touch coordinate value.

According to yet another aspect of the present invention, there may be provided a control method of an electronic device having a multi-functional human interface with a keyboard layout, wherein the electronic device includes: a plurality of buttons arranged according to the keyboard layout and each having a keycap configured to receive a vertical push input from a user; a button body combined with a lower portion of the keycap and configured to be moved upward or downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, the control method comprising: entering any one of a keyboard mode in which a touch input is ignored and only a keyboard input reflecting a key value corresponding to a push input is output, and a touch mode in which a push input relative to at least some of the plurality of buttons is ignored and a pointer control signal reflecting a touch coordinate value is output; calculating a touch coordinate value corresponding to a touch input on the basis of a scan signal when operating in the touch mode; acquiring a relative coordinate value from the touch coordinate value when the touch mode is a mouse mode; acquiring an absolute coordinate value from the touch coordinate value when the touch mode is a digitizer mode; and outputting a pointer position control signal on the basis of any one of the relative coordinate value and the absolute coordinate value.

According to yet another aspect of the present invention, there may be provided an electronic device having a multi-functional human interface with a keyboard layout, the electronic device including a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, wherein the controller may operate in any one of the keyboard mode in which a touch input is ignored and only a keyboard input reflecting a key value corresponding to a push input is output, and a touch mode in which a first touch signal for controlling a position of a pointer is output according to a touch coordinate value, and may output a second touch signal indicating that an attribute value of an adjustment target attribute is adjusted when a key input relative to a button having a key value to which the adjustment target attribute is allocated is acquired while operating in the touch mode.

According to yet another aspect of the present invention, there may be provided an electronic device having a multi-functional human interface with a keyboard layout, the electronic device including a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, wherein the controller may determine the keyboard mode or the touch mode when a key input is acquired, output a character value corresponding to the key input when the keyboard mode is determined, and operate in an attribute adjustment mode in which the touch input is used to adjust a specific attribute value when the touch mode is determined.

According to yet another aspect of the present invention, there may be provided a control method of an electronic device having a multi-functional human interface with a keyboard layout, wherein the electronic device includes a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, the control method including entering the keyboard mode; ignoring the touch input, and outputting only a keyboard input reflecting a key value corresponding to the push input when operating in the keyboard mode; entering the touch mode; outputting a first touch signal for controlling a position of a pointer according to the touch coordinate value when operating in the touch mode; receiving a key input relative to a button having a key value to which a target control attribute is allocated while operating in the touch mode; and outputting a second touch signal for instructing that an attribute value of the adjustment target attribute be adjusted according to the touch coordinate value.

According to yet another aspect of the present invention, there may be provided a control method of an electronic device having a multi-functional human interface with a keyboard layout includes a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; and an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons, the control method comprising: determining the keyboard mode or the touch mode when a key input is acquired, outputting a character value corresponding to the key input when the keyboard mode is determined, and operating in the attribute adjustment mode in which the touch input is used to adjust a specific attribute value when the touch mode is determined.

According to yet another aspect of the present invention, there may be provided an electronic device that has a multi-functional human interface with a keyboard layout and is used as an input interface for a plurality of output devices in a multi-device environment, the electronic device including a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a gesture input including a touch operation or a hovering operation from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the gesture input in the capacitance induced in the electrode by the drive signal, in order to electrically connect the electrode among the buttons; and a controller configured to acquire a key value allocated to a button corresponding to a switch that acquires the key input, determine that the gesture input is a touch input when the amount of change in the capacitance is greater than a touch threshold, calculate a touch coordinate value from the change in the capacitance caused by the touch input, output a first signal indicating that a pointer moved on a control target screen, which is one of the plurality of output devices, on the basis of the calculated touch coordinate value, determine that the gesture input is a hovering input when the amount of change in capacitance is less than the touch threshold and greater than a hovering threshold, calculate a hovering coordinate value from the change in the capacitance according to the hovering input, and output a second signal indicating that a virtual point moved in a virtual space, an actual space, or an augmented space on the basis of the calculated hovering coordinate value.

According to yet another aspect of the present invention, there may be provided a control method of an electronic device that has a multi-functional human interface with a keyboard layout and is used as an input interface for a plurality of output devices in a multi-device environment, wherein the electronic device includes a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; and an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by a gesture input in the capacitance induced in the electrode by the drive signal, in order to electrically connect the electrode among the buttons, the control method comprising: acquiring a key value allocated to a button corresponding to a switch that acquires a key input and outputting a keyboard input reflecting the key value; determining that the gesture input is a touch input when the amount of change in the capacitance is greater than a touch threshold; calculating a touch coordinate value from the change in the capacitance caused by the touch input; outputting a first signal indicating that a pointer moved on a control target screen, which is one of the plurality of output devices, on the basis of the calculated touch coordinate value; determining that the gesture input is a hovering input when the amount of change in capacitance is less than the touch threshold and greater than a hovering threshold; calculating a hovering coordinate value from the change in the capacitance according to the hovering input; and outputting a second signal indicating that a virtual point moved in a virtual space, an actual space, or an augmented space on the basis of the calculated hovering input.

Technical solutions intended to be solved by the invention are not limited to the aforementioned solutions, and other solutions that are not described herein will be clearly understood by those skilled in the art from the following description and the accompanying drawings.

Advantageous Effects The text input device and the pointing device, which are provided separately, are integrated in one human interface device so as to reduce unit price and size of a product and eliminate unnecessary user operation, thereby improving work efficiency.

According to the present invention, it is possible to utilize a single pointing-device-integrated text device as a digitizer interface as well as a keyboard interface and a mouse interface.

With the pointing-device-integrated text device according to the present invention, it is also possible to select a corresponding attribute by means of a pointer when an attribute value such as audio volume is adjusted and to easily adjust a desired attribute value by simply using a push input and a touch input without the inconvenience of using the pointer again to adjust a position of an indicator indicating the attribute value in the selected attribute.

According to the present invention, it is possible to use a single pointing-device-integrated text device as an input interface for a plurality of devices in a multi-device environment.

Advantageous effects of the invention are not limited to the aforementioned effects, and other advantageous effects that are not described herein will be clearly understood by those skilled in the art from the following description and the accompanying drawings.

BEST MODE

Figure 1:
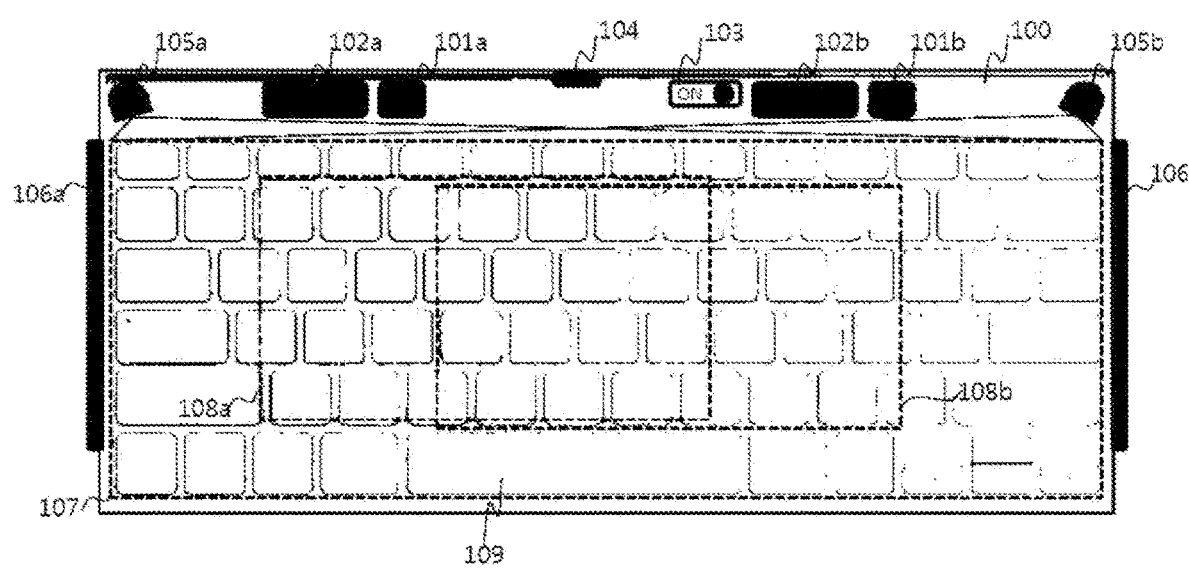
FIG. 1 illustrates an exemplary embodiment of a text input device integrated with a pointing device.

Embodiments described in this specification are made to clearly explain the spirit of the invention to those skilled in the art, and do not intend to limit the present invention. It should be interpreted that the present invention may include substitutions or modifications without departing from the spirit of the present invention.

Terms used herein have been selected as general terms which are widely used at present in consideration of the functions of the present invention, but may be altered according to the intent of an operator of ordinary skill in the art, conventional practice, or the introduction of new technology. However, when a specified term is defined and used in an arbitrary sense, the meaning of the term will be described separately. Accordingly, the terms used herein are not defined as simple names of the components, but are defined on the basis of the actual meaning of the terms and the whole context throughout the present specification.

The accompanying drawings are for facilitating the explanation of the present invention, and a shape in the drawings may be exaggerated for the purpose of convenience of explanation, and thus the present invention is not limited to the drawings.

In addition, details of generally known functions and structures which obscure the subject matter of the present invention will be omitted.

According to an aspect of the present invention, there may be provided an electronic device having a multi-functional human interface with a keyboard layout, the electronic device comprising: a plurality of buttons arranged according to the keyboard layout and each having a keycap configured to receive a vertical push input from a user; a button body combined with a lower portion of the keycap and configured to be moved upward or downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, wherein the controller operates in a keyboard mode in which the touch input is ignored and only a keyboard input reflecting a key value corresponding to the push input is output, a mouse mode in which a push input relative to at least some of the plurality of buttons is ignored and a mouse input indicating a movement distance and a movement direction of a pointer is output by means of a variation of the touch coordinate value, or a digitizer mode in which a push input relative to at least some of the plurality of buttons is output and a digitizer input indicating a position of the pointer is output by means of the touch coordinate value.

The controller may calculate the variation of the touch coordinate value in the mouse mode through a difference operation between a touch coordinate value during a current scan period and a touch coordinate value during a previous scan period, and output the digitizer input from the touch coordinate value in the digitizer mode in consideration of a matching relationship between a screen region of a display outputting the pointer and the touch coordinate value.

The controller may set the matching relationship so that the position of the pointer on the screen region corresponds to a touch coordinate value of a touch input that is first applied after the digitizer mode is entered.

The controller may calculate the variation of the touch coordinate value in the mouse mode through a difference operation between a touch coordinate value during a current scan period and a touch coordinate value during a previous scan period, and acquire the digitizer input in the digitizer mode through the current touch coordinate value and a touch coordinate value of a touch input that is first applied after the digitizer mode is entered.

The controller may determine whether the mouse mode is a left-hand mode or a right-hand mode when the mouse mode is entered, activate only electrodes of buttons located at a left side of an entire touch sensing region when the mouse mode is the left-hand mode, activate only electrodes of buttons located at a right side of the entire touch sensing region when the mouse mode is the right-hand mode, and activate all of the electrodes of the buttons located within the entire touch sensing region when the digitizer mode is entered.

The controller may set a touch region matched to a screen region in which the pointer is displayed so that a touch coordinate value of a touch input that is first applied after the digitizer mode is entered is matched to a position of the pointer on the screen region.

When a touch input is generated in a region outside the touch region that is within the entire touch sensing region, the controller may reset the touch region according to the touch input applied to the outside region.

The controller may differently set a touch region matched to a screen region in which the pointer is displayed according to a touch input that is first applied after the digitizer mode is entered.

According to another aspect of the present invention, there may be provided an electronic device having a multi-functional human interface with a keyboard layout, the electronic device comprising: a plurality of buttons arranged according to the keyboard layout and each having a keycap configured to receive a vertical push input from a user; a button body combined with a lower portion of the keycap and configured to be moved upward or downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, wherein the controller operates in a keyboard mode in which the touch input is output and only a keyboard input reflecting a key value corresponding to the push input is output, and a touch mode in which a push input relative to at least some of the plurality of buttons is ignored and a pointer control signal reflecting the touch coordinate value is output, and wherein the controller calculates a touch coordinate value corresponding to the touch input on the basis of the scan signal when operating in the touch mode, acquires a relative coordinate value from the touch coordinate value when the touch mode is a mouse mode, and acquires an absolute coordinate value from the touch coordinate value when the touch mode is a digitizer mode.

The relative coordinate value may be calculated through a difference operation between a touch coordinate value during a current scan period and a touch coordinate value during a previous scan period, and the absolute coordinate value may be calculated using the touch coordinate value in consideration of a matching relationship between a touch region and a screen region in which a pointer is displayed.

The controller may set the matching relationship on the basis of a touch coordinate value of a touch input that is first applied after the digitizer mode is entered.

The relative coordinate value may be calculated through a difference operation between a touch coordinate value during a current scan period and a touch coordinate value during a previous scan period, and the absolute coordinate value may be calculated through a difference operation between the touch coordinate value during the current scan period and a touch coordinate value that is first applied after the digitizer mode is entered.

According to still another aspect of the present invention, there may be provided a control method of an electronic device having a multi-functional human interface with a keyboard layout, wherein the electronic device includes: a plurality of buttons arranged according to the keyboard layout and each having a keycap configured to receive a vertical push input from a user; a button body combined with a lower portion of the keycap and configured to be moved upward or downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, the control method comprising: entering a keyboard mode; ignoring a touch input and outputting only a keyboard input reflecting a key value corresponding to a push input when operating in the keyboard mode; entering a mouse mode; ignoring a push input relative to at least some of the plurality of buttons and outputting a mouse input indicating a movement distance and a movement direction of a pointer by means of a variation of a touch coordinate value when operating in the mouse mode; entering a digitizer mode; and ignoring a push input relative to at least some of the plurality of buttons and outputting a digitizer input indicating a position of a pointer by means of the touch coordinate value.

The outputting of a mouse input may comprise calculating the variation of the touch coordinate value through a difference operation between a touch coordinate value during a current scan period and a touch coordinate value during a previous scan period, and the outputting of a digitizer input may comprise acquiring the digitizer input from the touch coordinate value in consideration of a matching relationship between a screen region of a display outputting the pointer and the touch coordinate value.

The control method may further comprise: setting the matching relationship so that the position of the pointer on the screen region corresponds to a touch coordinate value of a touch input that is first applied after the digitizer mode is entered.

The outputting of a mouse input may comprise calculating the variation of the touch coordinate value through a difference operation between a touch coordinate value during a current scan period and a touch coordinate value during a previous scan period; and the outputting of a digitizer input may comprise acquiring the digitizer input through a difference operation between the current touch coordinate value and a touch coordinate value of a touch input that is first applied after the digitizer mode is entered.

The control method may further comprise: determining whether the mouse mode is a left-hand mode or a right-hand mode when the mouse mode is entered; activating only electrodes of buttons located at a left side of an entire touch sensing region when the mouse mode is the left-hand mode; activating only electrodes of buttons located at a right side of the entire touch sensing region when the mouse mode is the right-hand mode; and activating all of the electrodes of the buttons located within the entire touch sensing region when the digitizer mode is entered.

The control method may further comprise: setting a touch region matched to a screen region in which the pointer is displayed so that a touch coordinate value of a touch input that is first applied after the digitizer mode is entered is matched to a position of the pointer on the screen region.

The control method may further comprise: acquiring a touch input to a region outside the touch region within an entire touch sensing region while operating in the digitizer mode; and resetting the touch region according to a touch input applied to the outside region.

The control method may further comprise: setting a different touch region matched to a screen region in which the pointer is displayed according to a touch input that is first applied after the digitizer mode is entered.

According to yet another aspect of the present invention, there may be provided a control method of an electronic device having a multi-functional human interface with a keyboard layout, wherein the electronic device includes: a plurality of buttons arranged according to the keyboard layout and each having a keycap configured to receive a vertical push input from a user; a button body combined with a lower portion of the keycap and configured to be moved upward or downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, the control method comprising: entering any one of a keyboard mode in which a touch input is ignored and only a keyboard input reflecting a key value corresponding to a push input is output, and a touch mode in which a push input relative to at least some of the plurality of buttons is ignored and a pointer control signal reflecting a touch coordinate value is output; calculating a touch coordinate value corresponding to a touch input on the basis of a scan signal when operating in the touch mode; acquiring a relative coordinate value from the touch coordinate value when the touch mode is a mouse mode; acquiring an absolute coordinate value from the touch coordinate value when the touch mode is a digitizer mode; and outputting a pointer position control signal on the basis of any one of the relative coordinate value and the absolute coordinate value.

The control method may further comprise: calculating the relative coordinate value through a difference operation between a touch coordinate value during a current scan period and a touch coordinate value during a previous scan period; and calculating the absolute coordinate value through the touch coordinate value in consideration of a matching relationship between a touch region and a screen region in which a pointer is displayed.

The control method may further comprise: setting the matching relationship on the basis of a touch coordinate value of a touch input that is first applied after the digitizer mode is entered.

The control method may further comprise: calculating the relative coordinate value through a difference operation between a touch coordinate value during a current scan period and a touch coordinate value during a previous scan period; and calculating the absolute coordinate value through a difference operation between touch coordinate values of touch inputs that are first applied after the digitizer mode is entered.

According to yet another aspect of the present invention, there may be provided an electronic device having a multifunctional human interface with a keyboard layout, the electronic device including a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, wherein the controller may operate in any one of the keyboard mode in which a touch input is ignored and only a keyboard input reflecting a key value corresponding to a push input is output, and a touch mode in which a first touch signal for controlling a position of a pointer is output according to a touch coordinate value, and may output a second touch signal indicating that an attribute value of an adjustment target attribute is adjusted when a key input relative to a button having a key value to which the adjustment target attribute is allocated is acquired while operating in the touch mode.

The controller may output a signal for instructing that the adjustment target attribute be activated when the key for the button having the key value to which the adjustment target attribute is allocated is acquired while operating in the touch mode.

The activation of the adjustment target attribute may include displaying a graphic object for adjusting the adjustment target attribute.

The controller may generate the second touch signal on the basis of only one of a vertical value and a horizontal value of the touch coordinate value when the adjustment target attribute has a one-dimensional (1D) attribute value.

The controller may generate the second touch signal on the basis of a value corresponding to a movement direction of an indicator on the graphic object for adjusting the adjustment target attribute, which is one of the vertical value and the horizontal value of the touch coordinate value.

The controller may generate the second touch signal on the basis of a difference operation between a touch coordinate value during a current scan period and a touch coordinate value during a previous scan period.

The controller may set a touch region for adjusting the adjustment target attribute corresponding to a range of an attribute value of the adjustment target attribute.

The controller may set the touch region such that a maximum value of the attribute value of the adjustment target attribute is matched to a top end or a rightmost side of the touch region and a minimum value of the attribute value is matched to a bottom end or a leftmost side of the touch region.

The controller may generate the second touch signal such that the touch coordinate value and a current attribute value of the adjustment target attribute correspond to each other.

The controller may generate a matching relationship between the attribute value of the adjustment target attribute and a touch coordinate value of a touch input that is first applied after a key input relative to the button having the key value to which the adjustment target attribute is allocated is acquired, and may generate the second touch signal on the basis of the touch coordinate value and the matching relationship.

The controller may generate the second touch signal through a difference operation between a touch coordinate value for adjusting the adjustment target attribute and a touch coordinate value of a touch input that is first applied after a key input relative to the button having the key value to which the adjustment target attribute is allocated is acquired.

The controller may generate the second touch signal according to a touch coordinate value acquired while the detected touch input is maintained in addition to the key input relative to the button having the key value to which the adjustment target attribute is allocated.

The controller may generate the second touch signal on the basis of a touch coordinate value of a touch input detected by an electrode of the button having the key value to which the adjustment target attribute is allocated.

The controller may generate a second touch signal for indicating any one of an increase and a decrease in the attribute value when the touch input detected by the electrode of the button having the key value to which the adjustment target attribute is allocated is in a counter-clockwise direction, and may generate a second touch signal for indicating the other of the increase and decrease in the attribute value when the touch input detected by the electrode of the button having the key value to which the adjustment target attribute is allocated is in a clockwise direction.

According to yet another aspect of the present invention, there may be provided an electronic device having a multi-functional human interface with a keyboard layout, the electronic device including a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, wherein the controller may determine the keyboard mode or the touch mode when a key input is acquired, output a character value corresponding to the key input when the keyboard mode is determined, and operate in an attribute adjustment mode in which the touch input is used to adjust a specific attribute value when the touch mode is determined.

The controller may enter the attribute adjustment mode when a key input is generated in the touch mode, and may return to the touch mode when a key input is generated in the attribute adjustment mode.

The controller may maintain the attribute adjustment mode while a key input is maintained in the touch mode.

The controller may use a one-time touch input applied after a key input is generated in the touch mode to adjust the specific attribute value.

According to yet another aspect of the present invention, there may be provided a control method of an electronic device having a multi-functional human interface with a keyboard layout, wherein the electronic device includes a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons; and a controller configured to acquire a key value allocated to a button corresponding to a switch that acquires the key input and acquire a touch coordinate value calculated using the change in the capacitance of the electrode corresponding to the touch input, the control method including entering the keyboard mode; ignoring the touch input, and outputting only a keyboard input reflecting a key value corresponding to the push input when operating in the keyboard mode; entering the touch mode; outputting a first touch signal for controlling a position of a pointer according to the touch coordinate value when operating in the touch mode; receiving a key input relative to a button having a key value to which a target control attribute is allocated while operating in the touch mode; and outputting a second touch signal for instructing that an attribute value of the adjustment target attribute be adjusted according to the touch coordinate value.

The control method may further include outputting a signal for instructing that the adjustment target attribute be activated when the key for the button having the key value to which the adjustment target attribute is allocated is acquired while operating in the touch mode.

The activation of the adjustment target attribute may include displaying a graphic object for adjusting the adjustment target attribute.

The generation of a second control method may further include generating the second touch signal on the basis of only one of a vertical value and a horizontal value of the touch coordinate value when the adjustment target attribute has a 1D attribute value.

The generation of a second touch signal may include generating the second touch signal on the basis of a value corresponding to a movement direction of an indicator on the graphic object for adjusting the adjustment target attribute, which is one of the vertical value and the horizontal value of the touch coordinate value.

The generation of a second touch signal may include generating the second touch signal on the basis of a difference operation between a touch coordinate value during a current scan period and a touch coordinate value during a previous scan period.

The control method may further include setting a touch region for adjusting the adjustment target attribute corresponding to a range of an attribute value of the adjustment target attribute.

The setting of a touch region may include setting the touch region such that a maximum value of the attribute value of the adjustment target attribute is matched to a top end or a rightmost side of the touch region and a minimum value of the attribute value is matched to a bottom end or a leftmost side of the touch region.

The generation of a second touch signal may include generating the second touch signal such that the touch coordinate value and the current attribute value of the adjustment target attribute correspond to each other.

The generation of a second touch signal may include generating a matching relationship between an attribute value of the adjustment target attribute and a touch coordinate value of a touch input that is first applied after a key input relative to the button having the key value to which the adjustment target attribute is allocated is acquired; and generating the second touch signal on the basis of the touch coordinate value and the matching relationship.

The generation of a second touch signal may include generating the second touch signal through a difference operation between a touch coordinate value for adjusting the adjustment target attribute and a touch coordinate value of a touch input that is first applied after a key input relative to the button having the key value to which the adjustment target attribute is allocated is acquired.

The generation of a second touch signal may include generating the second touch signal according to a touch coordinate value acquired while the detected touch input is maintained in addition to the key input relative to the button having the key value to which the adjustment target attribute is allocated.

The generation of a second touch signal may include generating the second touch signal on the basis of a touch coordinate value of a touch input detected by an electrode of the button having the key value to which the adjustment target attribute is allocated.

The generation of a second touch signal may include generating a second touch signal for indicating any one of an increase and a decrease in the attribute value when the touch input detected by the electrode of the button having the key value to which the adjustment target attribute is allocated is in a counter-clockwise direction, and generating a second touch signal for indicating the other of the increase and decrease in the attribute value when the touch input detected by the electrode of the button having the key value to which the adjustment target attribute is allocated is in a clockwise direction.

According to yet another aspect of the present invention, there may be provided a control method of an electronic device having a multi-functional human interface with a keyboard layout includes a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; and an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the touch input in the capacitance induced in the electrode by the drive signal, in order to electrically connect the electrode among the buttons, the control method comprising: determining the keyboard mode or the touch mode when a key input is acquired, outputting a character value corresponding to the key input when the keyboard mode is determined, and operating in the attribute adjustment mode in which the touch input is used to adjust a specific attribute value when the touch mode is determined.

The control method may further include entering the attribute adjustment mode when a key input is generated in the touch mode and returning to the touch mode when a key input is generated in the attribute adjustment mode.

The control method may further include maintaining the attribute adjustment mode while a key input is maintained in the touch mode.

A one-time touch input applied after a key input is generated in the touch mode may be used to adjust the specific attribute value.

According to yet another aspect of the present invention, there may be provided an electronic device that has a multi-functional human interface with a keyboard layout and is used as an input interface for a plurality of output devices in a multi-device environment, the electronic device including a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a gesture input including a touch operation or a hovering operation from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by the gesture input in the capacitance induced in the electrode by the drive signal, in order to electrically connect the electrode among the buttons; and a controller configured to acquire a key value allocated to a button corresponding to a switch that acquires the key input, determine that the gesture input is a touch input when the amount of change in the capacitance is greater than a touch threshold, calculate a touch coordinate value from the change in the capacitance caused by the touch input, output a first signal indicating that a pointer moved on a control target screen, which is one of the plurality of output devices, on the basis of the calculated touch coordinate value, determine that the gesture input is a hovering input when the amount of change in capacitance is less than the touch threshold and greater than a hovering threshold, calculate a hovering coordinate value from the change in the capacitance according to the hovering input, and output a second signal indicating that a virtual point moved in a virtual space, an actual space, or an augmented space on the basis of the calculated hovering coordinate value.

When a touch input is acquired while the virtual pointer corresponding to the second signal is located at a position corresponding to any one of the output devices, the controller may set the output device as a control target.

The multi-device environment may further include a virtual or augmented object.

When a touch input is acquired while the virtual pointer corresponding to the second signal is located at a position corresponding to the virtual or augmented object, the controller may set the object as the control target.

The multi-device environment may further include a head mounted display (HMD) for processing virtual reality (VR) or augmented reality (AR), and the second signal may indicate a position of a virtual pointer displayed on the HMD.

According to yet another aspect of the present invention, there may be provided a control method of an electronic device that has a multi-functional human interface with a keyboard layout and is used as an input interface for a plurality of output devices in a multi-device environment, wherein the electronic device includes a plurality of buttons arranged according to the keyboard layout and each having a keycap configured to receive a vertical push input from a user; a button body combined with a lower portion of the keycap and configured to be moved downward according to the push input; and an electrode interposed between the keycap and the button body and configured to receive a touch input from the user by means of a first block group composed of blocks that are electrically connected in a first direction, which is any one of a length direction and a width direction of the keyboard layout, and a second block group composed of blocks that are electrically connected in a second direction different from the first direction, which is the other one of the length direction and the width direction of the keyboard layout; a plurality of switches arranged in lower portions of the plurality of buttons according to the keyboard layout and each configured to acquire a key input when the button body is moved downward; and an electric connection member configured to electrically connect the first block group among buttons arranged in the first direction to form a drive line, which applies a drive signal for inducing capacitance in the electrode, and electrically connect the second block group among buttons arranged in the second direction to form a scan line, which receives a scan signal for detecting a change caused by a gesture input in the capacitance induced in the electrode by the drive signal, in order to electrically connect the electrode among the buttons, the control method comprising: acquiring a key value allocated to a button corresponding to a switch that acquires a key input and outputting a keyboard input reflecting the key value; determining that the gesture input is a touch input when the amount of change in the capacitance is greater than a touch threshold; calculating a touch coordinate value from the change in the capacitance caused by the touch input; outputting a first signal indicating that a pointer moved on a control target screen, which is one of the plurality of output devices, on the basis of the calculated touch coordinate value; determining that the gesture input is a hovering input when the amount of change in capacitance is less than the touch threshold and greater than a hovering threshold; calculating a hovering coordinate value from the change in the capacitance according to the hovering input; and outputting a second signal indicating that a virtual point moved in a virtual space, an actual space, or an augmented space on the basis of the calculated hovering input.

The method may further include: acquiring a touch input when the virtual pointer corresponding to the second signal is located at a position corresponding to any one of the output devices; and setting the output device as a control target.

The multi-device environment may further include a virtual or augmented object, and the method may further include: acquiring a touch input when the virtual pointer corresponding to the second signal is located at a position corresponding to the virtual or augmented object; and setting the object as a control target.

The multi-device environment may further include an HMD for processing VR or AR, and the second signal may indicate a position of a virtual pointer displayed on the HMD.

The present inventive concept relates to a human interface: for receiving, from a user, an input of text information or pointing location information at a digital device capable of receiving the text information or pointing location information, such as a computer, a notebook, a tablet PC, and a portable phone; and transmitting the received information to the digital device.

A keyboard formed of a plurality of buttons connected to an elastic body and a switch has widely been used as an existing text information input device.

Furthermore, a digital device having a touch interface employs a method in which a virtual keyboard is displayed on a display, and when a part of user body touches the virtual keyboard displayed on the display, a user's gesture or an electrical signal is sensed, and then the text on the virtual keyboard displayed on the part touched by the user may be input.

The touch interface may recognize the user touch by recognizing movement of the part of user body, by recognizing contact with a specific contact surface, by sensing a flow of current through the user body, or by sensing light, sound waves or the like from being blocks or interfered with the part of user body.

Examples of the touch interface include a pressure sensing touch screen, a capacitive touch screen, an optical touch screen, and an ultrasonic touch screen.

A resistive touch screen or the pressure sensing touch screen operates by recognizing pressure.

The resistive touch screen is known to have advantages in terms of low cost, a stylus pen for writing, and greater precision for writing letters in a small space, but also known to have disadvantages in that, since the resistive touch screen uses pressure, heavy pressing may not be recognized, and the feeling of touch may be slightly dull as compared with the capacitive touch screen.

The resistive touch screen may be formed of multiple layers.

Among the multiple layers, a conductive layer is formed of two layers facing each other with an air layer therebetween.

When an outer screen is pressed, the two layers of the conductive layer contact each other, which causes change in resistance and current and thus enables a touch to be recognized.

A capacitive sensing or capacitive touch method senses an operation by using capacitive coupling effects.

Unlike the pressure sensing touch screen using pressure, the capacitive touch screen is made of indium tin oxide, which is glass having high conductivity.

The glass has sensors attached to four edges thereof, causing current to flow along the surface of the glass.

The capacitive touch method recognizes changes in the current through the sensors attached to fore edges.

Upon touching the screen with a finger of the user, electrons flowing along the glass flow into the body of the user through finger, and the sensors sense the location where changes occur so as to operate the capacitive touch screen.

The capacitive touch screen is known to allow smoother feeling of manipulation and scroll as compared with the pressure sensing touch screen since the capacitive touch screen does not require heavy pressing on the screen but recognizes even just a slight touch on the screen.

Furthermore, the capacitive touch method allows multi-touch capable of touching multiple points.

Since the capacitive touch screen operates using an amount of change in current, the capacitive touch screen may not be operated with fingers wearing leather gloves which do not conduct current, fingernails, or stylus pens.

However, users may operate the capacitive touch screen by using a separate dedicated stylus pen.

The sensors may be sensitive and thus can be influenced by peripheral devices.

The optical touch screen includes an infrared camera and infrared lighting mounted on the vertex thereof so as to measure coordinates by the shadow of an object to touch the screen.

The ultrasonic touch screen emits ultrasonic waves thereon so as to sense interference effects caused by a user touch and measures coordinates for operation.

The present inventive concept may employ other various touch input techniques which can be used in sensing contact or motion of a user so as to recognize location information of a part of user body and control location information of a pointer.

FIG. 1 illustrates an exemplary embodiment of a text input device integrated with a pointing device.

The text input device integrated with a pointing device may include a housing 100 for supporting the text input device and a pointer location information input region.

The housing may have strength sufficient for enduring pressure of user input, and include a control unit, a memory unit, a battery unit, an encoding unit, a transmitting unit, and the like so as to receive text input information and pointer location information input information and transmit corresponding information to a digital device connected to the text input device integrated with a pointing device in a wired or wireless manner.

The text input device integrated with a pointing device may include a plurality of buttons 109 for receiving text input information from a user.

The plurality of buttons 109 may be formed of physical buttons or virtual buttons.

Since the physical buttons may be formed of buttons connected to an elastic body, or may be elastic per se, the physical buttons may move when an input is received from the user and return to the original location when pressure applied from the user is removed.

Since the physical buttons may be connected to an electrical switch, the physical buttons may move when the pressure is applied from the user and a phase of the electrical switch changes to generate a text input value of the buttons.

The physical buttons may be elastic but may not be connected to an electrical switch, and may move when the pressure is applied from the user and return to the original location when the pressure applied from the user is removed. The text input information of the user may be generated by the touch input device on the basis of the location information in which the pressure or gesture of the user is recognized.

The virtual buttons may be text input buttons displayed on a display device.

The virtual buttons may be certain buttons displayed by projecting light to a transparent or semi-transparent object.

The virtual buttons may not be recognized by user's eye, and may have unique location information for each text and generate relevant text input information on the basis of a user's pressure or gesture information.

The text input device integrated with a pointing device may have a text input region 107 and pointing location information input regions 108a and 108b having at least a part thereof shared with the text input region 107.

The pointing location information input regions 108a and 108b may be located at a surface, a top, or a bottom of the button for inputting text, and as shown in FIG. 1, the pointing location information input regions 108a and 108b may have at least a part thereof shared with the text input region 107.

The pointing location information input regions 108a and 108b may include the text input region 107, or the text input region 107 may include the pointing location information input regions 108a and 108b.

The pointing location information input regions 108a and 108b and the text input region 107 may have at least a part thereof shared therebetween, and the at least a part thereof may be used as the pointing location information input regions 108a and 108b but not as the text input region 107, and the at least a part thereof may be used as the text input region 107 but not as the pointing location information input regions 108a and 108b.

The text input device integrated with a pointing device may include a pointer location information input device 105 for forming a virtual text input region or a virtual pointing location information input region for inputting text, pointing location information, or both the text and pointing location information, the pointer location information input device 105 being disposed on or outside the text input device integrated with a pointing device.

The pointer location information input device 105 such as an infrared ray generator and an infrared ray receiver, an RGB camera, an ultrasonic generator and an ultrasonic receiver, or an infrared ray generator and an infrared camera may sense a part of user body on a surface of or above the housing 100 so as to receive location information and gesture information.

The pointer location information input device 105 may be formed into a plurality of devices so as to extend the pointer location information input region or improve accuracy and sensitivity of the pointer location information input region.

For example, a pointer location information input device 105b may be provided to allow text input by a right hand or for the pointing location information input region 108b for the right hand.

Furthermore, a pointer location information input device 105a may be provided to allow text input by a left hand or for the pointing location information input region 108a for the left hand.

The text input region for the right hand or the pointing location information input region 108b for the right hand may include a region of letter J button on a standard English keyboard.

The text input region for the left hand or the pointing location information input region 108a for the left hand may include a region of letter F button on a standard English keyboard.

The pointer location information input device 105 may include both the region of letter J button and the region of letter F button on a standard English keyboard.

When the text input device integrated with a pointing device is connected to a plurality of digital devices having display units, the pointing location information input regions 108a and 108b may allow a pointer to be movable on the plurality of display units.

For example, the pointing location information input region may be divided so as to be matched with respective display units, or a separate button indicating the display units may operate so as to transmit pointer location information from a relevant display unit, or the plurality of display units may be recognized as a virtual single display unit and the pointer location information may be transmitted such that a pointer can move on the virtual single display unit.

The text input device integrated with a pointing device may include a pointing location information input device having a pointing input region and receiving pointer location information from a user; and pointer execution instruction units 101 and 102 for executing at least one function on a button, image, space, icon, or a text input window on which the pointer moved by the pointing location information input device is located.

The pointer execution instruction units 101 and 102 may be formed of one or two buttons, perform respectively first and second functions, and located at a left side, a right side, or a center of the housing.

The first function may be, for example, a left click function of a computer mouse, and the second function may be, for example, aright click function of a computer mouse.

The pointer execution instruction units formed of one or two buttons may be located at both the left and right sides of the housing, providing use convenience to both left-handed and right-handed persons.

The pointer execution instruction units 101 and 102 may operate by a touch of a part of user body, light blocking, interference of ultrasonic waves, or recognition of a shadow of a part of user body through the use of the touch techniques described above.

The pointer execution instruction units 101 and 102 may be formed of elastic physical buttons.

The pointer execution instruction units 101 and 102 may operate by using at least one of text buttons disposed in a text input region outside a pointing location information input region.

The pointer execution instruction units 101 and 102 may operate by selecting a physical or virtual text button on the pointing location information input region.

For example, when a virtual input device is used as a pointing location information input device and a physical button is used as a text input device, pointer location information may be input on a virtual pointing location information input region and the physical text button located at the corresponding location may be pressed so as to generate a pointer execution instruction in a pointing location information input mode.

The pointer execution instruction units 101 and 102 may receive pointer location information by a first user gesture in the pointing location information input region, and generate a pointer execution instruction by a second user gesture at the same location.

The pointer execution instruction units 101 and 102 may enable a first function to be performed by a first gesture of a user body, a first voice, a first eye blinking, a first mouth shape, or the like.

The pointer execution instruction units 101 and 102 may enable a second function to be performed by a second gesture of a user body, a second voice, a second eye blinking, a second mouth shape, or the like.

The text input device integrated with a pointing device may operate in a text input mode for receiving text information through the text input device, and a pointing location information input mode for receiving pointing location information through the pointing location information input device.

Both the text input mode and the pointing location information input mode may be switched by a mode switching unit 103.

The mode switching unit 103 may be formed of a switch located separately on the housing.

The mode switching unit 103 may perform mode switching by sensing an input received through at least one text input button of the text input device, or simultaneous receptions of a plurality of text inputs.

The mode switching unit 103 may switch modes by receiving control information from the digital device connected to the text input device integrated with a pointing device in a wired or wireless manner.

The mode switching unit 103 may be formed integrally with the pointer execution instruction unit 102.

For example, a first touch or first pressure by a first gesture such as a contact of a part of user body on the pointer execution instruction unit 102 which shows a primary reaction to the first touch or first pressure and a secondary reaction to a second touch or second pressure may be sensed so as to switch modes, and a reaction to the second touch or second pressure by a second gesture such as a button pressing gesture may generate a pointer execution instruction.

The mode switching unit 103 may include a temporary switching mode and a permanent switching mode.

For example, the temporary switching mode may be set in which a text input mode is switched to a pointing location information input mode in reaction to the first touch or first pressure, and the pointing location information input mode is switched again to the text input mode when the first touch or first pressure is removed.

Alternatively, the temporary switching mode may be set in which a pointing location information input mode is switched to a text input mode in reaction to the first touch or first pressure, and the text input mode is switched again to the pointing location information input mode when the first touch or first pressure is removed.

The permanent switching mode may be set in which a text input mode is switched to a pointing location information input mode in reaction to the second touch or second pressure, and the pointing location information input mode is maintained when the second touch or second pressure is removed.

The temporary mode switching can be performed by first control information received from the digital device connected to the text input device integrated with a pointing device in a wired or wireless manner.

The permanent mode switching can be performed by second control information received from the digital device connected to the text input device integrated with a pointing device in a wired or wireless manner.

The mode switching unit 103 may be formed integrally with the pointer execution instruction unit.

For example, temporary mode switching may be performed from the text input mode to the pointer location information input mode when the first touch or first pressure is sensed on the pointer execution instruction unit, a pointer execution instruction may be generated when the second touch or second pressure is sensed, and the permanent switching mode may be set when a third touch or third pressure is applied, so as to operate in the pointer location information input mode even when the third touch or third pressure is removed.

In this case, the pointer execution instruction may be input in the permanent switching mode.

Mode switching units 106a and 106b may be provided to a left side or a right side of the housing.

The mode switching units 106a and 106b provided to the left side, right side, or both left and right sides may be formed of a virtual button or physical button so as to operate by sensing a user touch input or pressure.

The mode switching units 106a and 106b provided to the left side, right side, or both left and right sides may have an input region equal to or larger than 3 centimeters and smaller than 15 centimeters along the side surface of the housing.

The text input device integrated with a pointing device may include a transmitting unit 104 for transmitting data wiredly or wirelessly to the outside or a digital device having the text input device integrated with a pointing device.

The digital device may receive text input or pointer location information.

Figure 2:
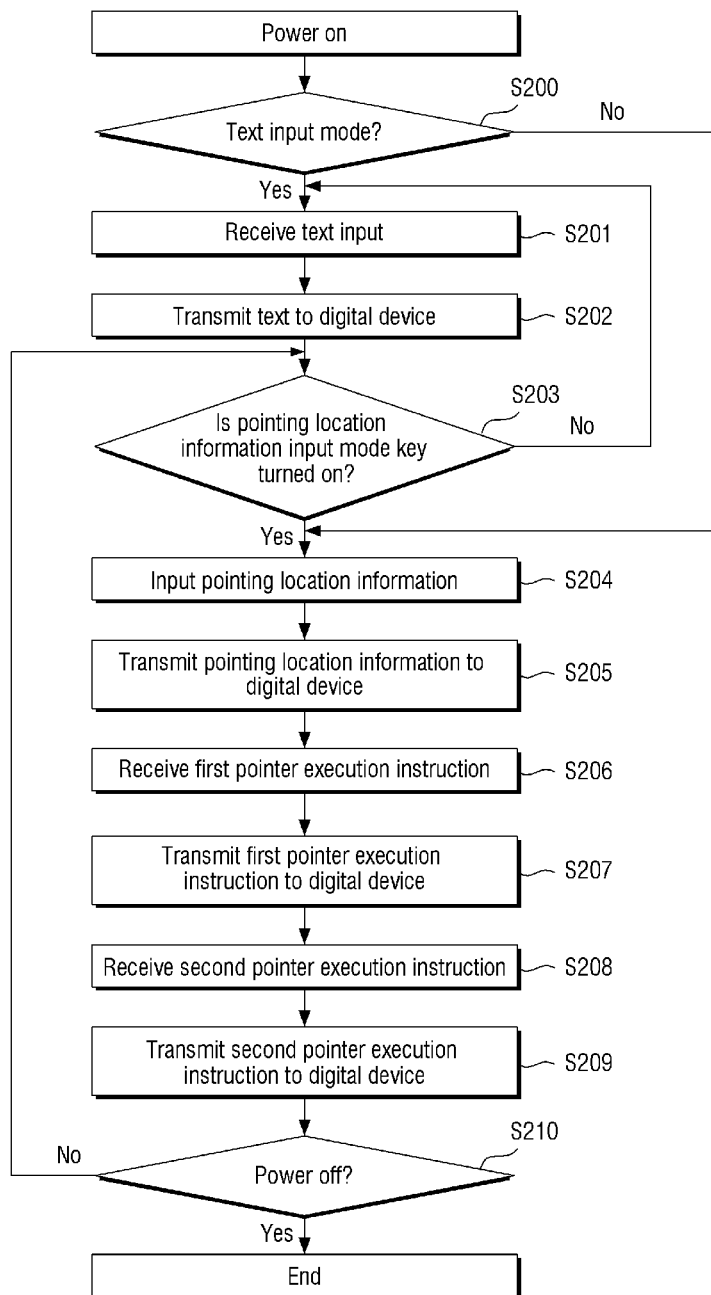
FIG. 2 is flowchart illustrating an exemplary embodiment of an operation sequence according to mode switching between a pointing device and a text device.

FIG. 2 is flowchart illustrating an exemplary embodiment of an operation sequence according to mode switching between a pointing device and a text device.

The text input device integrated with a pointing device may have a separate power unit, or receive power wiredly or wirelessly from an external source, and have a separate switch for controlling the power unit.

When power is supplied to the text input device integrated with a pointing device by the switch for controlling the power unit, it may be determined whether the text input device integrated with a pointing device is currently in a text input mode or a pointing location information input mode (200).

If it is determined that the text input device integrated with a pointing device is in a text input mode, the text input device integrated with a pointing device may be activated to receive text input from a user (201).

The text input from the user may be transmitted to the digital device which is connected in a wired or wireless manner.

The text input mode may be switched to the pointing location information input mode during an operation of the text input device integrated with a pointing device in the text input mode.

Alternatively, a text input operation and a pointing location information input operation may be simultaneously performed.

When the mode is switched to the pointing location information input mode, pointing location information may be input from a user (204).

The input pointing location information may be transmitted to the digital device which is connected in a wired or wireless manner (205).

When the text input device integrated with a pointing device receives a first pointer execution instruction (206), the text input device integrated with a pointing device may transmit the received first pointer execution instruction to the digital device which is connected in a wired or wireless manner (207).

When the text input device integrated with a pointing device receives a second pointer execution instruction (208), the text input device integrated with a pointing device may transmit the received second pointer execution instruction to the digital device which is connected in a wired or wireless manner (209).

When temporary mode switching or permanent mode switching is cancelled, the text input device integrated with a pointing device may be switched to a text input mode.

The operation may end when power of the text input device integrated with a pointing device is cut off by the power switch of the power unit, when no digital device is connected, when disconnected, when user input is absent for a certain time, or by a control of the digital device which is connected in a wired or wireless manner.

Figure 3:
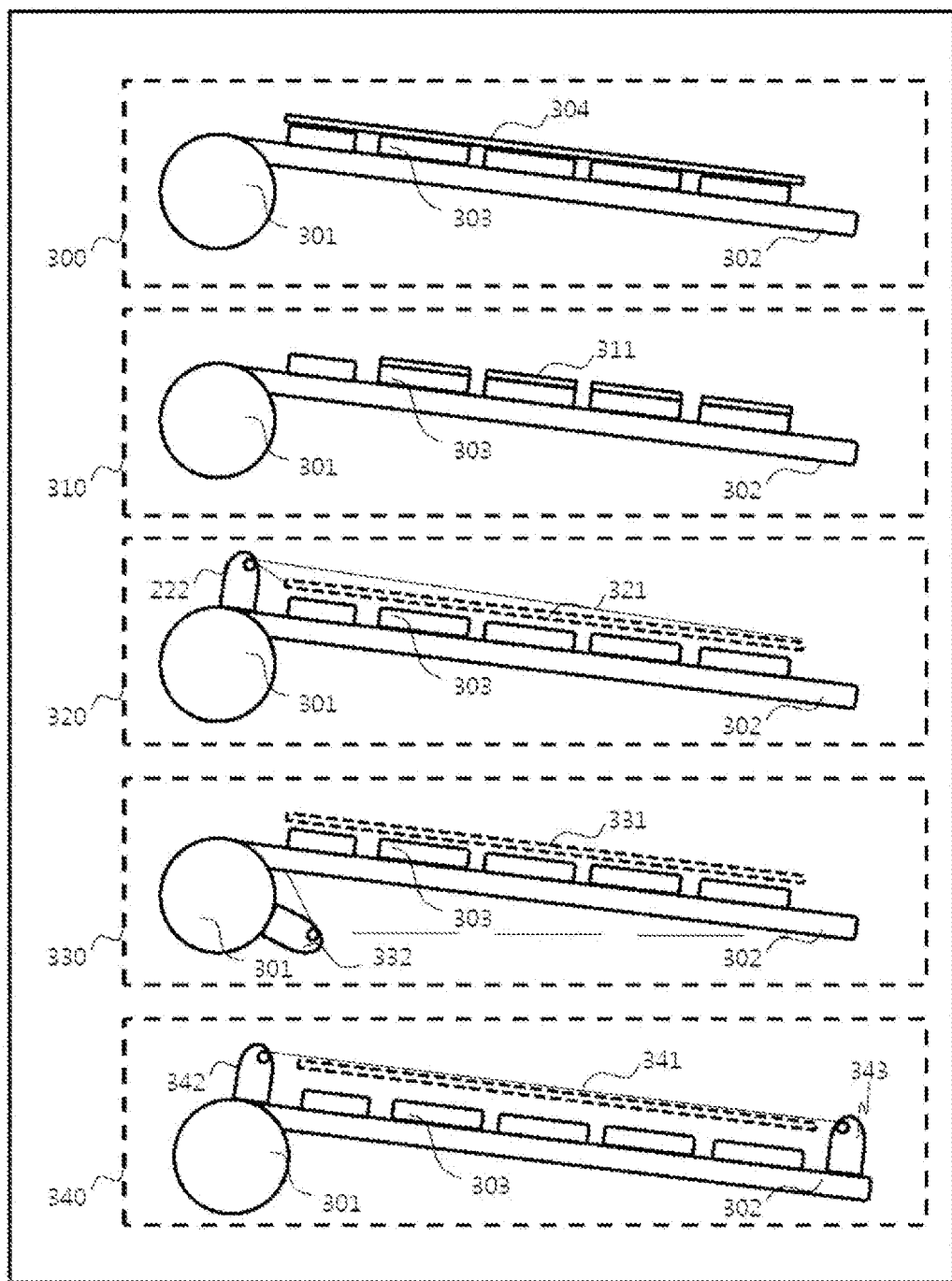
FIG. 3 illustrates exemplary embodiments of configurations of text input devices and pointing devices.

FIG. 3 illustrates exemplary embodiments of configurations of text input devices and pointing devices.

The text input device integrated with a pointing device may include a first housing 301 including a power unit, a control unit, a communication unit or the like; and a second housing 302 having a text input region and a pointing location information input region.

The text input device integrated with a pointing device may have a text input device and a text input region 303 for receiving text input from a user.

The text input region 303 may be formed of a virtual button or a physical button.

The pointing location information input device may be formed into a form of a pressure sensing or capacitive touch pad and positioned on the physical button of the text input device (304).

When the text input device is formed into a form of a physical touch pad such as a pressure sensing or capacitive touch pad, the touch pad may be used as a text input device and a pointing location information input device of which modes may be switched by the mode switching unit.

The physical touch pad such as a pressure sensing or capacitive touch pad may be used as a large-area touch pad type text input device integrated with a pointing device 300 formed of a touch pad 304 including a plurality of text button regions of a text input unit.

Alternatively, the physical touch pad such as a pressure sensing or capacitive touch pad may be used as a multi-touch pad type text input device integrated with a pointing device 310 formed of a plurality of touch pads 311 including one text button region of a text input unit.

Alternatively, the physical touch pad may be used as a top camera type text input device integrated with a pointing device 320 which receives (321) a pointing location information input by an infrared camera or an RGB camera 222 provided on a top of the pointing location information input region.

The top camera type text input device integrated with a pointing device 320 may form a virtual text input button 303 by using the top camera.

The physical touch pad may be used as a bottom camera 332 type text input device integrated with a pointing device 330 in which the camera is provided at a bottom of the second housing so as to receive (331) a pointing location information input.

The bottom camera type text input device integrated with a pointing device 330 may form the virtual text input button 303 substituting for a physical text button by using the bottom camera.

The physical touch pad may be used as a transmitting/receiving text input device integrated with a pointing device 340 which receives a pointing location information input through a virtual pointing location information input region 341 formed of a pair of infrared ray receivers or ultrasonic receivers for receiving information in which infrared rays or ultrasonic waves transmitted from an infrared ray transmitter or an ultrasonic receiver are blocked or interfered with a part of user body.

The virtual pointing location information input region 341 formed of a pair of infrared ray receivers or ultrasonic receivers may be used as a virtual text button input means in place of a physical text button by the mode switching unit.

Figure 4:
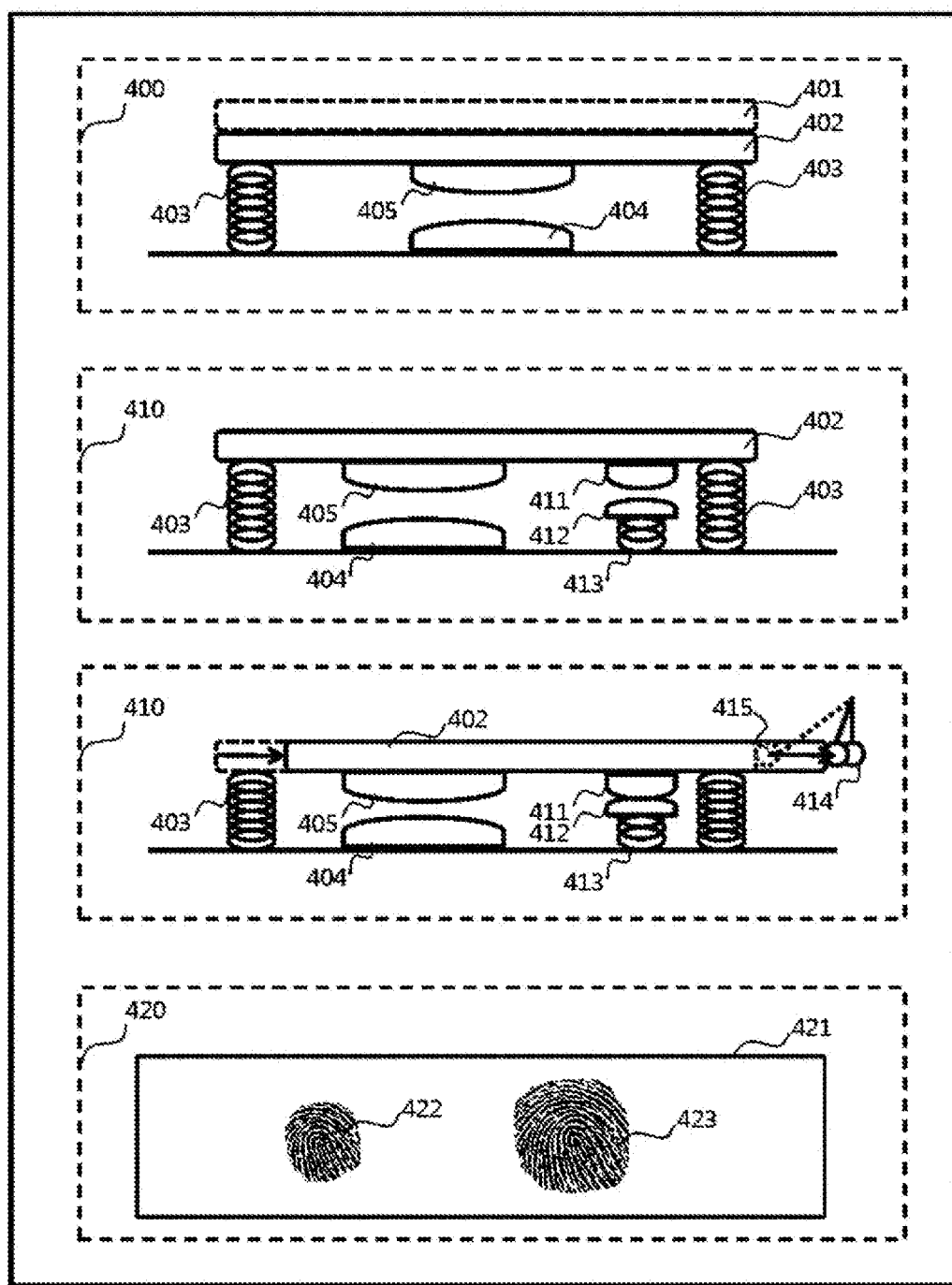
FIG. 4 illustrates exemplary embodiments of a mode switching unit integrated with a pointer execution instruction unit.

FIG. 4 illustrates exemplary embodiments of a mode switching unit integrated with a pointer execution instruction unit.

A mode switching unit integrated with a pointer execution instruction unit 400 using a touch input includes a button type pointer execution instruction unit including an elastic body 403 moving by pressure applied from a user and returning to an original location when the pressure is removed; a button 402 for receiving the pressure applied from the user; and switches 404 and 405 moving and contacting each other by the pressure from the user so as to generate a pointer execution instruction, and a mode switching unit 401 is provided on a top of the button 402 so as to sense an input of user touch and switch between a text mode and a pointing location information input mode.

A pressure-discriminating mode switching unit integrated with a pointer execution instruction unit 410 includes a button type pointer execution instruction unit including the elastic body 403 moving by pressure applied from a user and returning to an original location when the pressure is removed; the button 402 for receiving the pressure applied from the user; first switches 404 and 405 moving and contacting each other by first pressure from the user so as to generate a pointer execution instruction; and second switches 411 and 412 contacting each other by second pressure from the user smaller than the first pressure from the user so as to generate a mode switching execution instruction.

The button 402 may move and be fixed such that the button 402 may not return to its original location by the elastic body 403 in the pressure-discriminating mode switching unit integrated with a pointer execution instruction unit 410.

In this case, the button 402 may be fixed at a location in which the second switches 411 and 412 contact each other but the first switches 404 and 405 do not contact each other so as to operate in a permanent switching mode when the button 402 is fixed.

The mode switching unit integrated with a pointer execution instruction unit 400 using a touch input may be configured to operate a permanent mode switching switch 414 by an operation such as button sliding, and the pointer execution instruction switches 404 and 405 operate when additional pressure is applied while operating the permanent mode switching switch 414.

The mode switching unit integrated with a pointer execution instruction unit 410 may be formed of a touch pad 421 which operates as a mode switching unit when an area of a part of user body contacting the touch pad 421 is within a first predetermined range and as a pointer execution instruction unit when the area is within a second predetermined range.

Figure 5:
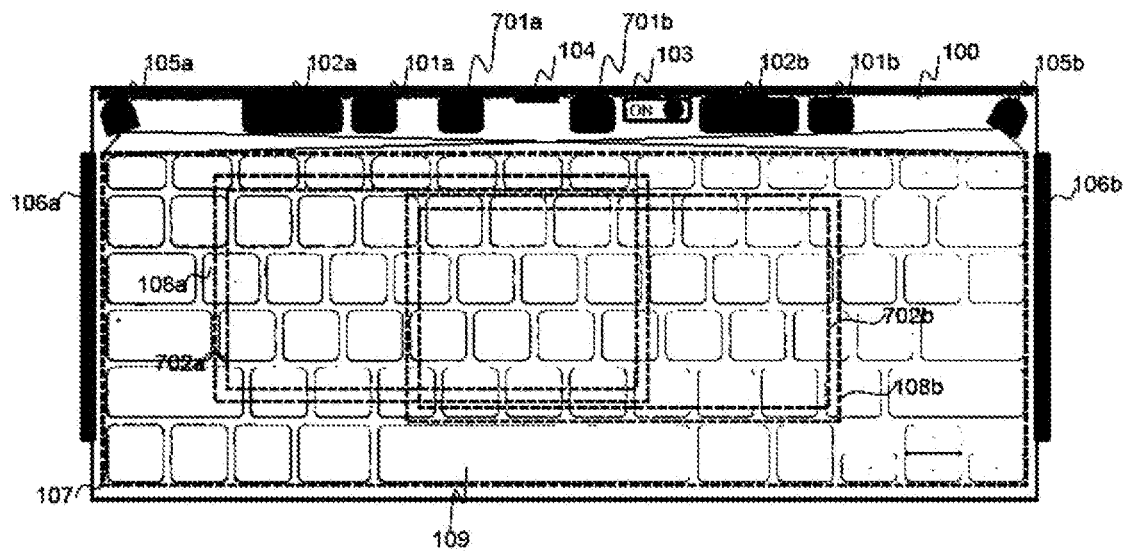
FIG. 5 illustrates an exemplary embodiment of a pointer location information input region.

FIG. 5 illustrates an exemplary embodiment of a pointer location information input region.

A human interface device of the present inventive concept may be designed to further include pointer location information input region display units 701 and 701 for visually displaying the pointer location information input region in a pointer location information input mode.

A mode switching unit of the present inventive concept may be provided separately from the button of the text input unit, and designed to recognize that a part of user body touches a part of a human interface body and switch between the text input mode and the pointer location information input mode, such that the human interface operates in the pointer location information input mode when the part of user body touches and in the text input mode when the part of user body does not touch.

In this case, the mode switching unit may be designed such that, if the part of user body used for the mode switching is a right hand (106*b*), then a left hand may input the pointer location information (108*a*).

In this case, it may be preferable that the pointer location information input region is closer to the edge opposite to the edge at which the mode switching unit is positioned, and if a user uses his/her left hand and right hand contrariwise, the mode switching unit may be designed following the same principle (106*a* and 108*b*).

The mode switching unit may be designed such that the part of user body used for the mode switching is a right hand and the right hand also inputs the pointer location information.

In this case, it may be preferable that the pointer location information input region is closer to the edge at which the mode switching unit is positioned than to the edge opposite to the edge at which the mode switching unit is positioned, and if the part of user body used for the mode switching is a left hand and the left hand also inputs the pointer location information, the mode switching unit may be designed following the same principle.

The mode switching unit may determine the text input mode and the pointer location information input mode by the number of the fingers of the user recognized by the pointer location information input unit.

The number of the fingers of the user recognized as the pointer location information input mode may be smaller than the number of the fingers of the user recognized as the text input mode.

For example, a left finger may not touch the text input button and a right index finger may touch the button for inputting pointer location information while controlling the mode switching unit by a left hand, and in this case, the number of the fingers of the user recognized may be one.

On the contrary, when the fingers of the left hand and right hand touch a keyboard so as to input text, the number of the fingers of the user recognized may be two to eight.

The pointer location information input mode display unit may temporarily display a pointer location information input mode when a mode is switched to the pointer location information input mode by the mode switching unit, or may visually display the pointer location information input region from the time of switching to the pointer location information input mode to the time of cancellation.

The pointer location information input mode display unit may display the mode by the reflected light from the text input button or by the text input button by a visible ray generator, or through spacing between the text input buttons.

The pointer location information input mode display unit may include invisible ray generators 701*a* and 701*b*, and surfaces 702*a* and 702*b* on which dye optically reacting to the invisible rays so as to emit visible rays is applied, and the dye may be applied to the text input button or the spacing between the text input buttons.

The mode switching unit may further include a hand side determination unit for determining whether the user inputs the pointer location information by the left hand or the right hand.

The display region of the pointer location information input mode display unit may be flexibly displayed according to the determination of the hand side determination unit.

The arrangement and operation of the buttons of the pointer execution instruction unit may be fluidly switched according to the determination of the hand side determination unit.

For example, if the pointer execution instruction unit includes a mouse right click and a mouse left click, the button to perform the mouse right click and the mouse left click may be switched according to the determination of the hand side determination unit.

The pointer location information input region display unit may display different pointer location information input regions (702a and 702b) according to the determination result of the hand side determination unit.

The mode switching unit may be designed to automatically switch to the text input mode when the pointer location information is not inputted from a user for a predetermined time or an input is received through the text input button during the pointer location information input mode.

The pointer location information input region display unit may be configured in that dye is applied to a part of the text input button or the text input region so as to visually display regardless of the mode switched by the mode switching unit, such that the pointer input region can be recognized during the text input mode.

Figure 6:
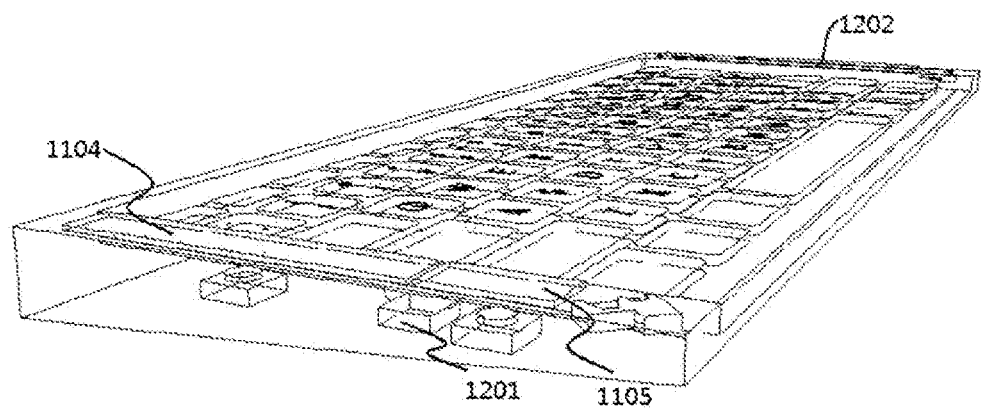
FIG. 6 illustrates an exemplary embodiment of a mode switching unit integrated with a pointer execution instruction unit.

FIG. 6 illustrates an exemplary embodiment of a mode switching unit integrated with a pointer execution instruction unit.

An inputting operation which requires frequent switching between the text input mode and the pointer location information input mode also requires increased frequency of mode switching and pointer execution instruction inputting.

For example, when a right-handed user intends to input pointer location information while inputting text in a text input mode, the user needs to switch the mode by the left or right hand, input the pointer location information, and then input the pointer execution instruction to the pointer execution instruction unit by the left hand.

In general, users may input text, pointer location information, and pointer execution instruction with their eyes kept on a monitor in a busy working environment, and when the mode switching unit and the pointer execution instruction input unit are provided separately from each other, the users need to move their hands frequently, and thus the users may not find an accurate location, resulting in a failure of work performance, or the users may need to see the keyboard, making work troublesome.

To solve these problems, if a right-handed user, for example, puts, after inputting text in a text input mode, his/her left hand on the mode switching unit, a mode switching instruction is generated to switch to a pointer input mode. Furthermore, if the user inputs pointer location information by his/her right hand with his/her left hand kept on the mode switching unit, and then applies pressure to the mode switching unit, the pointer execution instruction unit receives input of the user.

Thus, users may share the location of the mode switching unit for mode switching and the location of the pointer execution instruction unit for pointer execution instruction.

As one exemplary embodiment, the mode switching unit may be formed of a touch switch capable of receiving an input of a user hand touch, and the pointer execution instruction unit may be formed of a switch reacting to pressure such as a tact switch, and positioned beneath the mode switching unit.

A first pointer execution instruction unit 1104 and a second pointer execution instruction unit 1105 may be interconnected by a conductor material capable of recognizing a touch from a user hand, or commonly connected to a mode switching unit 1201 such that mode switching can be performed identically when the user touches either the first pointer execution instruction unit 1104 or the second pointer execution instruction unit 1105.

In this case, an operation is performed in a pointer location information input mode during a touch, and in a text input mode when the touch is cancelled.

A mode switching operation by a touch may be performed by a switch other than the touch, operating with pressure smaller than the pressure for a pointer execution instruction, or a sensor capable of sensing the location of user's finger.

In this case, the mode switching unit and the pointer execution instruction unit may be disposed in a region different from the text input region. Preferably, for a right-handed person, the mode switching unit and the pointer execution instruction unit may be disposed in a left outside of the text input region. When the mode switching unit and the pointer execution instruction unit are disposed outside the text input region, the possibility of confusion arising from the pointer location information input unit and pointer location information input may be eliminated, and the pointer location information input region may be extended.

The multi-functional human interface device of the present inventive concept may include a second mode switching unit 1202. The second mode switching unit 1202 may operate together with a toggle switch, and switch between the text input mode and the pointer location information input mode whenever an input is received from a user. This enables the user to input pointer location information just by his/her right hand even when the left hand of the user is not in touch with the mode switching unit.

In this case, the multi-functional human interface device of the present inventive concept may operate in a pointer location information input mode upon receiving a mode switching instruction by a touch when the multi-functional human interface device is in a text mode by the second mode switching unit 1202. Furthermore, the multi-functional human interface device may be maintained in a pointer location information input mode upon receiving a mode switching instruction by a touch when the multi-functional human interface device is in a pointer location information input mode by the second mode switching unit 1202, but the multi-functional human interface device is switched to a text input mode when a mode switching instruction by a touch is cancelled or a text input is received through the text input unit.

When the multi-functional human interface device is switched to a text input mode by a text input, at least a first text input may be ignored, and the multi-functional human interface device may be switched to the text input mode upon receiving at least two text inputs.

When the multi-functional human interface device is switched to the text input mode upon receiving at least two text inputs, the multi-functional human interface device may transmit, to the digital device, text inputs including the ignored at least first text, and then transmit newly input text input information to the digital device.

Figure 7:
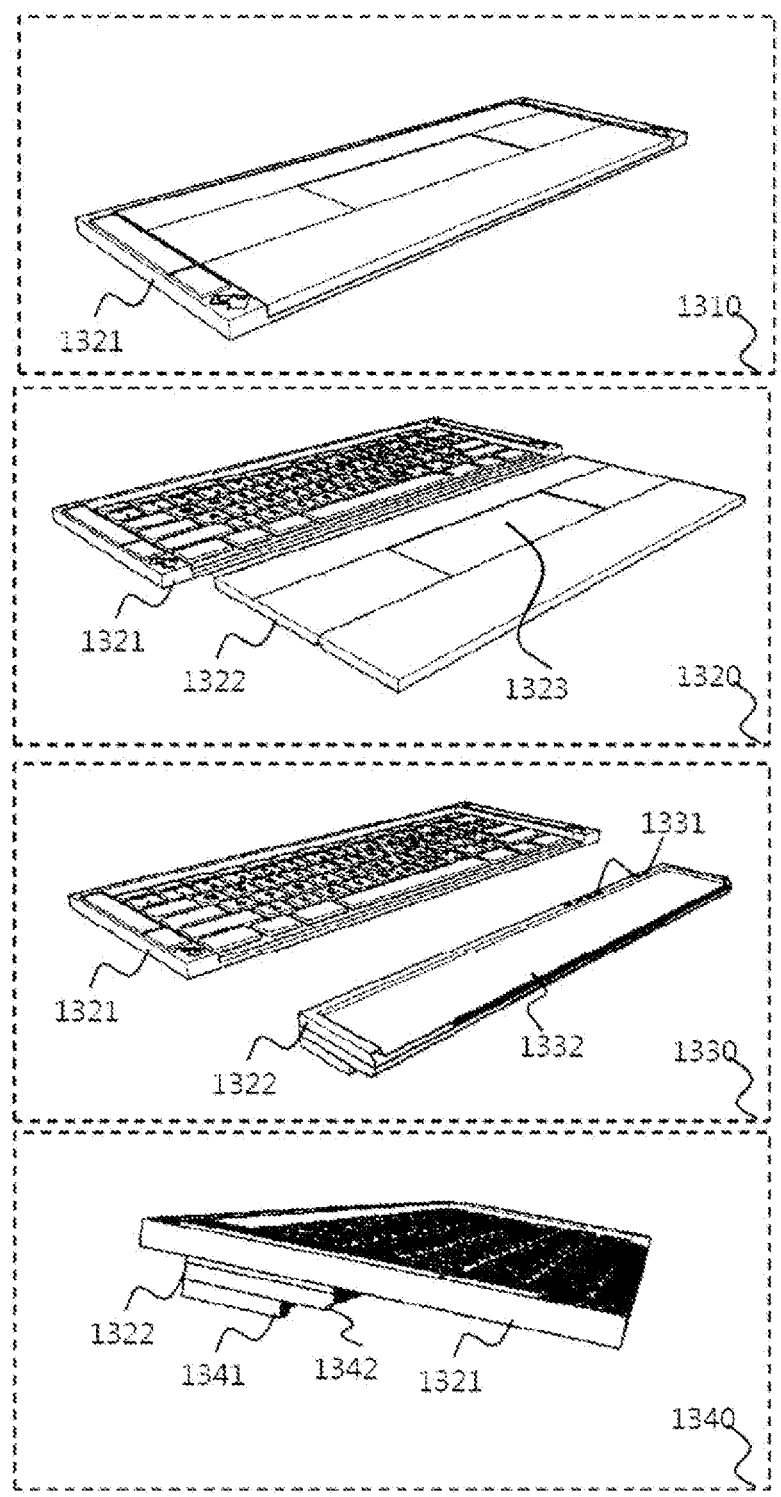
FIG. 7 illustrates an exemplary embodiment of a utilization of a human interface device cover adopting a bottom-located pointer location information input device.

FIG. 7 illustrates an exemplary embodiment of a utilization of a human interface device cover.

In the multi-functional human interface device, the pointer location information input device may require a space of at least 1 mm to 2 mm on a plane of the text input device formed into a physical device so as to form a pointer location information input region, and require a rim in which an absorber or a reflector for absorbing or reflecting an optical signal is positioned, at edges of at least three sides enclosing a text input region.

In this case, a gap of at least 1 mm to 2 mm is formed between the height of the rim of the at least three sides and the plane of the text input region, and a substantially rectangular space is formed in the gap.

The multi-functional human interface device of the present inventive concept may further include a multi-functional cover 1322 in the substantially rectangular space so as to protect the text input region from impact applied from outside (1310).

The multi-functional cover 1322 may be separated from the multi-functional human interface device, and may be coupled or decoupled to or from the multi-functional human interface device by a magnet or a physical structure.

The multi-functional cover 1322 may be foldable several times. Preferably, the multi-functional cover 1322 may have a twice-foldable structure, and the width of at least one of divided regions of the multi-functional cover 1322 may be narrower than the width of other regions (1341).

This may further reduce the slope of the multi-functional human interface device when the multi-functional cover 1322 is folded and disposed beneath the multi-functional human interface device so as to adjust the slope of the multi-functional human interface device.

When the multi-functional cover 1322 is folded and disposed beneath the multi-functional human interface device, the portion contacting the ground among the part of the folded surface may have a tilted surface (1342) for increasing an area contacting the ground.

The slope of the multi-functional human interface device may be adjusted according to a user's desire by the number of folding of the multi-functional cover 1322.

The multi-functional cover 1322 may have a built-in charge battery 1323 therein.

The charge battery 1323 may have power with an electrode which is disposed in a part of the region protruding further than a part covering the text input region, covering the rim of the part covering the text input region beneath the multi-functional cover 1322 (1331), and the power may be connected to an electrode provided on the top of the multi-functional human interface device when the text input device is covered with the multi-functional cover 1322 (1310).

When the multi-functional cover 1322 is folded and disposed beneath the multi-functional human interface device to as to adjust the slope of the multi-functional human interface device, the power of the charge battery 1323 may be connected to an electrode provided at a bottom surface of the multi-functional human interface device.

The multi-functional human interface device may be connected to external power so as to supply power to the charge battery 1323 in the multi-functional cover 1322 or separately charge the multi-functional cover 1322.

In this case, the bottom surface of the multi-functional human interface device may have a groove to which a magnet, a physical coupling device, or a cover is inserted such that the multi-functional human interface device can be coupled/decoupled, at an accurate location, to/from the protruded rim region in which the electrode 1331 is disposed and to/from a region 1332 covering the text input region having a gap difference from the protruded rim region.

A material capable of removing fine dust, oil stain, moisture, and the like can be applied to the rim of the multi-functional cover 1322, and thus foreign substances can be removed from an absorber plate, a reflector plate, an optical emitter, or a front surface of a camera when the multi-functional cover 1322 is attached/detached to/from the multi-functional human interface device.

When the text input region is covered with the multi-functional cover 1322, the cover may be detected so as to turn the power of the multi-functional human interface device off.

When the multi-functional cover 1322 is disposed on the bottom surface of the multi-functional human interface device, the power of the multi-functional human interface device may be turned on.

Furthermore, when a user input is absent for a predetermined time after power turn-on, the power may be cut off or a mode may be switched to a standby mode.

When the text input region is covered with the multi-functional cover 1322 (1310), a multi-functional human interface device 1321 may have a substantially thin rectangular plate shape, and may be designed to have no slope when put on the ground, thereby maximizing aesthetic effects and improving portability.

When the multi-functional cover 1322 is folded and disposed at the bottom surface of the multi-functional human interface device, the multi-functional human interface device may have a slope similar to those of general keyboards.

The multi-functional cover 1322 may be attachable/detachable, but alternatively, may be designed to descend round from the top to the bottom of the multi-functional human interface device by a hinge and folded.

Figure 8:
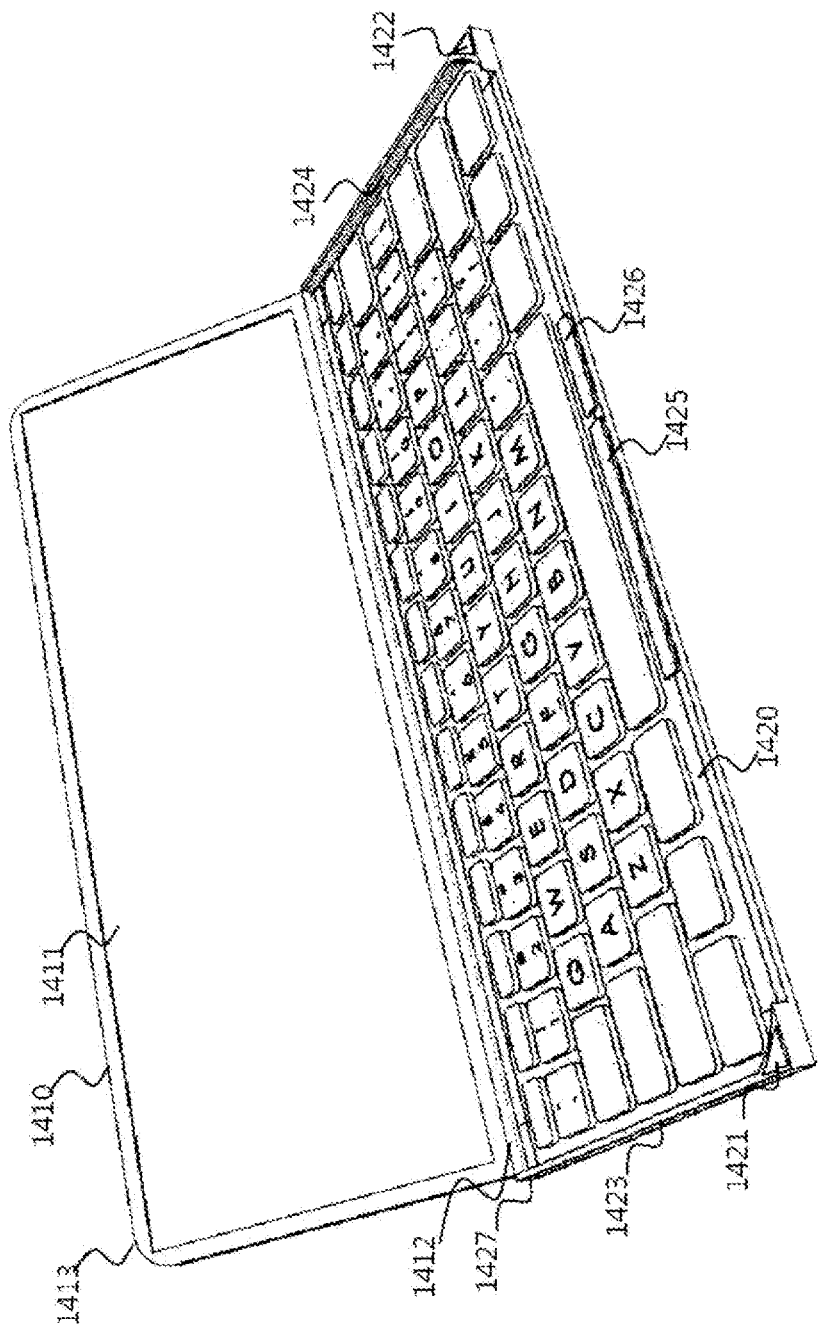
FIG. 8 illustrates an exemplary embodiment of a human interface device applied to a portable notebook.

FIG. 8 illustrates an exemplary embodiment of a human interface device applied to a portable notebook.

A human interface device 1420 of the present inventive concept may be used as an input device of a portable notebook.

The portable notebook having the human interface device of the present inventive concept may be designed in that a display unit including a display panel 1411 and a frame 1410 supporting the display panel 1411 is connected to the human interface device of the present inventive concept by a hinge 1427 such that the portable notebook can be folded and unfolded.

In this case, the display unit may be inserted to an inside of a wall formed by a reflector plate or absorber plate 1424 of the human interface device of the present inventive concept. Thus, the thickness of the portable notebook using the human interface device of the present inventive concept may be minimized.

To this end, the display unit of the portable notebook may have a width that needs to be at least two times thickness of the reflector plate 1423 or absorber plate 1424 shorter than the width of the human interface device 1420 of the present inventive concept.

Figure 13:
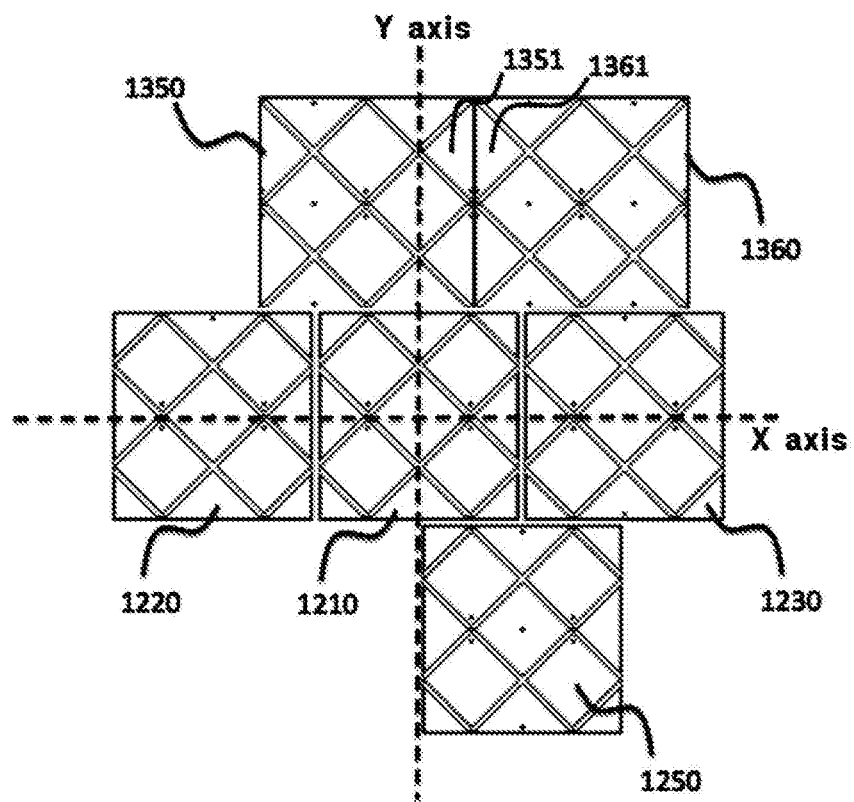
FIG. 13 illustrates an exemplary embodiment of an arrangement of electrodes of multi-functional input buttons having different patterns.

That is, the display unit needs to be designed so as to be inserted into the place in which the multi-functional cover is inserted, as shown in FIG. 13.

The display unit may have both corners rounded or diagonally cut (1413).

Pointer location information input devices 1421 and 1422 may be positioned outside the rounded or diagonally cut corners of the display unit when the display unit is folded.

Thus, the portable notebook may maintain its thickness thin without being interfered with the pointer location information input devices 1421 and 1422 when the portable notebook is folded.

In this case, a mode switching unit and a pointer execution instruction unit may be provided outside a side surface of the human interface device.

More preferably, the mode switching unit and the pointer execution instruction unit may be provided outside down the text input region (1425 and 1426).

Figure 12:
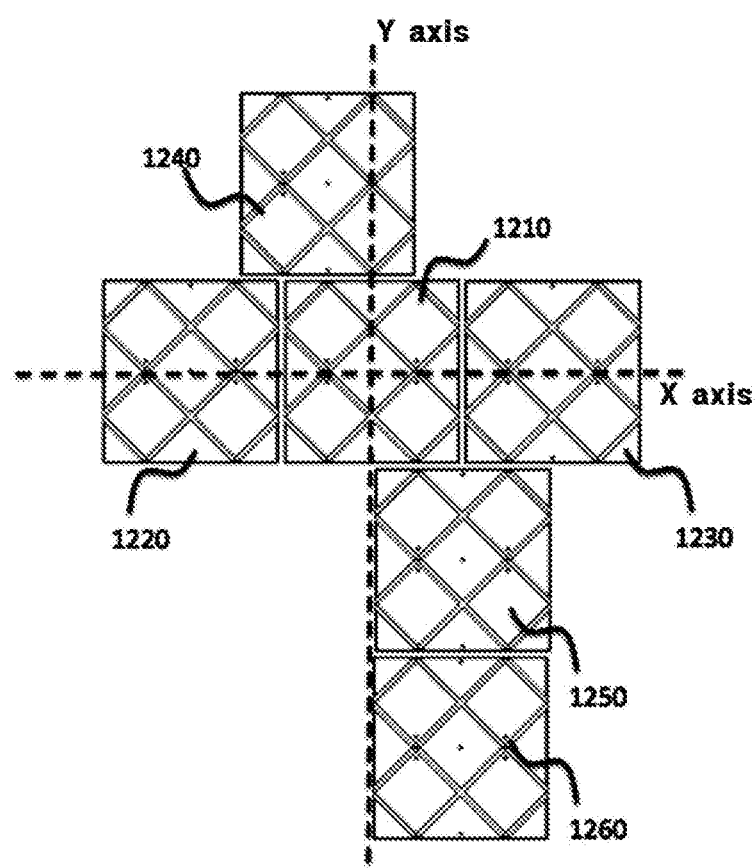
FIG. 12 illustrates an exemplary embodiment of an arrangement of multi-functional input buttons.

In this case, it may be preferable that the mode switching unit and the pointer execution instruction unit are integrally formed, as shown in FIG. 12, but the mode switching unit and the pointer execution instruction unit may be separated from each other.

In case the mode switching unit or the pointer execution instruction unit is provided outside down the text input region, the pointer location information input region needs to be set in an area excluding the area in which the mode switching unit or the pointer execution instruction unit is provided, so as to prevent the location information input devices 1421 and 1422 from erroneously operating with a misdetection that a user inputs pointer location information, when the user puts his/her finger on the mode switching unit or the pointer execution instruction unit so as to control the mode switching unit or the pointer execution instruction unit.

To this end, an area covered by an optical signal generated from a pointer location information input device may be adjusted such that the optical signal cannot arrive the mode switching unit or the pointer execution instruction unit optical signal receiving angle of a camera may be adjusted, or the camera may be set to ignore an optical signal received in a corresponding direction such that the camera cannot receive the optical signal generated by a reflection, an interference, or blocking between the optical signal and user's finger positioned on the mode switching unit or the pointer execution instruction unit.

The portable notebook may be designed to have, on at least three edges thereof, an absorber plate or a reflector plate for absorbing or reflecting a light generated from the pointer location information input device.

In this case, the reflectors or the absorbers may be disposed at two edges of the respective side surfaces of the human interface device (1423 and 1424), and disposed in a predetermined region 1412 at the rest of the three edges where the display unit contacts the human interface device such that the light generated by the pointer location information input devices 1421 and 1422 can be fully reflected or absorbed when the display unit is opened within a predetermined angle.

Figure 9:
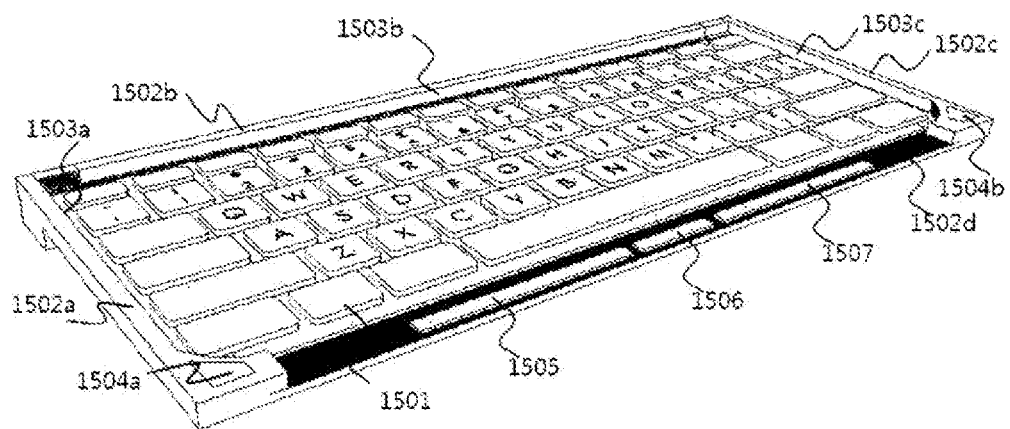
FIG. 9 illustrates an exemplary embodiment adopting a bottom-located pointer location information input device and a bottom-located pointer execution instruction unit.

FIG. 9 illustrates an exemplary embodiment adopting a bottom-located pointer location information input device and a bottom-located pointer execution instruction unit.

A human interface device may include a text input unit 1501 formed of a plurality of physical buttons; a pointer location information input unit for receiving, from a user, information related to a pointer location; a pointer execution instruction receiving unit for receiving signals of pointer execution instruction units 1505 and 1506 for receiving user instruction so as to perform at least one function at the pointer location; a mode switching instruction receiving unit for receiving a signal of a mode switching unit for switching to a pointer location information input mode; and a pointer location information transmitting unit for transmitting the information related to the pointer location, input to the pointer location information input unit, to a digital device connected to the human interface device in a wired or wireless manner, wherein the pointer location information input unit may have a pointer location information input region disposed to be parallel to a top of at least a part of a text input region of the text input unit formed of a plurality of physical buttons, and the pointer location information input unit may include, at first to third surfaces thereof 1502a, 1502b and 1502c enclosing the text input unit, optical signal reflectors or absorbers 1503a, 1503b and 1503c formed higher than a height of the text input unit, and a fourth surface 1502d enclosing the text input unit is formed lower than height of the first to third surfaces, and the fourth surface 1502d may include the pointer execution instruction units 1505 and 1506. The first and third surfaces may be disposed respectively at left and right sides of the text input unit, the second surface may be disposed on the text input unit, and the fourth surface may be disposed beneath the text input unit.

The pointer location information input unit may include at least two sensor modules, and the two sensor modules may be disposed respectively at edges of left and right lower ends of the text input unit.

The mode switching unit may operate by a first user input inputted to a first button, and the pointer execution instruction receiving unit may operate by a second user input inputted to the first button.

The first button may be made of a material capable of sensing an electrical signal generated by a finger touch, and the first input may be generated by detecting the electrical signal.

The mode switching unit may operate in the pointer location information input mode during maintenance of the first input, and cancel the pointer location information input mode when the first input is cancelled, and the first input may be generated by physical pressure.

The mode switching unit may operate by a second user input inputted to a second button, and, when the second input is inputted one time, activate the pointer location information input mode if the pointer location information input mode is cancelled, and cancel the pointer location information input mode if the pointer location information input mode is activated.

In this case, it may be preferable that light generated by the pointer location information input devices 1421 and 1422, and an image receiving device are directed toward a center of a keyboard.

When the keyboard is small, or to ensure a wider pointer location information input region, the reflector plate rather than the absorber plate among the reflector plate or the reflector plate 1423 and 1424 positioned at a side surface of the human interface device may be used, and the light generated by the pointer location information input devices 1421 and 1422, and the image receiving device may be directed toward the reflector plate 1423 and 1424.

That is, the pointer location information input device 1421 may receive pointer location information reflected by the reflector plate 1423.

The pointer location information input device 1422 may receive pointer location information reflected by the reflector plate 1424.

Thus, an effect of enabling the pointer location information input devices 1421 and 1422 to be located in left and right outsides of an actual multi-functional human interface device can be obtained, providing a wider mouse pointer location information input region.

In this case, the reflector plate 1423 and 1424 may be provided to have an angle opened at a predetermined angle of 1 to 15 degrees. That is, the reflector plate 1423 and 1424 may be arranged such that a bottom thereof opens wider than a top thereof.

Thus, an effect of enabling the pointer location information input devices 1421 and 1422 to be located in left and right outsides of an actual multi-functional human interface device can be obtained, and an effect of enabling the pointer location information input devices 1421 and 1422 to move upwardly by a predetermined distance so as not to be interfered with the pointer execution instruction input device located at a bottom of the keyboard can be obtained.

The multi-functional human interface device may include reflection units for reflecting light generated from the pointer location information input units, at least two pointer location information input units may be provided respectively at left and right sides of the human interface device, the reflection units may be provided respectively at left and right sides of the human interface device, and the left pointer location information input unit may be directed toward the left reflection unit so as to receive light input through the left reflection unit, and the right pointer location information input unit may be directed toward the right reflection unit so as to receive light input through the right reflection unit.

The left and right reflection units may not be parallel to each other and may be opened toward areas in which the left and right pointer location information input units are disposed.

The pointer location information input region may be divided into a first region and a second region. That is, a pointer location information input signal from a right hand may be received from the first region, and a pointer location information input signal from a left hand may be received from the second region.

In general, a multi-touch control may receive a plurality of touch input signals, and determine a control command according to an aspect of further movement of the plurality of touch input signals.

However, in the present exemplary embodiment, a first pointer location information input signal received from the first pointer location information input region may be used in identifying the number of touch inputs.

Furthermore, a second pointer location information input signal received from the second pointer location information input region may be used in receiving a touch input movement signal.

That is, for example, when a vertical sliding touch is input by using one right finger with left two fingers kept on touch inputting, the signal generated from this operation can be replaced by two touch signals having a general multi-touch function, used in a vertical touch input. In general, performing vertical scrolling on Internet browser may be an example of performing a vertical sliding touch input by two touches in Macbook of Apple Inc. In this case, when one right finger taps, the left hand performs two touch inputs, and thus the performance would be the same as tapping with two fingers.

For another example, when a horizontal sliding touch is input by using the right hand with left three fingers kept on touch inputting, the signal generated from this operation can be replaced by three touch signals having a general multi-touch function, used in a horizontal sliding touch input. In general, performing functions such as swipe on a whole screen application or dragging by three fingers may be an example of performing a horizontal sliding touch input by three touches in Macbook of Apple Inc. In this case, when one right finger taps, the left hand performs three touch inputs, and thus the performance would be the same as those of tapping with three fingers. The example of the left hand and right hand may be replaced by the example of the right hand and left hand, and the number of input signals for determining the number of touches is not limited to two or three described above, but includes one, four, or five touches.

The information related to the pointer location received by the pointer location information input unit may include information related to a first pointer location for moving the pointer location, and information related to a second pointer location for switching from a text input mode to a pointer location information input mode in the human interface device.

For example, when a pointer location information input signal higher than a preset threshold level is generated in a text input mode, the mode may be switched to a pointer location information input mode.

Figure 10:
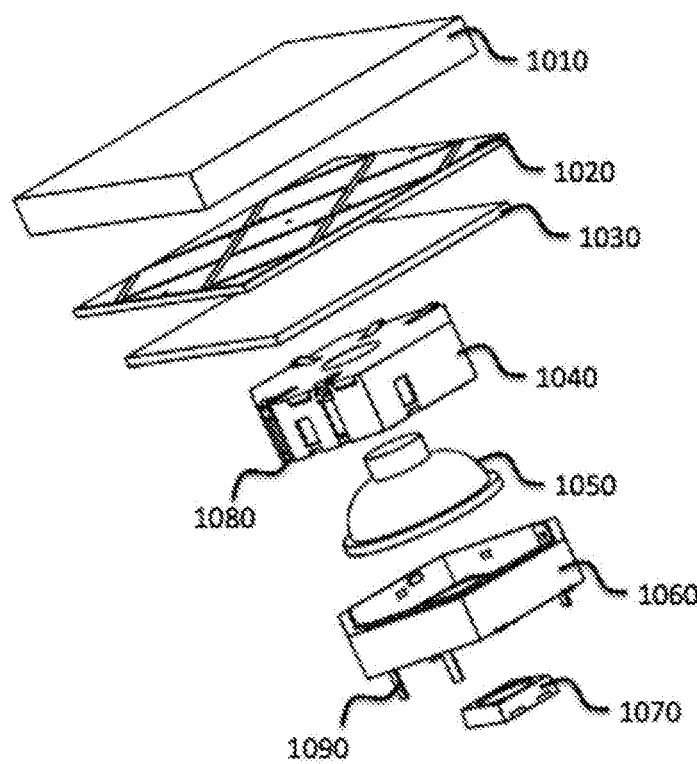
FIG. 10 is an exploded perspective view illustrating a multi-functional input button.

FIG. 10 is an exploded perspective view illustrating a multi-functional input button.

The multi-functional input button may form the text input device integrated with a pointing device 310 in a human interface such as a keyboard, including: a text input unit 303 for inputting at least one text; and a physical touch pad 311 such as a capacitive pad for moving a mouse pointer or inputting pointing location information for inputting a user touch or 3D gesture on a screen.

The present exemplary embodiment describes a capacitive touch method useful in a pointing location information input unit, but the mode switching unit, the pointer execution instruction input unit, special function keys, locations of the mode switching unit and the pointer execution instruction unit, the connection to the inner or outer display unit, the battery embedding method using the cover unit, the function of adjusting the angle of the human interface device, the text input region, the mouse pointing location information input region, and the like of the multi-functional human interface device described above by using the pointing location information input unit adopting an optical method can be applied the same to the present exemplary embodiment.

The text input device integrated with a pointing device 310 may be formed of a plurality of multi-functional input buttons.

The multi-functional input button may include a cover unit 1010 on which user's finger touch is performed; an electrode unit 1020 including a transmitter and a receiver for generating an electrical field; and a base unit 1030 for protecting the electrode unit and ensuring connectivity to an elastic unit.

The elastic unit may include an elastic body 1050, an upper support unit 1040, and a lower support unit 1060.

The upper support unit and the lower support unit may be formed into a cylindrical or polygonal body shape, and may move location thereof through the elastic body, and the lower support unit may guide the movement of the upper support unit.

The upper support unit may be fixed to the cover unit, the electrode unit, and the base unit.

The lower support unit may serve as a guide for a reciprocation of the upper support unit.

The upper support unit and the lower support unit may have a pantograph structure, interconnect an upper structure including the electrode unit and a lower structure including the elastic unit, and guide the movement of the upper structure.

The elastic body may be a dome-shaped elastic material having restoring force, a plate-shaped elastic material having restoring force, a spring-shaped elastic material, a plurality of magnets having different polarities facing each other, and a combination thereof.

The elastic unit may receive second pressure from the cover unit so as to move to a third height, and return to a first height when the second pressure of the second cover unit is cancelled. Moving to the third height may mean a physical movement, bending of an object by pressure, or sensing the second pressure by software and the like.

A pointer execution instruction may be generated upon sensing of the first pressure, and an additional pointer execution instruction may be generated upon sensing of the second pressure.

For example, an application execution instruction may be displayed at a pointer location by the first pressure, and an additional option, a preview and the like of the application may be performed by the second pressure.

An electrical signal indicating an input of a predetermined character generated through the switch of the first to fifth multi-functional input buttons may indicate an input of different characters, and a contact location of the user finger or a change in the contact location determined from the signal received through the electrode unit of the first to fifth multi-functional input buttons may intend to successively control the locations of one pointer.

The human interface device may further include a mode switching unit for switching between a text input mode and a pointing location information input mode.

The mode switching unit may operate by the multi-functional input button, a separate physical switch unit, a touch switch unit, or a predetermined touch pattern.

The human interface device may generate pointing location information for controlling successively one pointing input device on a character input device formed of a plurality of combinations of multi-functional input buttons capable of inputting one character and an electrode of the plurality of multi-functional input buttons.

The human interface device may include the mode switching unit and the pointer execution instruction unit separately from the plurality of multi-functional input buttons.

The mode switching unit and the pointer execution instruction unit may be one button formed of an electrode capable of recognizing a user touch and a switch, and may generate a pointer execution instruction by a pressure signal without the need of moving or taking off fingers after mode switching by a touch.

The multi-functional input buttons may include a light emitting unit 1070.

The light emitting unit 1070 may light characters indicating character input on the multi-functional input buttons, or may light locations of the multi-functional input buttons.

The light emitting unit may be disposed on the upper structure including the electrode unit, or a lower structure including the elastic body.

The upper structure may include the electrode unit, move by pressure from a user, and include the cover unit, the electrode unit, the base unit and the like.

The lower structure may be a part including a structure, which guides the movement of the upper structure and transmits or receives an electrical signal from the electrode unit, and not moving when pressure is applied from a user.

Figure 11:
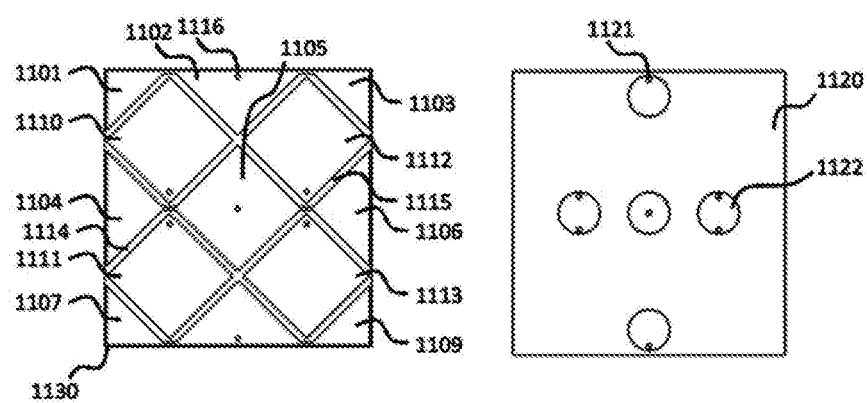
FIG. 11 illustrates an exemplary embodiment of an electrode of a multi-functional input button.

FIG. 11 illustrates an exemplary embodiment of an electrode of a multi-functional input button.

An electrode unit adopting a capacitive touch method may include a plurality of transmitters and receivers.

A general electrode unit adopting a capacitive touch method may have a square shape in which transmitters in 5 to 30 rows and receivers in 5 to 30 columns are arranged in a grid.

The multi-functional input buttons of the present exemplary embodiment may be formed of an electrode unit having a size same as that of one character input button having a width of 10 to 20 mm.

The electrode unit may form an independent small touch pad to be used as a pointing location information input device, and may cooperate with a plurality of multi-functional input buttons so as to be used as a connective pointing location information input device in a wider region.

The electrode unit may include one to three transmitters and receivers.

The electrode unit of one of the multi-functional input buttons of the present exemplary embodiment will be described by way of example of a multi-functional input button including three columns of transmitters having different driver signal periods and two rows of receivers having different scan periods.

Here, a period may refer to a timing for generating a signal.

In the present inventive concept, the number and shape of transmitters and receivers may be readily modified by a person skilled in the art according to the size and shape of the button.

The electrode unit may include first transmitters 1101, 1102 and 1103 having a first drive period, second transmitters 1104, 1105 and 1106 having a second drive period, and third transmitters 1107, 1108 and 1109 having a third drive period.

The electrode unit may include first receivers 1110 and 1111 having a first scan period, and second receivers 1112 and 1113 having a second scan period.

The first to third transmitters may be short-circuited from each other or connected into a single unit without a separate connection member on a circuit board.

The first and second receivers may be short-circuited from each other and printed on a circuit board and connected by a separate connection member, or may be arranged to be independently scanned with an electrical signal such as capacity during a scan period.

The electrode unit of the present exemplary embodiment may require a special design such that a plurality of electrode units of a plurality of multi-functional input buttons can be recognized as a single large-area electrode unit and each of the multi-functional input buttons can move upwards and downwards.

For example, the second transmitters may have a width wider than the sum of widths of the first and third transmitters.

The sum of widths of the first to third transmitters may be smaller than the sum of widths of the first and second receivers.

Receivers having one scan period may be interconnected in a general capacitive touch pad. In the present exemplary embodiment, the first receiver having one scan period may include at least two receiver blocks 1110 and 1111, and the at least two receiver blocks 1110 and 1111 may be short-circuited from each other and transmit a scan signal to an outside.

The scan signal may be processed by summing capacitive signals received from the respective receiver blocks.

Although, in the present exemplary embodiment, the transmitters are arranged in a column and the receivers are arranged in a row, the transmitters may be arranged in a row and the receiver may be arranged in a column in the same structure.

The transmitters and the receivers may be electrically short-circuited by insulators 1114 and 1115.

The electrode unit may include a bridge 1120 stacked or connected below so as to transmit and receive an external driver signal and a scan signal.

The bridge may transmit a driver signal to the electrode unit, and receive a capacitive signal from the receiver.

FIG. 12 illustrates an exemplary embodiment of an arrangement of multi-functional input buttons.

The multi-functional human interface device of the present exemplary embodiment may include at least five multi-functional input buttons.

A second multi-functional input button 1220 and a third multi-functional input button 1230 may be disposed respective at a left side and a right side of a first multi-functional input button 1210, a central point of the second multi-functional input button may be arranged on a virtual X-axis line extending leftward and rightward from a central point of the first multi-functional input button, and a central point of the third multi-functional input button may be arranged on a virtual X-axis line extending rightward from a central point of the first multi-functional input button.

The multi-functional human interface device may further include a fourth multi-functional input button 1240 and a fifth multi-functional input button 1250, and a central point of the forth multi-functional input button 1240 may be arranged at a left side from a virtual Y-axis extending upward from the central point of the first multi-functional input button and at a right side from a virtual Y-axis extending upward from the central point of the second multi-functional input button, and a central point of the fifth multi-functional input button 1250 may be arranged at a right side from a virtual Y-axis extending downward from the central point of the first multi-functional input button and at a left side from a virtual Y-axis extending downward from the central point of the third multi-functional input button, and the fourth and fifth multi-functional input buttons may be disposed adjacent to the first multi-functional input button.

The distance by which the central point of the fourth multi-functional input button 1240 is spaced leftward apart from the virtual Y-axis extending upward from the central point of the first multi-functional input button 1210 may be shorter than the distance by which the central point of the fifth multi-functional input button 1250 is spaced rightward apart from the virtual Y-axis extending downward from the central point of the first multi-functional input button 1210.

For example, the fifth multi-functional input button 1250 may be disposed at the location spaced rightward apart from the Y-axis by 40 to 60 percent of the width of the first multi-functional input button 1210.

The fourth multi-functional input button 1240 may be disposed at the location spaced leftward apart from the Y-axis as much as 15 to 35 percent of the width of the first multi-functional input button 1210.

The first transmitter of the first to third multi-functional input buttons may have a driver signal period same as that of the third transmitter of the fourth multi-functional input button 1240.

The second receiver of the first multi-functional input button 1210 may have a scan period same as that of the first receiver of the fifth multi-functional input button 1250.

The first receiver of the first multi-functional input button 1210 and the second receiver of the fifth multi-functional input button 1250 may have scan periods different from each other.

The second receiver of the first multi-functional input button 1210 and the second receiver of the fourth multi-functional input button 1240 may not be disposed in a row in the virtual Y-axis direction but may be moved leftward within the width of the first multi-functional input button 1210, and the second receiver of the first multi-functional input button 1210 and the second receiver of the fourth multi-functional input button 1240 may have the same scan period.

Consequently, pointing location information signal distortions may occur, which requires a step of correcting by software.

The human interface device may further include a sixth multi-functional input button 1260 having a central point disposed on a virtual Y-axis extending downward from the central point of the fifth multi-functional input button 1250.

FIG. 13 illustrates an exemplary embodiment of an arrangement of electrodes of multi-functional input buttons having different patterns.

The first multi-functional input button 1210 and the fourth multi-functional input button 1240 may not be disposed in a row on a virtual Y-axis but may be moved leftward as much as a first distance.

Thus, signal distortions may occur in the receivers of the first multi-functional input button 1210 and the fourth multi-functional input button 1240.

To prevent or minimize signal distortions, the fourth multi-functional input button 1240 may have a modified pattern.

For example, an electrode 1130 shown in FIG. 11 may have a pattern moved from a left side toward a right side of the electrode 1130 as much as the first distance so as to form a second electrode shape 1350.

The second electrode shape may provide an effect of aligning, on the virtual Y-axis, receivers of the first multi-functional input button and fourth multi-functional input button.

A seventh multi-functional input button 1360 having the second electrode shape may be disposed at a right side of the fourth multi-functional input button.

In this case, a receiver 1351 disposed at a rightmost side of the fourth multi-functional input button may have a scan period same as that of a receiver 1361 disposed at a leftmost side of the seventh multi-functional input button 1360. In this case, the second receivers 1112 and 1113 of the first multi-functional input button may also have the same scan period.

Figure 14:
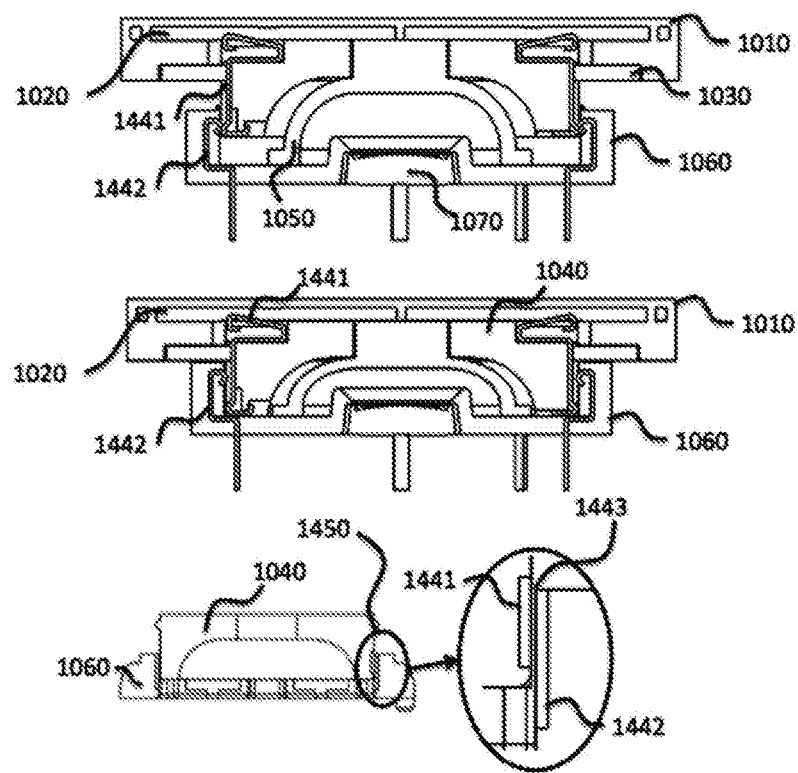
FIG. 14 illustrates exemplary embodiments of an electrical connection member of a multi-functional input button.

FIG. 14 illustrates exemplary embodiments of an electrical connection member of a multi-functional input button.

The transmitters of the first to third multi-functional input buttons may be interconnected by a first electrical connection member, and the receivers of the first, fourth, and fifth multi-functional input buttons may be interconnected by a second electrical connection member.

The connection member of a first exemplary embodiment may include a first conductor contacting or joining the electrode unit and moving together with the electrode unit while a multi-functional input button is moving from a first height to a second height by pressure applied to the multi-functional input button; a second conductor provided in a non-moving part of the multi-functional input button so as to receive an electrical signal from the first conductor; and a base PCB connected to the second conductor of an adjacent multi-functional input button.

The base PCB may transmit/receive driver signals or scan signals from a control unit to/from transmitters or receivers of a plurality of multi-functional input buttons.

The first conductor and the second conductor may move while maintaining contact and connection therebetween in a mutual sliding manner.

The first conductor and the second conductor may be kept contacting each other when no pressure is applied to the multi-functional input button or pressure equal to or lower than a predetermined threshold level is applied to the multi-functional input button, and the first conductor and the second conductor may be kept contacting each other and short-circuited from each other when pressure equal to or higher than the predetermined threshold level is applied to the multi-functional input button.

The first conductor and the second conductor may be arranged in a non-contact manner (1450). The first conductor and the second conductor may be formed into a conductive plate shape having a predetermined area, and contact each other with predetermine spacing therebetween.

The predetermined spacing may be filled with a non-conductor 1443 having dielectricity such as air, plastic, silicon, glass, ceramic and the like.

In this case, the electrical signal may be transmitted in the form of a radio signal having a frequency.

Thus, an abrasion of the conductors caused by friction between the first conductor and the second conductor, or signal noise may be reduced, and friction which may interfere with pressure being applied to the multi-functional input button may be minimized, and manufacturing processes may be simplified.

At least either the first electrical connection member or second electrical connection member may be printed together with the electrode unit on a flexible film as a conductor, or may be an electrical connection member provided to the elastic unit contacting or joining the electrode unit.

Figure 15:
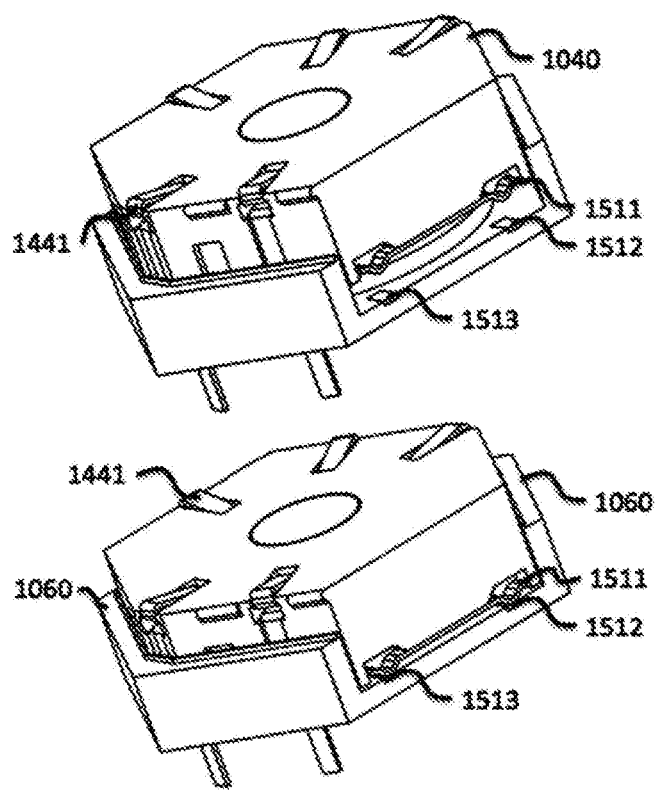
FIG. 15 illustrates an exemplary embodiment of a switch of a multi-functional input button for inputting characters.

FIG. 15 illustrates an exemplary embodiment of a switch of a multi-functional input button for inputting characters.

When the multi-functional input button moves from a first location to a second location by pressure applied thereto, switches 1511, 1512 and 1513 may operate so as to generate an electrical signal indicating an input of a predetermined character.

When the switches 1512 and 1523 provided on the base PCB or a separate membrane are connected by the terminal 1511 provided on a moving unit of the multi-functional input button, an electrical signal indicating an input of a predetermined character may be generated and transmitted to the control unit.

The switches may generate electrical signals by sensing a separate press switch, an amount of change in magnetism or electrical field, light intensity, sound, and the like.

Figure 16:
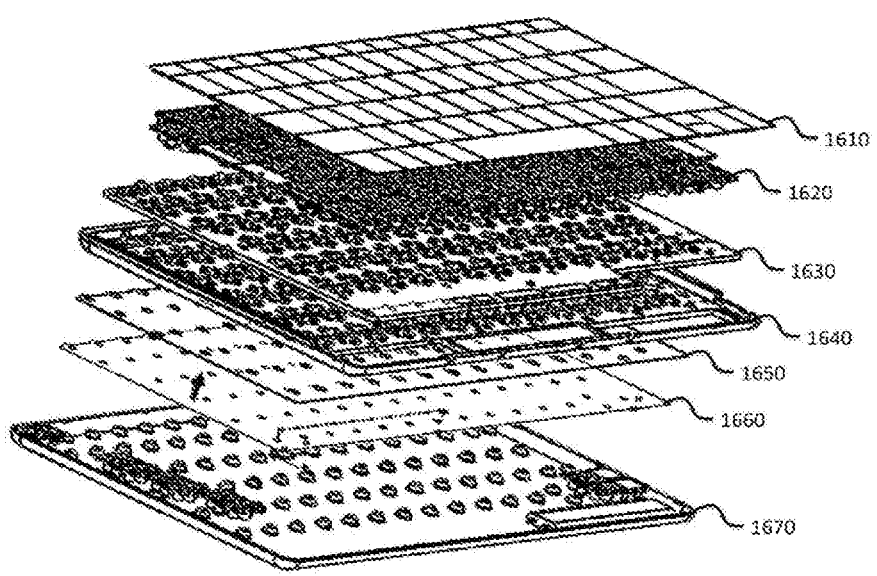
FIG. 16 illustrates an exemplary embodiment of a human interface device having a multi-functional input button.

FIG. 16 illustrates an exemplary embodiment of a human interface device having a multi-functional input button.

Figure 17:
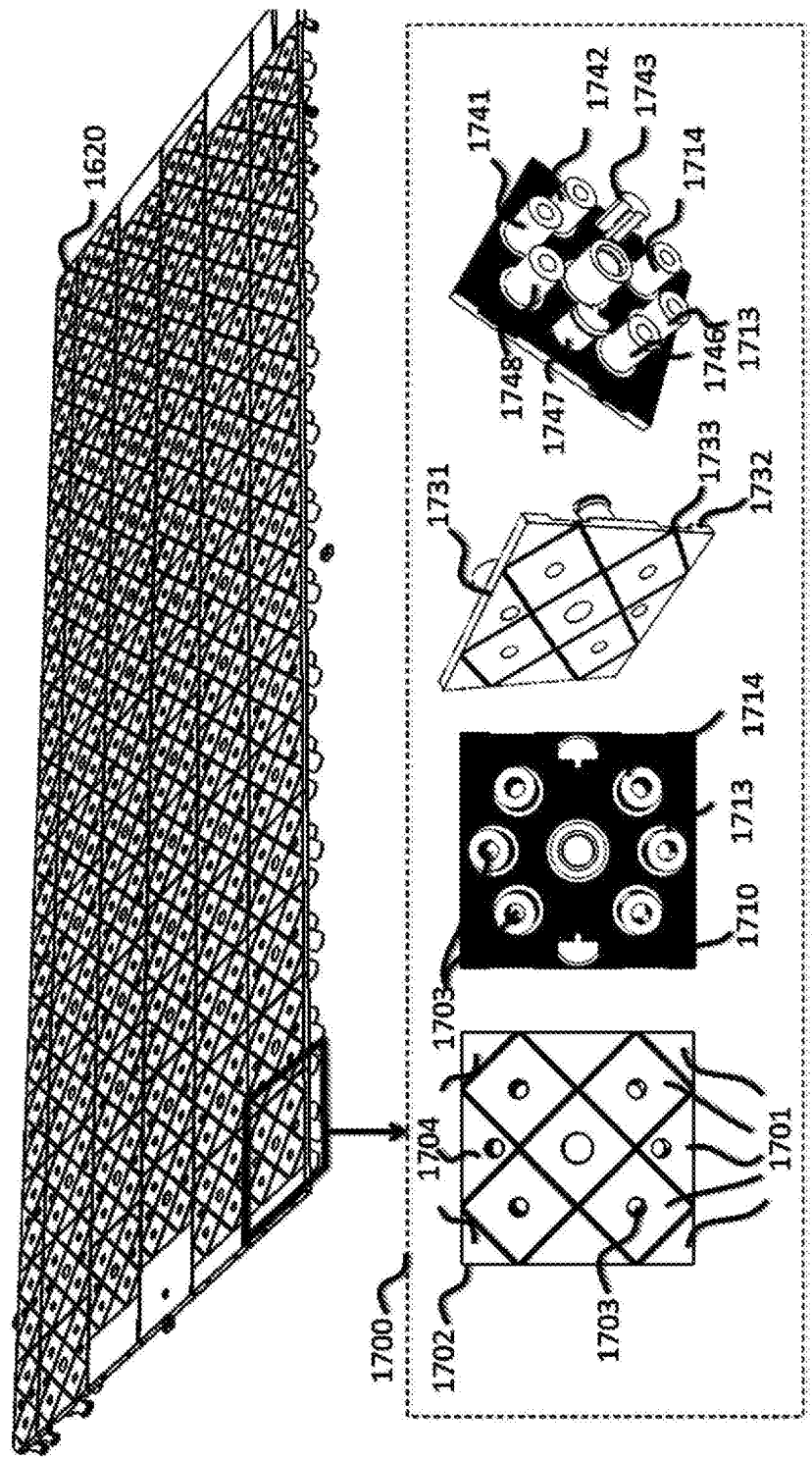
FIG. 17 illustrates an exemplary embodiment of an electrode key cap.

FIG. 17 illustrates an exemplary embodiment of an electrode key cap.

A plurality of electrode key caps 1700 may be disposed on a common plane so as to form an electrode key cap layer 1620.

For example, one electrode key cap may receive one character input and sense a predetermined amount of changes in a touch location according to a mode.

The electrode key cap layer may receive a plurality of character inputs, and sense an amount of changes in a touch location in proportion to the number of electrode key caps.

The multi-functional human interface device may include: a control unit; the cover unit 1010 on which user's finger touch is performed; the electrode key cap 1700 including first conductors 1741, 1742, 1713, 1714, 1746 and 1748 and electrode units 1020 and 1701; and a second conductor.

The second conductor may be provided in a first circuit layer 1630.

A user's finger touch on the cover unit tightly contacting a top of the electrode key cap may give an influence to an electrical field between the transmitter and receiver in the electrode, causing changes in capacity.

The first conductor may be plural in number, and provided respectively in the transmitter and receiver of the electrode unit.

When a driver signal is applied on a predetermined period through the first conductor connected to the transmitter, capacity may be generated between the transmitter and the receiver, and the generated capacity may be transmitted by the receiver through the first conductor connected to the receiver and through the second conductor electrically connected to the first conductor, and the control unit may sense changes in the transmitted capacity.

The electrode unit may be electrically connected to the second conductor through the first conductor, and the electrode unit may be disposed on a first surface 1702 of the electrode key cap, and the first conductor may be formed into a predetermined area on a column formed perpendicularly to the first surface.

The column formed perpendicularly to the first surface may be at least two in number, and the first conductor may be formed respectively on the at least two columns.

The electrode units 1020 and 1701 may include a transmitter and a receiver, and the first conductor formed respectively on the at least two columns may be electrically connected to the respective transmitter and receiver.

The first conductor may be formed to encircle the surface of the column.

The column may be formed into a tubular shape having a hole 1703 penetrating through the column, and the hole 1703 may penetrate through the first surface 1702 such that the electrode unit and the first conductor may be electrically connected through an inner wall of the hole 1703.

The electrode unit may have a plurality of pattern blocks 1701 having a specific shape on the first surface, and at least a part of the pattern blocks 1701 may be electrically interconnected through a second surface 1731 of the electrode key cap.

The plurality of pattern blocks 1704 electrically connected through the second surface may be electrically connected to the second conductor through the first conductor 1713 formed on one of the columns.

For example, the three top triangular pattern blocks on the first surface 1702 may be electrically connected by the conductor provided on the side surface 1731 adjacent to the three top triangular pattern blocks.

The three bottom triangular pattern blocks, in the same manner, may be electrically connected by the conductor provided on the side surface adjacent to the three bottom triangular pattern blocks.

In this case, the three top or bottom triangular pattern blocks may be electrically connected to one column provided at rear surfaces of the pattern blocks through a hole formed in the column.

Furthermore, triangular and diamond-shaped pattern blocks formed horizontally in an intermediate part may be electrically connected at the first surface, and electrically connected to one column provided at rear surfaces of the pattern blocks and the first conductor through a hole formed in the column in the same manner, and the column used herein may be located at a center of the rear surfaces and may also be used for the purpose of transferring pressure to the elastic unit.

In this case, the top, bottom, and the intermediate pattern blocks may transmit transmitter signals having different signal periods.

Furthermore, the two upper diamond-shaped pattern blocks disposed horizontally and the two lower diamond-shaped pattern blocks disposed horizontally may be electrically isolated on the first surface, and respectively electrically connected to the first conductor through holes formed in the respective columns provided at rear surfaces of the pattern blocks.

The first conductor may be provided respectively to the plurality of columns at a rear surface of the electrode key cap.

The plurality of pattern blocks electrically connected through the second surface may be transmitters having the same signal period.

The electrode unit may have at least three pattern blocks 1704 having a specific shape on the first surface, and the three pattern blocks may be respectively electrically connected to the second conductor through the first conductor formed on one of columns.

At least two pattern blocks among the plurality of pattern blocks may have a first signal period, and at least one pattern block among the plurality of pattern blocks may have a second signal period.

The at least three pattern blocks may be receivers.

The multi-functional human interface device may further include the elastic body 1050, and the column may transfer, to the elastic unit, pressure applied from a user to the cover unit, and enable the cover unit and the electrode key cap to move from a first location to a second location, and receive the pressure from the elastic unit when the pressure from the user is cancelled so as to enable the cover unit and the electrode key cap to move from the second location to the first location.

The electrode unit and the first conductor may be formed by plating, with a conductive material, an insulator structure including at least one flat plate, and at least two columns connected perpendicularly to the flat plate and having holes penetrating through the flat plate and the columns.

The electrode unit may have a plurality of pattern blocks having a specific shape on the first surface, and a plurality of columns formed on a third surface 1710 disposed on at the rear of the first surface.

The first conductors may be formed on the plurality of columns, and the first conductors formed on the plurality of columns may be electrically short-circuited by the third surface.

The electrode unit may have a plurality of pattern blocks having a specific shape on the first surface, and the plurality of pattern blocks may be electrically connected to the fourth surface 1732 disposed at one side of the first surface, but electrically short-circuited from each other by an electrical short-circuit 1733 formed on the fourth surface 1732.

The pattern blocks may not be limited to those illustrated in the drawings, and may include various patterns such as a rectangular pattern and a comb teeth pattern.

The multi-functional human interface device may include a plurality of electrode key caps, and the first conductors provided to the plurality of electrode key caps may transmit electrical signals to the plurality of second conductors, and the plurality of second conductors may form one first circuit layer 1630.

The multi-functional human interface device may further include a light source beneath the electrode key cap, and the column may have a tubular shape having a hole penetrating the column, and the cover unit may be made of a conductive plate material for diffusing light and receive light from the light source through the hole so as to emit the light.

The hole may be necessarily used so as to electrically connect the electrode unit and the first conductor of the electrode key cap in a plating manner.

However, the plating may make the electrode key cap opaque, and thus it may be difficult to provide a keyboard with a function of emitting light to allow for ease of work in a dark place.

The light may be transmitted through the hole, and thus the hole may be used as an electrical connection path and a light path.

The cover unit may have a user contact surface printed or carved with a character for guiding text input, or a film perforated with the shape of the character may be attached to the cover unit.

The first conductor and the second conductor may respective predetermined areas facing each other in a non-contact manner, and an electrical signal of a high frequency may be transmitted through the predetermined area in a non-contact manner.

For example, if the column has a cylindrical shape, the surface of the column facing the first conductor and the second conductor in a non-contact manner may have a band shape with a predetermined width, and if the column is a square column, the surface may have a square band shape with a predetermined width. Alternatively, only a part of the column may be provided with the first conductor so as to form a facing surface having a desired shape and area.

FIG. 18 to FIG. 22 illustrate an exemplary embodiment of electrode patterns of a plurality of multi-functional input buttons.

The multi-functional human interface device may be used in a variety of electronic devices such as an input device for a desk top, an input device for a table PC, an input device for a notebook, an input device for controlling a home theater, an input device for controlling multimedia of an automatic driving vehicle, and an input device for VR or AR.

The electronic device having the multi-functional human interface device may include first to fifth multi-functional input buttons.

The first to fifth multi-functional input buttons may respectively receive different character inputs, and receive touch inputs for controlling one piece of pointer location information from a user.

The first to fifth multi-functional input buttons may be provided on an X-axis or Y-axis without being aligned in a line.

For example, the first to third multi-functional input buttons may be aligned in a line in an X-axis direction, and the fourth and fifth multi-function input buttons may be disposed above and below the X-axis.

Furthermore, the fourth multi-functional input button 1240 may not be aligned with the first multi-functional input button with respect to a Y-axis, but may be 25 percent spaced apart leftward.

The fifth multi-functional input button 1250 may not be aligned with the first multi-functional input button with respect to a Y-axis, but may be 50 percent spaced apart rightward.

The transmitters having the same driver signal may be aligned in a line and the receivers having the same scan signal period may be aligned in a line, among the plurality of transmitters and the plurality of receivers, so as to enable the first to fifth multi-functional input buttons to control one piece of pointer location information.

Since the first to fifth multi-functional input buttons are not aligned in a line with respect to an X-axis or Y-axis, the multi-functional input buttons may have two to four receivers or transmitter parallel to an X-axis or Y-axis such that the receivers or transmitters can be aligned even though the multi-functional input buttons are not aligned in a line with respect to an X-axis or Y-axis.

Each of the multi-functional input buttons may include electrode units 1020*a*, 1020*b*, 1020*c*, 1020*d*, 1020*e*, 1020*f*, 1020*g*, 1020*h*, 1020*i*, 1020*j*, 1020*k* and 1020*l* formed of transmitter units T1, T2, T3 and T4 and receiver units R1, R2, R3 and R4.

The transmitter units of the electrode units may be arranged in parallel to an X-axis, and the receiver units of the electrode units may be arranged in parallel to a Y-axis (1020*a*, 1020*c*, 1020*e*, 1020*g*, 1020*i*, and 1020*k*).

In the exemplary embodiments to be described hereinafter, the electrode unit will be described as having transmitters parallel to an X-axis and receivers parallel to a Y-axis, but the configuration in which the transmitters and receivers are switched with each other may also be possible, that is, the receivers may be arranged in parallel to an X-axis and the transmitters may be arranged in parallel to a Y-axis.

The electrode units may have transmitters parallel to a Y-axis and receivers transmitters parallel to an X-axis (1020*b*, 1020*d*, 1020*f*, 1020*h*, 1020*j*, and 1020*l*).

Figure 18:
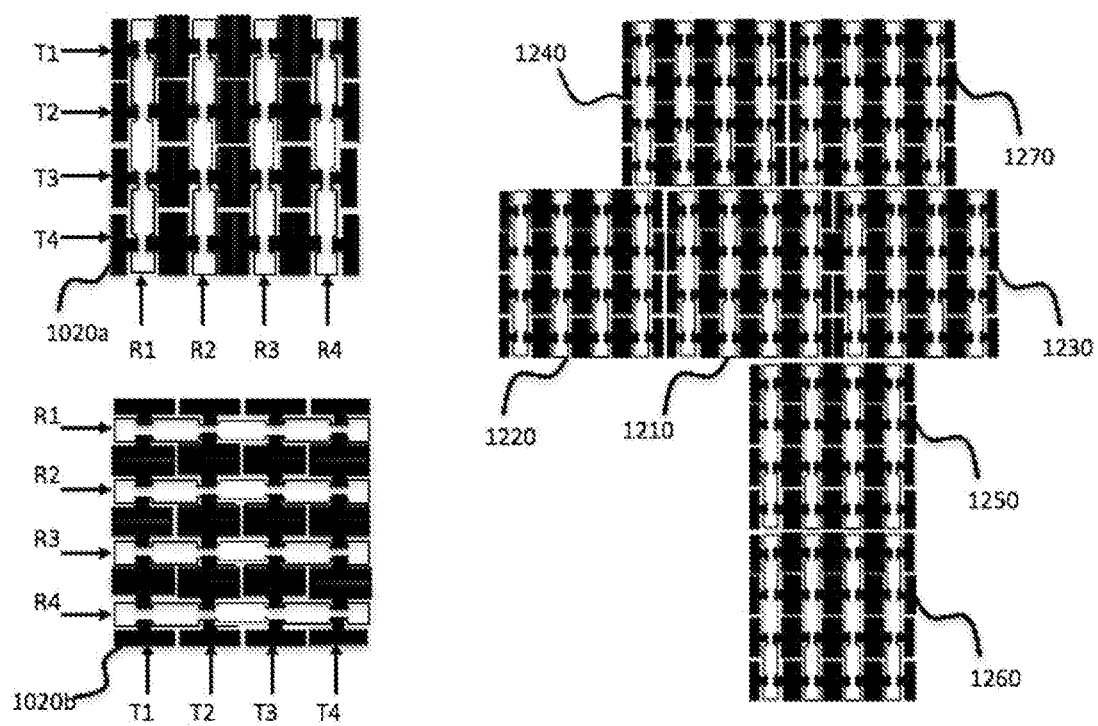
FIG. 18 to FIG. 22 illustrate an exemplary embodiment of electrode patterns of a plurality of multi-functional input buttons.

FIG. 18 illustrates an exemplary embodiment of electrode patterns of a plurality of multi-functional input buttons, in which the electrode unit may include four transmitters and four receivers.

Although, in the exemplary embodiments to be described hereinafter, the electrode unit will be described as having four transmitters parallel to an X-axis and four receivers 1020*a* parallel to a Y-axis, the configuration in which four receivers are arranged in parallel to an X-axis and four transmitters 1020*b* are arranged in parallel to a Y-axis may also be possible.

The transmitter unit may have first to fourth transmitters having at least two driver signal periods, and the receiver unit may have first to fourth receivers R1, R2, R3, and R4 having at least two scan signal periods different from each other.

The first receiver of the fourth multi-functional input button 1240 may have a scan signal period same as that of the fourth receiver of the second multi-functional input button 1220.

The second receiver of the fourth multi-functional input button 1240 may have a scan signal period same as that of the first receiver of the first multi-functional input button 1210.

The third receiver of the fourth multi-functional input button 1240 may have a scan signal period same as that of the second receiver of the first multi-functional input button 1210.

The fourth receiver of the fourth multi-functional input button 1240 may have a scan signal period same as those of the third receiver of the first multi-functional input button 1210 and the first receiver of the fifth multi-functional input button 1250.

The electronic device having the multi-functional human interface device may have the sixth multi-functional input button 1260, and the sixth multi-functional input button 1260 may be aligned adjacent to the fifth multi-functional input button 1250 on a Y-axis, and the first to fourth receivers of the sixth multi-functional input button 1260 may have a scan signal period same as those of the first to fourth receivers of the fifth multi-functional input button 1250.

On the contrary, the fifth multi-functional input button 1250 and the sixth multi-functional input button 1260 may have driver signal periods different from each other.

The electronic device having the multi-functional human interface device may have a seventh multi-functional input button 1270.

The first receiver of the seventh multi-functional input button 1270 may have a scan signal period same as those of the fourth receiver of the first multi-functional input button 1210 and the second receiver of the fifth multi-functional input button 1250.

The second receiver of the seventh multi-functional input button 1270 may have a scan signal period same as those of the first receiver of the third multi-functional input button 1230 and the third receiver of the fifth multi-functional input button 1250.

The first transmitters of the first to third multi-functional input buttons may have a first driver period, and the second transmitters of the first to third multi-functional input buttons may have a second driver period.

The first transmitters of the fourth and seventh multi-functional input buttons may have a third driver period, and the second transmitters of the fourth and seventh multi-functional input buttons may have a fourth driver period.

The first transmitter of the fifth multi-functional input button may have a fifth driver period, and the second transmitter of the fifth multi-functional input button may have a six driver period.

The first transmitter of the sixth multi-functional input button may have a seventh driver period, and the second transmitter of the sixth multi-functional input button may have an eighth driver period.

At least two of the first to fifth multi-functional input buttons may respectively have the first and second receivers having the same scan signal period, and the third and fourth receivers having the same scan signal period.

At least two of the first to fifth multi-functional input buttons may respectively have the second and third receivers having the same scan signal period, and the first and fourth receivers having scan signal periods different from each other.

For example, the first multi-functional input button may have the first and second receivers having a first scan signal period, and the third and fourth receivers having a second scan signal period.

The third multi-functional input button may have the first and second receivers having a third scan signal period, and the third and fourth receivers having a fourth scan signal period.

The fourth multi-functional input button may have the first receiver having a fifth scan signal period, and the second and third receivers having the first scan signal period, and the fourth receiver having the second scan signal period.

The seventh multi-functional input button may have the first receiver having the second scan signal period, and the second and third receivers having the third scan signal period, and the fourth receiver having the fourth scan signal period.

Figure 19:
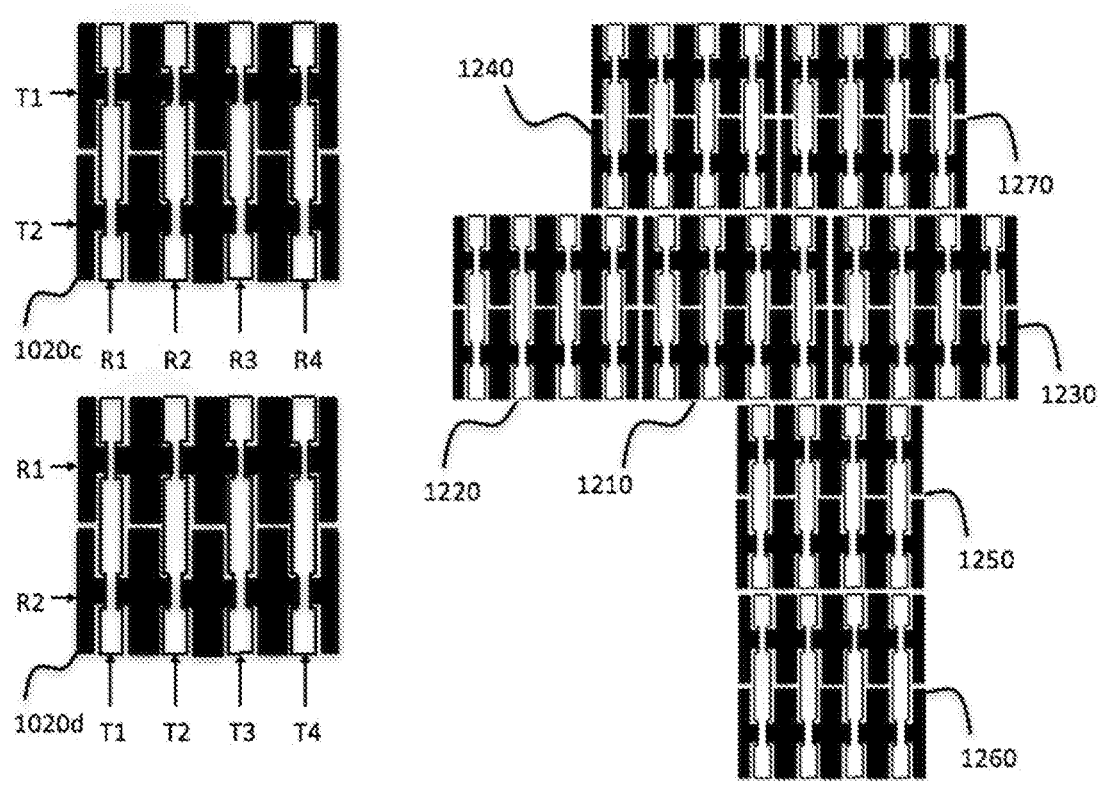
Figure 20:
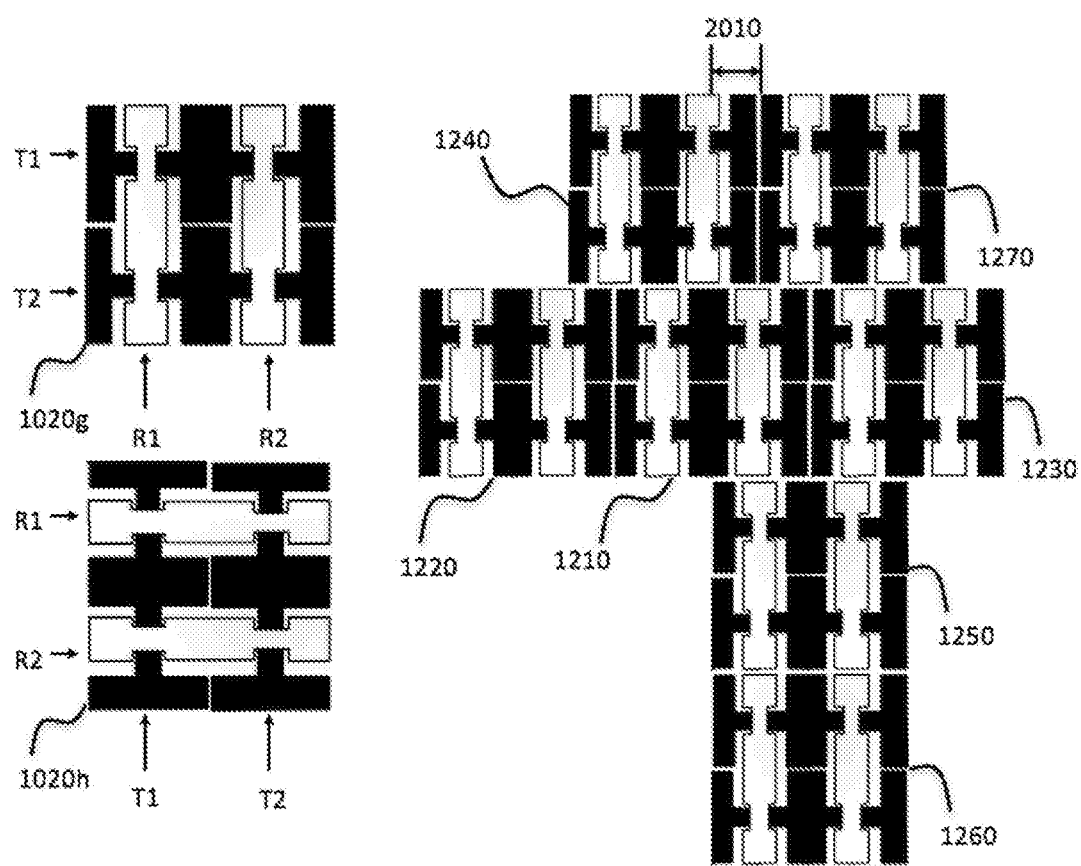
Figure 21:
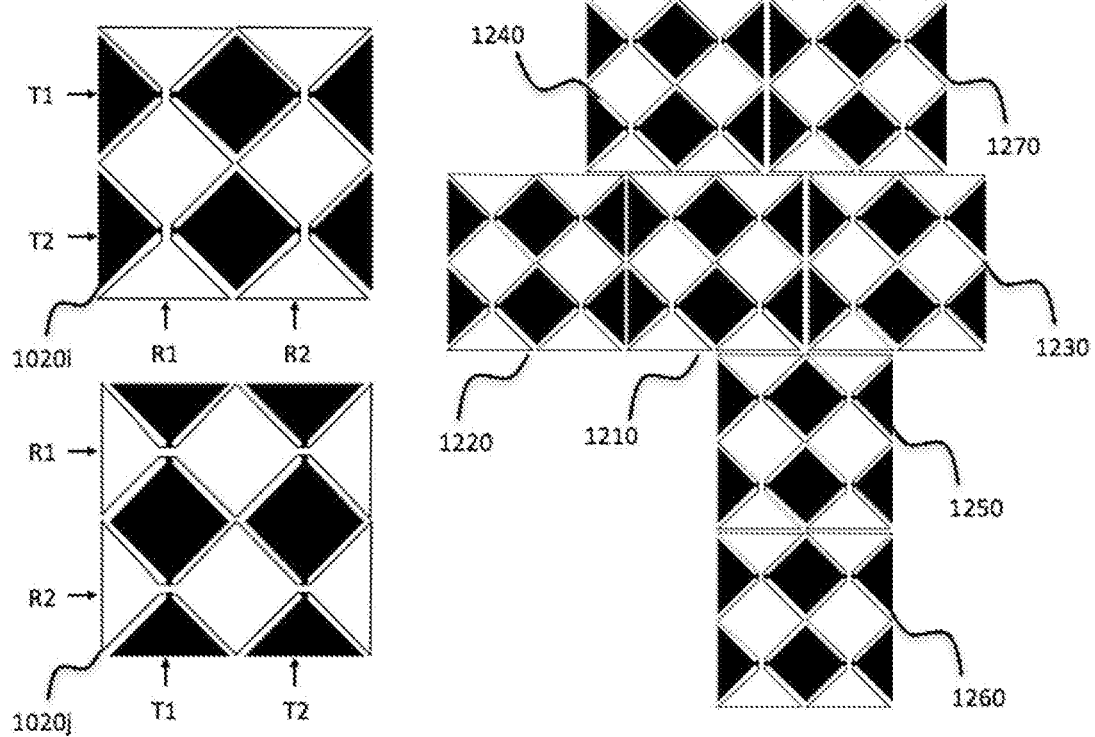
Figure 22:
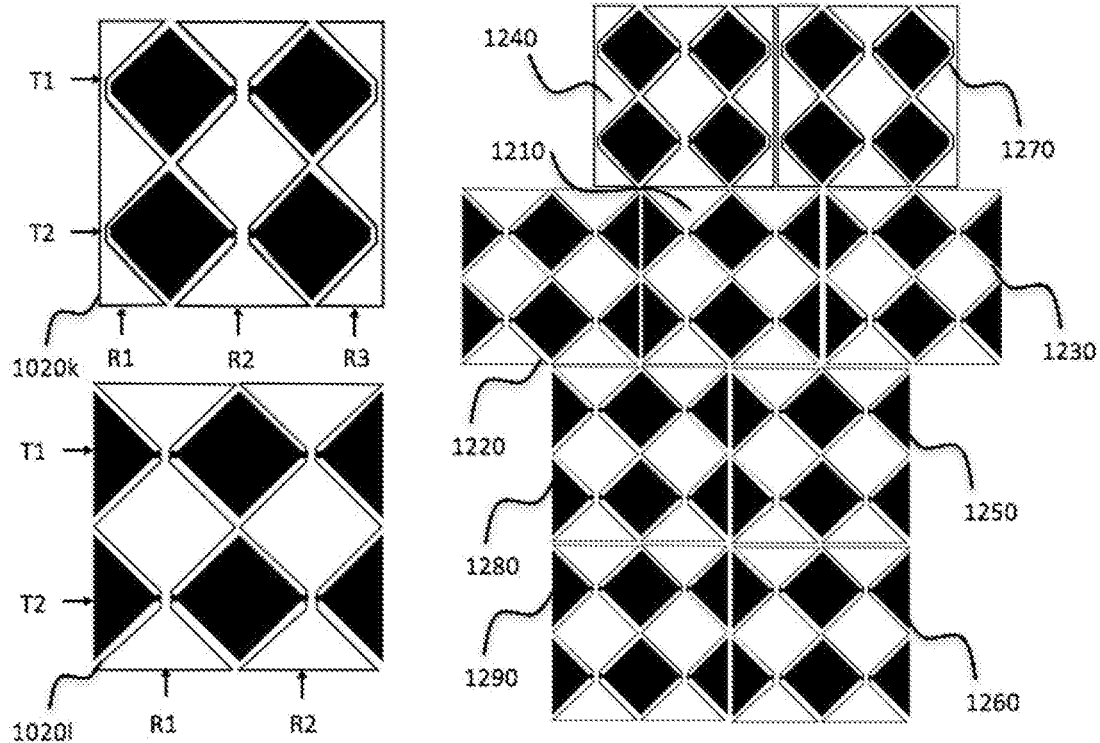

FIG. 19 illustrates an exemplary embodiment of electrode patterns of a plurality of multi-functional input buttons, in which the electrode unit may include two transmitters parallel to an X-axis and four receivers 1020c parallel to a Y-axis.

Although, in the exemplary embodiments to be described hereinafter, the electrode unit will be described as having two transmitters parallel to an X-axis and four receivers 1020c parallel to a Y-axis, the configuration in which two receivers are arranged in parallel to an X-axis and four transmitters 1020d are arranged in parallel to a Y-axis may also be possible.

The electronic device having the multi-functional human interface device may include first to fifth multi-functional input buttons, and each of the multi-functional input buttons may have an electrode unit formed of a transmitter unit and a receiver unit.

The transmitter unit may have first and second transmitters having driver signal periods different from each other, and the receiver unit may have first and second receivers having scan signal periods different from each other.

The second receiver of the first multi-functional input button may have a scan signal period same as that of the first receiver of the fifth multi-functional input button, and the first receiver of the third multi-functional input button may have a scan signal period same as that of the second receiver of the fifth multi-functional input button.

The first transmitters of the first to third multi-functional input buttons may have a first driver signal period, the second transmitters of the first to third multi-functional input buttons may have a second driver signal period, the first transmitter of the fourth multi-functional input button may have a third driver signal period, the second transmitter of the fourth multi-functional input button may have a fourth driver signal period, the first transmitter of the fifth multi-functional input button may have a fifth driver signal period, and the second transmitter of the fifth multi-functional input button may have a sixth driver signal period.

The central points of the first to third multi-functional input buttons may be disposed on a virtual X-axis, the first and second transmitters of the first to fifth multi-functional input buttons may be substantially parallel to the virtual X-axis, and the first receiver and the second receiver of the first to fifth multi-functional input buttons may be substantially perpendicular to the virtual X-axis.

The second receiver of the first multi-functional input button, the first receiver of the fifth multi-functional input button, and the second receiver of the fourth multi-functional input button may have the same scan signal period.

Alternatively, the second receiver of the first multi-functional input button, the first receiver of the fifth multi-functional input button, and the first receiver of the seventh multi-functional input button may have the same scan signal period.

The second receiver of the first multi-functional input button and the first receiver of the fifth multi-functional input button may be aligned in a line perpendicular to the X-axis, and the second receiver of the fourth multi-functional input button and the first receiver of the seventh multi-functional input button may be spaced apart from each other by a first distance 2010.

This may be required for simplifying patterns so as to reduce manufacturing cost of multi-functional input buttons. In this case, a software correction in a user touch input may be required.

The first and fourth multi-functional input buttons may have a control unit for correcting coordinates of a user touch input in an X-axis direction in correspondence to the first distance when user touch is continuously input perpendicularly to the X-axis from the first multi-functional input button to the fourth multi-functional input button.

The first to fifth multi-functional input buttons may include a control unit for sensing user touch continuously input from a region including surfaces of the first to fifth multi-functional input buttons, and continuously controlling one pointer location.

The first to fifth multi-functional input buttons may include respectively a control unit for sensing a user pressure signal and generating first to fifth character input signals.

That is, the plurality of multi-functional input buttons may generate respective characters corresponding to the respective keys of a keyboard, and simultaneously generate pointer location information such as one mouse pointer by a continuous user touch input generated across buttons in a touch surface region of the adjacent plurality of multi-functional input buttons, and control the movement of the pointer location.

When a plurality of touches are simultaneously performed in the touch surface region of the adjacent plurality of multi-functional input buttons, a multi-touch function such as zoom in, zoom out, scrolling, and screen switching may be performed.

As for the electrode unit 1020h in which the receivers are parallel to an X-axis and the transmitters are parallel to a Y-axis, an electronic device having the multi-functional human interface device may include first to fifth multi-functional input buttons, and the respective multi-functional input buttons may include an electrode unit including a transmitter unit and a receiver unit, and the transmitter unit may include first and second transmitters having driver signal periods different from each other, and the receiver unit may include first and second receivers having scan signal periods different from each other.

The second transmitter of the first multi-functional input button may have a driver signal period same as that of the first transmitter of the fifth multi-functional input button, and the first transmitter of the third multi-functional input button may have a driver signal period same as that of the second transmitter of the fifth multi-functional input button.

The first receivers of the first to third multi-functional input buttons may have a first scan signal period, the second receivers of the first to third multi-functional input buttons may have a second scan signal period, the first receiver of the fourth multi-functional input button may have a third scan signal period, the second receiver of the fourth multi-functional input button may have a fourth scan signal period, the first receiver of the fifth multi-functional input button may have a fifth scan signal period, and the second receiver of the fifth multi-functional input button may have a sixth scan signal period.

The central point of the first to third multi-functional input buttons may be disposed on a virtual X-axis, the first and second receivers of the first to fifth multi-functional input buttons may be substantially parallel to the virtual X-axis, and the first and second transmitters of the first to fifth multi-functional input buttons may be substantially perpendicular to the virtual X-axis.

The second transmitter of the first multi-functional input button and the first transmitter of the fifth multi-functional input button may be aligned in a line perpendicular to the X-axis, and may be interposed between the second transmitter of the fourth multi-functional input button and the first transmitter of the seventh multi-functional input button.

Figure 23:
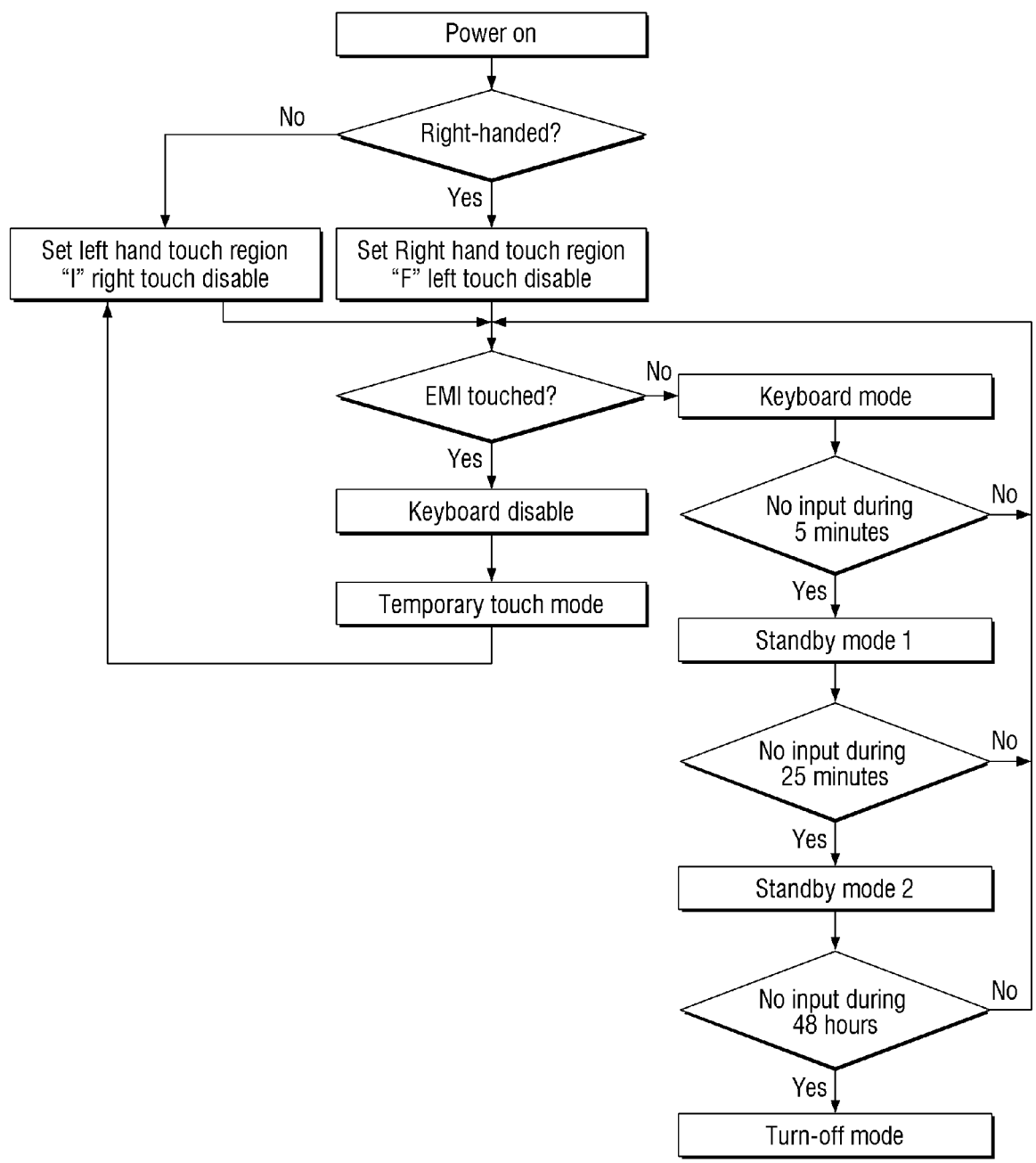
FIG. 23 is a flowchart illustrating a method for switching between a text input mode and a pointer location information input mode.

FIG. 23 is a flowchart illustrating a method for switching between a text input mode and a pointer location information input mode.

The electronic device having a multi-functional human interface device may have a right-handed mode and a left-handed mode.

The right-handed mode may set a touch region such that a user touch can be easily input to the touch region from a right hand of a user.

The left-handed mode may set a touch region such that a user touch can be easily input to the touch region from a left hand of a user.

The right-handed mode and the left-handed mode may be set on the electronic device having a multi-functional human interface device by a separate switch, at least two simultaneous text inputs, a predetermined touch pattern, a combination of a text input and a touch input, an input through a mode switching unit, and the like.

The electronic device having a multi-functional human interface device may include a first pointer execution instruction button and a second pointer execution instruction button operating by pressure applied from a user, and the first pointer execution instruction button and the second pointer execution instruction button may further include a sensor for sensing a user touch input, and the electronic device having a multi-functional human interface device may be switched to a temporary touch mode when a touch input is received to the first pointer execution instruction button and the second pointer execution instruction button.

The temporary touch mode may be cancelled and switched to a text input mode when the user touch is cancelled from the first pointer execution instruction button or the second pointer execution instruction button.

The first pointer execution instruction button may be disposed at a left side of the second pointer execution instruction button and adjacent to a left thumb of the user, and the second pointer execution instruction button may be disposed adjacent to a right thumb of the user.

When the electronic device having a multi-function human interface device is switched to the temporary touch mode through the touch sensor provided in the first pointer execution instruction button, the electronic device having a multi-functional human interface device may be switched to the right-handed mode.

The right-handed mode may set a right hand touch region 108b for receiving pointer location information such that a touch input by a right hand can be easily performed.

The right hand touch region 108b may be set to cover an area excluding a region on which a user's left hand finger is put to input text.

For example, a general keyboard-type multi-functional human interface may have layouts in which a left side from a Y-axis including character F key is set as an inactive touch region and a right side from a Y-axis including character G key is set as an active touch region.

When the electronic device having a multi-function human interface device is switched to the temporary touch mode through the touch sensor provided in the second pointer execution instruction button, the electronic device having a multi-functional human interface device may be switched to the left-handed mode.

The left-handed mode may set a left hand touch region 108a for receiving pointer location information such that a touch input by a left hand can be easily performed.

The left hand touch region 108a may be set to cover an area excluding a region on which a user's right hand finger is put to input text.

For example, a general keyboard-type multi-functional human interface may have layouts in which a right side from a Y-axis including character J key is set as an inactive touch region and a left side from a Y-axis including character H key is set as an active touch region.

Furthermore, an external device connected to the electronic device having a multi-functional human interface device may have a preset left or right mode.

The temporary touch mode may be switched to the right hand touch mode when, in US international keyboard layouts, user touch inputs are generated simultaneously from at least two among a plurality of multi-functional input buttons for generating input signals of characters Q, W, E, and R, and the right hand touch mode is cancelled and switched to a text input mode when the at least two user touch inputs are cancelled.

The temporary touch mode may be switched to the right hand touch mode when, in US international keyboard layouts, user touch inputs are generated simultaneously from at least two among a plurality of multi-functional input buttons for generating input signals of characters Z, X, C, and V, and the right hand touch mode is cancelled and switched to a text input mode when the at least two user touch inputs are cancelled.

The temporary touch mode may be switched to the left hand touch mode when, in US international keyboard layouts, user touch inputs are generated simultaneously from at least two among a plurality of multi-functional input buttons for generating input signals of characters U, I, O, and P, and the left hand touch mode is cancelled and switched to a text input mode when the at least two user touch inputs are cancelled.

The temporary touch mode may be switched to the left hand touch mode when, in US international keyboard layouts, user touch inputs are generated simultaneously from at least two among a plurality of multi-functional input buttons for generating input signals of characters M, <, >, and ?, and the left hand touch mode is cancelled and switched to a text input mode when the at least two user touch inputs are cancelled.

The multi-functional input buttons in which at least two touch inputs may occur simultaneously, may function as a first pointer execution instruction input or a second pointer execution instruction input of the pointer being controlled during execution of the temporary touch mode, when a pressure signal is further received during maintenance of the touch inputs.

The text input mode may be inactivated when the temporary touch mode is activated.

When the text input mode is inactivated, an exception may be made in which at least one text input is allowed.

Figure 24:
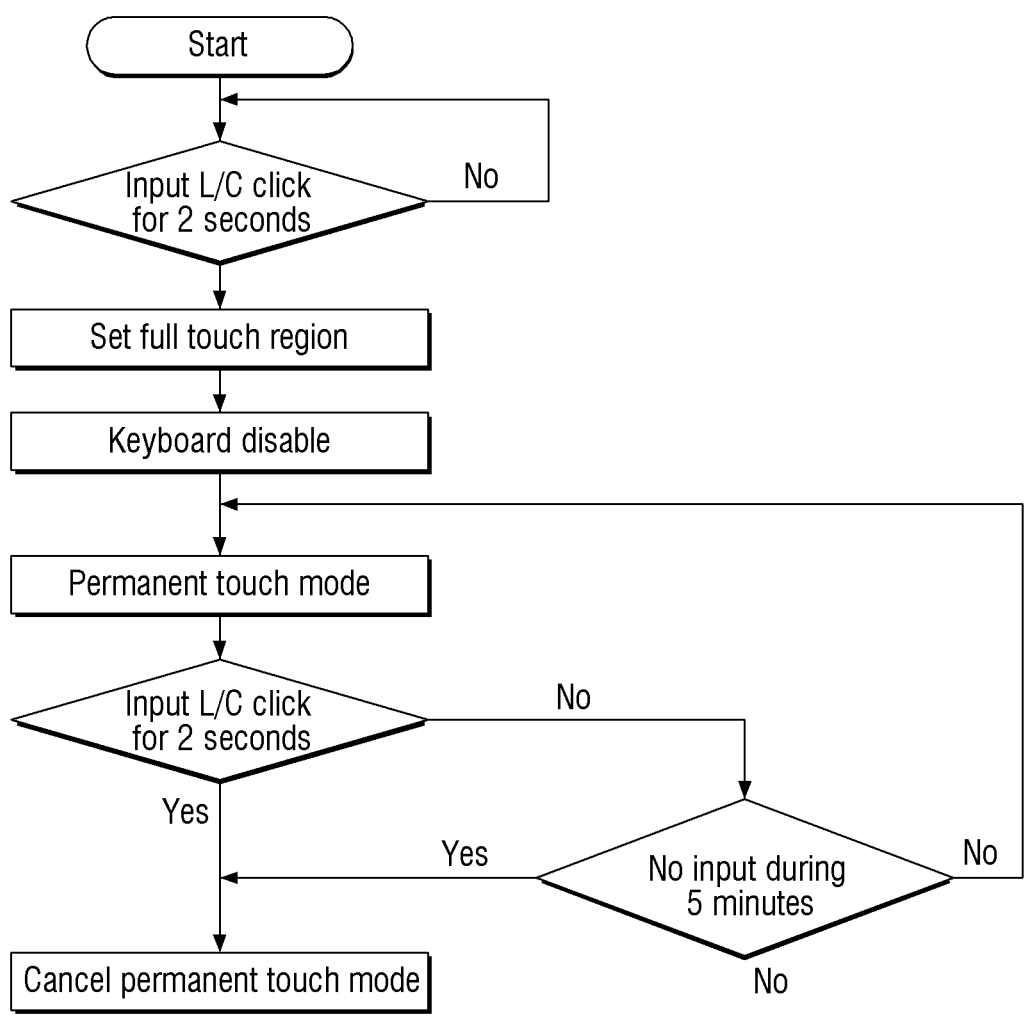
FIG. 24 is a flowchart illustrating a method for switching to a permanent touch mode.

FIG. 24 is a flowchart illustrating a method for switching to a permanent touch mode.

When the first pointer execution instruction button and the second pointer execution instruction button are pressed simultaneously for a preset time, the electronic device having a multi-functional human interface device may be set to a permanent touch mode.

The electronic device having a multi-functional human interface device may be set to a permanent touch mode by a separate switch, at least two simultaneous text inputs, a predetermined touch pattern, a combination of a text input and a touch input, an operation of a mode switching unit, and the like.

The permanent touch mode may receive a pointer location information input from a user without the need to maintain a separate user input for the pointer location information input.

For example, in the temporary touch mode, the electronic device having a multi-functional human interface device may be basically set to a text input mode, and switched to the temporary touch mode during maintenance of a separate user input, and the temporary touch mode may be cancelled and switched to the text input mode when the separate user input is cancelled.

In the permanent touch mode, the electronic device having a multi-functional human interface device may be basically set to the permanent touch mode, and the text input mode may be in activated.

The permanent touch mode may be cancelled under a preset condition.

For example, the permanent touch mode may be cancelled when there is no user input for a preset time in the set permanent touch mode.

The permanent touch mode may be cancelled when a predefined touch pattern, a predetermined button, a text input button in which the exception of inactivation is made, repeated text, and a plurality of pieces of text are simultaneously input in the set permanent touch mode.

The permanent touch mode may include at least a part of a touch region in the right hand touch mode and at least a part of a touch region in the left hand touch mode, and may have a region wider than the touch region in the right hand touch mode and the touch region in the left hand touch mode.

Preferably, the region of the permanent touch mode may be the sum of the touch region in the right hand touch mode and the touch region in the left hand touch mode.

Figure 25:
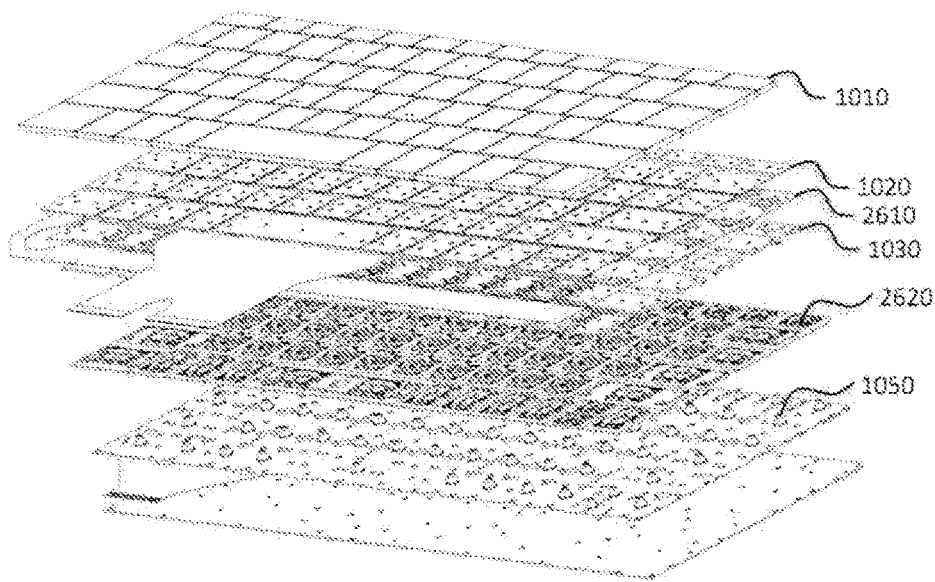
FIG. 25 illustrates a multi-functional input button module having a plurality of multi-functional input buttons provided in the shape of a plate.

FIG. 25 illustrates a multi-functional input button module having a plurality of multi-functional input buttons provided in the shape of a plate.

The module having a plurality of multi-functional input buttons produced in the shape of a plate may be used as a multi-keyboard module used in a notebook, a portable keyboard, a desktop keyboard, or an Internet TV input device.

The module may include a plurality of cover units 1010, a plurality of electrode units 1020, an electrical connection member 2610, a plurality of base units 1030, a balance maintenance unit 2620 configured to assist the cover units 1010 in vertically moving in parallel, and a plurality of elastic units 1050 in sequence.

Figure 26:
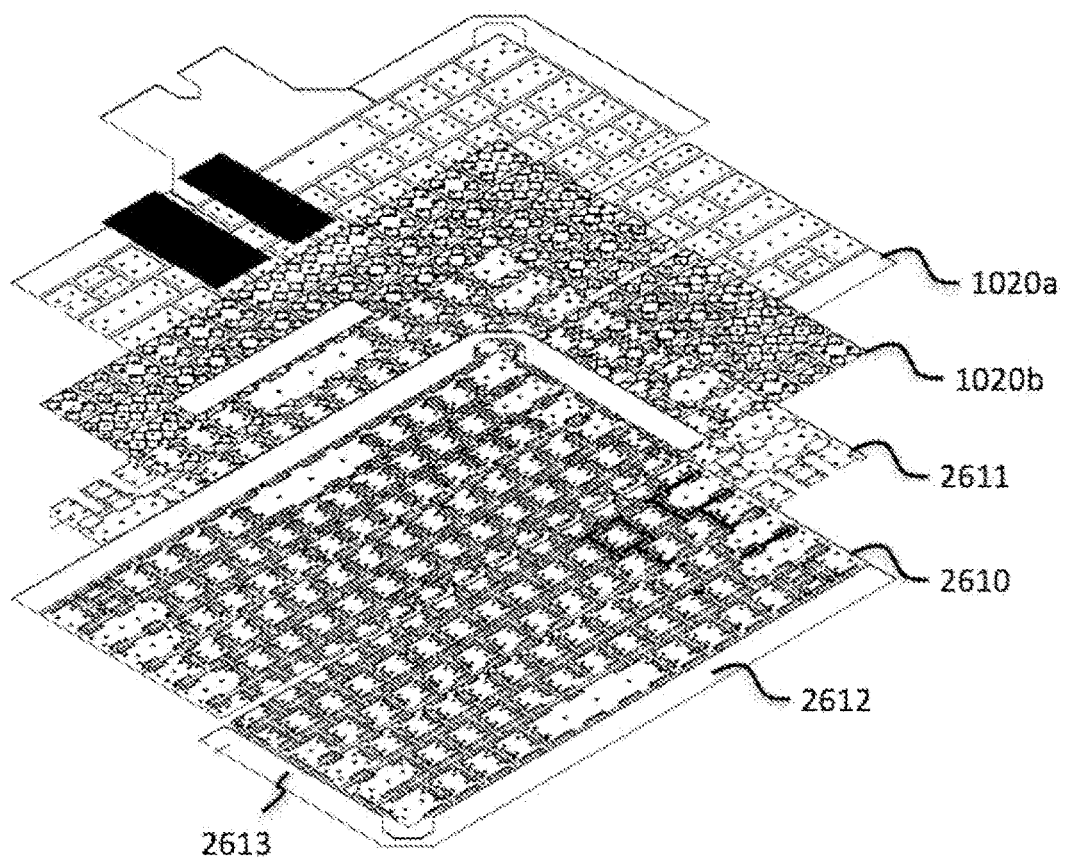
FIG. 26 illustrates an example of a detailed structure of the electrode unit 1020.

FIG. 26 illustrates an example of a detailed structure of the electrode unit 1020.

Each of the plurality of electrode units 1020 may be produced by a transmitter unit and a receiver unit being printed (1020*b*) with conductive inks on a film 1020*a* cut to fit the size of the cover units 1010 or produced in the form of a flexible printed circuit board (FPCB).

The electrical connection member 2610 may be produced in the form of an FPCB and may have contact points with at least one transmitter and at least one receiver of the electrode unit.

The electrical connection member 2610 and the electrode unit 1020 are attached to each other by using a conductive adhesive 2611 to allow electricity to flow through the contact points.

The electrical connection member 2610 may be integrated with the electrode unit 1020 in the form of an FPCB.

Figure 27:
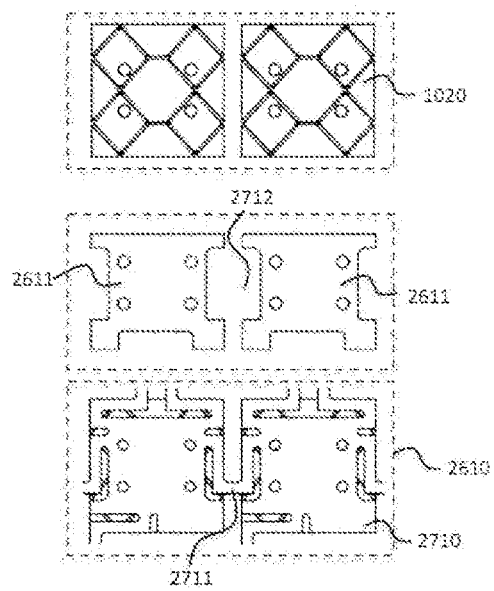
FIG. 27 illustrates an example of an adhesion part for a conductive adhesive.

FIG. 27 illustrates an example of an adhesion portion of a conductive adhesive.

The conductive adhesive may be used to attach a portion of the electrical connection member to a portion of the electrode unit.

In this case, a part 2712 other than the adhesion portion may be formed as a structure 2711 that is connected with an electrical connection member of an adjacent multi-functional input button and capable of being flexibly moved as the cover unit is moved member capable of being flexibly moved may be formed in the shape of an uppercase letter L and may be formed in the shape of an uppercase letter U along with an adjacent electrical connection member.

Such a shape shows optimal performance in maintaining a conduction state while minimizing physical resistance to a user even when positions of the electrical connection member and the adjacent multi-functional input button change vertically as the cover unit vertically moves.

The electrical connection member may be used to connect the plurality of electrode units to each other and may be connected with circuit layers placed on a first surface and a second surface.

A circuit layer 2613 placed on the first surface may generate a driver signal to be delivered to transmitters of the first to fifth multi-functional input buttons, and a circuit layer 2612 placed on the second surface may receive a scan signal from receivers of the first to fifth multi-functional input buttons.

The circuit layer may be connected with a control unit to generate a driver signal and receive a scan signal.

Figure 28:
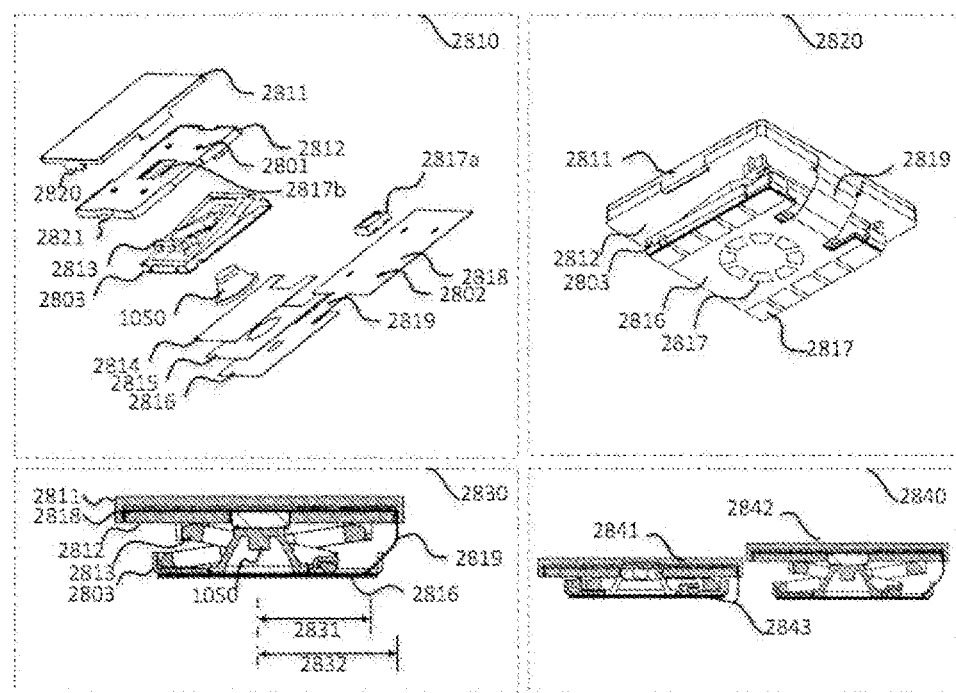
FIG. 28 illustrates an exemplary embodiment of a multi-functional input button.

FIG. 28 illustrates an exemplary embodiment of a multi-functional input button.

FIG. 28 includes a development view 2810 of the multi-functional input button, an assembly view 2820 of the multi-functional input button, a sectional view 2830 of the multi-functional input button, and a sectional view 2840 of the multi-functional input button when the cover unit is moved.

The multi-functional input button may include a cover unit 2811, an electrode unit 2818, a first base unit 2812, a balance maintenance unit 2813, an elastic unit 1050, a first circuit layer 2816, a second circuit layer 2815, a third circuit layer 2814, a second base unit 2803, and an electrical connection member 2819.

The multi-functional input button may further include a light emitting unit 2817, and the light emitting unit 2817 may be placed on the electrode unit or the circuit layer.

The electrode unit, the electrical connection member, and the circuit layer may be produced in the form of a single FPCB.

The first circuit layer 2816 may receive both of a pointer location information input signal and a text input signal.

The elastic unit may be adhered to the circuit layer. Thus, it is possible to remove an unnecessary layer and reduce a thickness thereof.

The cover unit and the base unit may have bonding members 2820 and 2821 so that the cover unit and the base unit are bonded to each other.

Alternatively, the cover unit and the base unit may have a column and a hole 2801, respectively, so that the cover unit and the base unit are bonded to each other.

The electrode unit may be inserted between the cover unit and the base unit and may be connected with the circuit layer through the electrical connection member.

The circuit layer may be adhered to the second base unit.

The circuit layer may be connected with an electrical connection member of a single multi-functional input button and may be connected to the control unit through a separate circuit layer.

The circuit layer may be connected with electrical connection members of the plurality of multi-functional input buttons and thus may be connected to the control unit.

The width 2832 of the electrode unit may be greater than the width 2831 of the circuit layer. Thus, it is possible to minimize movement of the electrical connection member and minimize physical resistance to the user when the cover unit is moved.

The electrical connection member 2819 may be formed of flexible material to change in shape when the cover unit moves.

The electrical connection member 2819 may change in shape while moving to a position 2843 lower than that of the second base unit when the cover unit moves.

Figure 29:
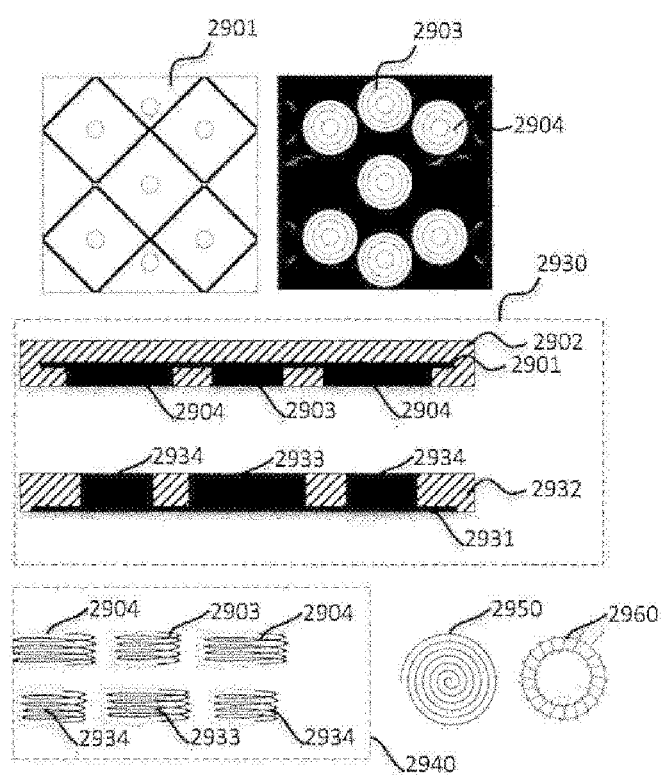
FIG. 29 illustrates an exemplary embodiment of a wireless electrical connection member.

FIG. 29 illustrates an exemplary embodiment of a wireless electrical connection member.

FIG. 29 shows a portion 2930 of the multi-functional input button other than the elastic unit and the balance maintenance unit of the multi-functional input button.

The multi-functional input button may include a cover unit 2902, an electrode unit 2901, first electrical connection members 2903 and 2904, second electrical connection members 2933 and 2934, a base unit 2932, and a circuit layer 2931.

The first electrical connection members 2903 and 2904 may include an electrical connection member 2903 connected with a transmitter and an electrical connection member 2904 connected with a receiver.

The second electrical connection members 2933 and 2934 may include an electrical connection member 2933 corresponding to the electrical connection member 2903 connected with the transmitter and an electrical connection member 2934 corresponding to the electrical connection member 2904 connected with the receiver.

The first electrical connection members and the second electrical connection members may deliver electrical signals to each other in a wired manner while the first electrical connection members and the second electrical connection members are not physically attached to each other.

The first electrical connection members and the second electrical connection members may deliver electrical signals to each other in a wired manner by using high frequency signals.

The first electrical connection members and the second electrical connection members may deliver electrical signals to each other in a wired manner by using an electrostatic induction method.

The first electrical connection members and the second electrical connection members may be formed by at least one of a method 2940 for a coil having several turns, a spiral method 2950, and a method 2860 of winding around an insulator.

An electronic device having a multi-functional human interface may include first to fifth multi-functional input buttons and a circuit layer configured to deliver a signal received from the input buttons to a control unit. Each of the multi-functional input buttons may include an electrode unit composed of a transmitter unit and a receiver unit and configured to receive a touch input from the user, an electrical connection member connected with the electrode unit, and a switch configured to generate a text input signal in response to physical pressure from the user. The transmitter unit may have first and second transmitters having different driver signal occurrence timings. The receiver unit may have at least two first and second receivers having different scan timings. The electrical connection member may be electrically connected with the electrode unit and the circuit layer even when relative positions of the electrode unit and the circuit layer are changed due to the physical pressure from the user.

The first receiver of the fourth multi-functional input button may have the same scan timing as the second receiver of the second multi-functional input button, and the second receiver of the fourth multi-functional input button may have the same scan timing as the first receiver of the first multi-functional input button.

The first transmitters of the first to third multi-functional input buttons may have a first driver signal occurrence timing. The second transmitters of the first to third multi-functional input buttons may have a second driver signal occurrence timing. The first driver signal occurrence timing may be different from the second driver signal occurrence timing.

The second transmitter of the fourth multi-functional input button may have a third driver signal occurrence timing. The first transmitter of the fifth multi-functional input button may have a fourth driver signal occurrence timing. The third driver signal occurrence timing, the first driver signal occurrence timing, the second driver signal occurrence timing, and the fourth driver signal occurrence timing may be in sequence.

The first receiver of the fifth multi-functional input button may have the same scan timing as the second receiver of the first multi-functional input button, and the second receiver of the fifth multi-functional input button may have the same scan timing as the first receiver of the third multi-functional input button.

A multi-functional human interface having the circuit layer, the electrode unit of the first multi-functional input button, and the electrical connection member of the first multi-functional input button formed as a single FPCB may be provided.

A multi-functional human interface having the electrode units of the first to fifth multi-functional input buttons, the electrical connection members of the first to fifth multi-functional input buttons, and the circuit layer formed as a single FPCB may be provided.

The electrical connection member may have a first lead connected with the electrode unit and a second lead connected with the circuit layer, and the first lead and the second lead may change in relative position but maintain electrical connection therebetween when a pressure signal is applied by the user.

The electrical connection member may have a first lead connected with the electrode unit and a second lead connected with the circuit layer, and the first lead and the second lead may change in relative position when a pressure signal is applied by the user and may be separated a certain distance or more from each other to transmit electrical signals by using an electromagnetic induction phenomenon.

The electrical connection member may have a first lead connected with the electrode unit and a second lead connected with the circuit layer, and the first lead and the second lead may change in relative position when a pressure signal is applied by the user and may be separated a certain distance or more from each other to transmit electrical signals by using high frequency signals.

The electrical connection member may be formed of an elastic material to electrically connect the electrode unit with the circuit layer. When the electrode unit is moved by a pressure signal from the user, a force may occur in a direction opposite to the pressure signal from the user. When the pressure signal from the user is removed, the electrode unit may be returned to a position before the movement.

The first receiver of the fourth multi-functional input button may have the same scan timing as the first receiver of the first multi-functional input button, and the second receiver of the fourth multi-functional input button may have the same scan timing as the second receiver of the first multi-functional input button and the first receiver of the fifth multi-functional input button.

The first transmitter of the fourth multi-functional input button may have the same driver signal occurrence timing as the first transmitter of the first multi-functional input button, and the second transmitter of the fourth multi-functional input button may have the same driver signal occurrence timing as the second transmitter of the first multi-functional input button and the first transmitter of the fifth multi-functional input button.

The first receivers of the first to third multi-functional input buttons may have a first scan timing. The second receivers of the first to third multi-functional input buttons may have a second scan timing. The first scan timing may be different from the second scan timing.

The second receiver of the fourth multi-functional input button may have a third scan timing. The first receiver of the fifth multi-functional input button may have a fourth scan timing. The third scan timing, the first scan timing, the second scan timing, and the fourth scan timing may be in sequence.

The first transmitter of the fourth multi-functional input button may have the same driver signal occurrence timing as the second transmitter of the second multi-functional input button, and the second transmitter of the fourth multi-functional input button may have the same driver signal occurrence timing as the first transmitter of the first multi-functional input button.

The first transmitter of the third multi-functional input button may have the same driver signal occurrence timing as the second transmitter of the fifth multi-functional input button.

The multi-functional input button may further include a first control unit, and the first control unit may process a touch signal and a text input signal that are received from the multi-functional input button and may transmit the processed touch signal and text input signal to a second control unit.

The circuit layer may include a driver signal generation unit configured to deliver a driver signal to the transmitters of the first to fifth multi-functional input buttons and a scan signal reception unit configured to receive a scan signal from the receivers of the first to fifth multi-functional input buttons.

The first to fifth multi-functional input buttons may include a plurality of electrical connection members. The first multi-functional input button may be connected with the electrical connection members of the second to fifth multi-functional input buttons. The second multi-functional input button may be connected with the electrical connection members of the first and fourth multi-functional input buttons. The third multi-functional input button may be connected with the electrical connection member of the first multi-functional input button. The fourth multi-functional input button may be connected with the electrical connection members of the first and second multi-functional input buttons. The fifth multi-functional input button may be connected with the electrical connection members of the first and third multi-functional input buttons.

FIGS. 1 to 29 illustrate an exemplary embodiment of a text input device integrated with a pointing device as the electronic device having a multi-functional human interface device, and the types of the text input device and the pointing location information input device and techniques used herein may be changed or replaced by a person skilled in the art without departing from basic purposes.

Figure 30:
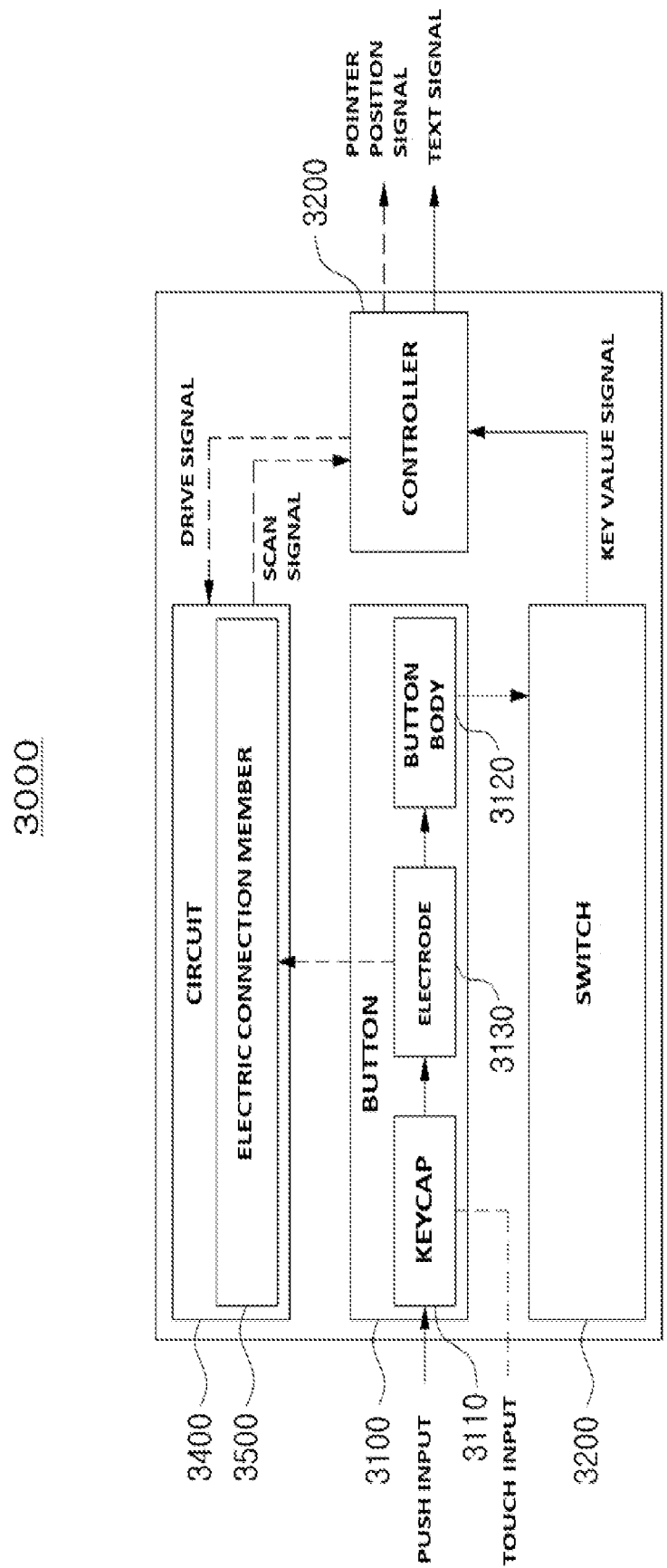
FIG. 30 is an example of a block diagram of a pointing-device-integrated text input device.

FIG. 30 is an example of a block diagram of a pointing-device-integrated text input device 3000.

Referring to FIG. 30, the pointing-device-integrated text input device 3000 according to an embodiment of the present invention may include a button 3100 configured to receive a push input or a touch input from a user, a switch 3200 configured to acquire a key value when the button is depressed according to the push input, an electric connection member 3300 configured to form a circuit 3400 acquired by a change in capacitance of an electrode 3130 included in the button 3100 according to the touch input, and a controller 3500 configured to process various types of information and electric signals in addition to calculation of a touch coordinate value based on the change in capacitance.

Here, the push input, which is a user input in which physical pressure is applied to the button 3100, refers to a user input for inducing the button 3100 to be depressed by a predetermined distance or more and enabling the button 3100 to induce the switch 3200 to output a key value allocated to the switch 3200 when the button 3100 comes into contact with the switch 3200 or pushes the switch 3200. In this description, the push input may be mainly used as a user input for text input when the pointing-device-integrated text input device 3000 is utilized as a keyboard interface.

Also, the touch input, which is a user input in which the button 3100 is touched, refers to a user input for inducing a change in capacitance of the electrode 3130 built into the button 3100. In this case, when the change in capacitance is a predetermined touch threshold value or more, the capacitance change may be understood as being the touch input. In this description, the touch input may be mainly used as a user input for controlling a position of a pointer P when the pointing-device-integrated text input device 3000 is utilized as a mouse interface or a digitizer interface.

The pointing-device-integrated text input device 3000 may be provided in an overall form of a keyboard, similarly to that shown in FIG. 9, or may be provided in the form of a notebook combined with a display and a keyboard, as shown in FIG. 8.

A plurality of buttons 3100 that are arranged according to a predetermined keyboard layout may be included in the pointing-device-integrated text input device 3000. Here, the button 3100 may correspond to the multi-functional input button that has been described with reference to FIG. 10, 14, 25, 28, and the like.

The button 3100 may include a keycap 3110, a button body 3120, and an electrode 3130. Here, the keycap 3110 and the button body 3120 may be disposed on an upper portion and a lower portion of the button 3100, respectively, and the electrode 3130 may be interposed between the keycap 3110 and the button body 3120. That is, the button 3100 may be provided by sequentially stacking and combining the keycap 3110, the electrode 3130, and the button body 3120.

The keycap 3110 may be disposed on a top surface of the button 3100, that is, an exposed surface on the keyboard layout. The keycap 3110 may come into direct contact with a user's finger. That is, the user may perform a push input for typing by pressing the keycap 3110, or may perform a touch input for pointer control (e.g., movement of a mouse cursor) by touching the keycap 3110. For convenience of typing, a character or the like allocated to the button may be printed on the keycap 3110.

The button body 3120 may be disposed under the keycap 3110. The button body 3120 may be moved vertically, that is, be moved upward and downward, when the push input is vertically applied thereto through the keycap 3110. When the button body 3120 is moved downward, the button body 3120 may physically push the switch 3200 or may come into electrical contact with the switch 3200. As will be described below, the switch 3200 may acquire a key value allocated to the button 3100 through such an operation.

The electrode 3130 is interposed between the keycap 3110 and the button body 3120. When a touch input is applied to the keycap 3110, the capacitance of the electrode 3130 changes such that the electrode 3130 may sense the touch input.

The electrode 3130 may be composed of a plurality of blocks 3130'. Some of the blocks 3130' may form a first block group 3131 in which the blocks are electrically connected in a first direction, which is any one of a length direction and a width direction of the keyboard layout. The other of the blocks 3130' may form a second block group 3132 in which the blocks are electrically connected in a second direction, which is different from the first direction and is the other one of the length direction and the width direction of the keyboard layout. Here, the first block group 3131 and the second block group 3132 being electrically connected should be interpreted as including a case in which the blocks 3130' forming the block groups 3131 and 3132 are directly physically and electrically connected and also a case in which the blocks 3130' are indirectly physically connected through an electrical connection means such as electric wires or conductors.

In detail, the electrode 3130 may be provided in a similar way to the electrode unit 1130 shown in FIG. 11.

Here, like the electrode unit 1130, the electrode 3130 may be composed of a plurality of blocks 1101, 1102, 1103, 1104, 1105, 1106, 1107, 1108, 1109, 1110, 1111, 1112, and 1113. Here, some of the blocks may be electrically connected in a horizontal direction or a vertical direction to form a block group. For example, a block group of FIG. 11 in which blocks are horizontally connected (e.g., a block group formed by three blocks 1101, 1102, and 1103, a block group formed by three other blocks 1104, 1105, and 1106, and a block group formed by three other blocks 1107, 1108, and 1109) may be one of the first block group 3131 and the second block group 3132. Also, a block group of FIG. 11 in which blocks are vertically connected (e.g., a block group formed by two blocks 1110 and 1111 and a block group formed by two other blocks 1112 and 1113) may be the other one of the first block group 3131 and the second block group 3132.

The keycap 3110 may corresponding to the above-described cover unit, the button body 3120 may corresponding to the above-described base unit or upper support unit, and the electrode 3130 may correspond to the above-described electrode unit. For example, the keycap 3110 may be one of the cover units that have been described with reference to FIGS. 10, 14, 25, and 28. For example, the button body 3120 may be one of the base unit 1030 and 2932 and the upper support unit 1040 that have been described with reference to FIGS. 10, 14, 25, and 28. For example, the electrode 3130 may be the electrode unit 1020 that has been described with reference to FIGS. 10, 14, 25, and 28.

Moreover, a structure of the button 3100 has been sufficiently described with reference to FIGS. 10, 14, 25, and 28, and thus a detailed description thereof will be omitted. Likewise, a form of the electrode 3130 has been sufficiently described with reference to FIGS. 11 to 13 and 18 to 22, and a detailed description thereof will also be omitted.

The switch 3200 is located under the button 3100. For example, the switch 3200 may be disposed under the button 3100 such that a plurality of switches 3200 correspond to the plurality of buttons 3100 on a substrate located under a button layer in which the buttons 3100 are arranged according to the keyboard layout.

When the button 3100 is moved downward according to a vertical push input of the user, the switch 3200 may be brought into contact with the button 3100 or may be pressed by the button 3100. Thus, the switch 3200 may acquire or output a key value corresponding to the button 3100.

A detailed structure of the switch 3200 has been described with reference to FIGS. 4, 10, and 28, and thus a detailed description thereof will be omitted.

The electric connection member 3300 may connect the block groups 3131 and 3132 between the plurality of buttons 3100 to form the circuit 3400. Here, the electric connection member 3300 may be provided in the form of pins such as first conductors 1080 and 1441 attached to the upper support unit 1040 and second conductors 1090 and 1442 attached to the lower support units 1050 and 1060, as shown in FIG. 10 or 14. In addition, the electric connection member 3300 may be provided in the forms shown in FIGS. 10, 14, 27, and 29. In summary, a representative aspect of the electric connection member 3300 may be implemented as a pattern printed on a FPCB or may be formed as conductors installed on the substrate at which the switch is installed and at the button 3100 that is moved upward.

The electric connection member 3300 may establish electrical connections between blocks 3030' that are not directly physically connected on the surface of the electrode 3130 among a plurality of blocks 3030' of an electrode 3130 belonging to a single button 3100.

Also, by connecting block groups 3131 and 3132 formed at an electrode 3130 of each of a plurality of adjacent buttons 3100, the electric connection member 3300 may consecutively connect the block groups 3131 and 132 for the plurality of buttons 3100.

For example, the electric connection member 3300 may form a drive line by consecutively connecting first block groups 3131 of an electrode 3130 belonging to a plurality of buttons 3100 arranged in the first direction, which is any one of the length direction and the width direction of the keyboard layout. As another example, the electric connection member 3300 may form a scan line by consecutively connecting second block groups 3132 of an electrode 3130 belonging to a plurality of buttons 3100 arranged in the second direction, which is the other one of the length direction and the width direction of the keyboard layout.

Here, the first block group 3131 arranged on the drive line may correspond to the above-described transmitter, and the second block group 3132 arranged on the scan line may correspond to the above-described receiver.

A drive signal is applied to the drive line. The drive signal may be applied to the first block groups 3131 located on the drive line by the electric connection member 3300 to induce capacitance in the electrode 3130. Also, a scan signal, which reflects that the capacitance induced for the electrode 3130 by the drive signal is changed due to a touch input of the user, may be processed in the scan line. The scan signal may be a signal for detecting a change in capacitance in the second block groups 3132 located on the scan line by the electric connection member 3300.

A configuration of the drive line and the scan line and processing of the drive signal and the scan signal have been described above in detail with reference to FIGS. 11 to 13 and 18 to 22, and thus a detailed description will be omitted.

The controller 3500 may be implemented as a central processing unit (CPU) or the like in hardware, software, or a combination thereof. In hardware, the controller 3500 may be provided in the form of an electronic circuit that process electrical signals to perform a control function. In software, the controller 3500 may be provided in the form of a program, an application, or firmware that is processed by the hardware controller 3500.

The controller 3500 may process electronic signals or information and perform calculations. Thus, the controller 3500 may process an overall operation of the pointing-device-integrated text input device 3000 or may control each element of the pointing-device-integrated text input device 3000. For example, the controller 3500 may acquire a scan signal from the scan line and calculate a touch coordinate value on the basis of the scan signal. As another example, the controller 3500 may perform a mode switching operation of the pointing-device-integrated text input device 3000.

In addition, the controller 3500 may process and perform various kinds of functions or operations of the pointing-device-integrated text input device 3000. This will be described below in detail. In this description, the functions or operation of the pointing-device-integrated text input device 3000 may be interpreted as being performed under control of the controller 3500 unless specially stated otherwise.

Figure 31:
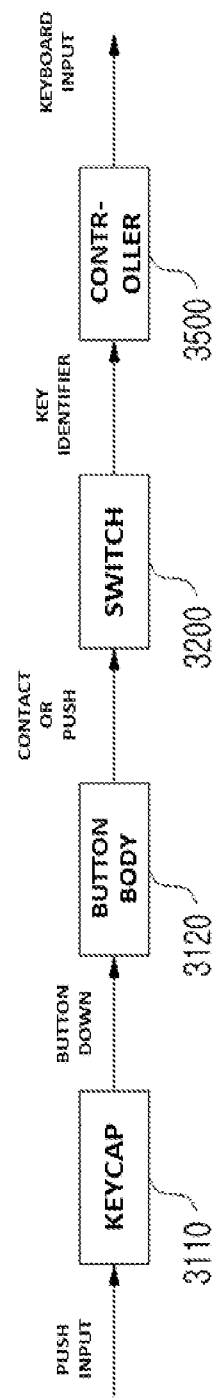
FIG. 31 is an example in which the pointing-device-integrated text input device of FIG. 30 performs signal processing on a text input.

FIG. 31 is an example in which the pointing-device-integrated text input device 3000 of FIG. 30 performs signal processing on a text input.

Referring to FIG. 31, according to the pointing-device-integrated text input device 3000, when a predetermined button 3100 receives a push input from a user, the button 3100 is moved downward and comes into contact with or presses a switch 3200 matched to the button 3100, and thus the switch 3200 generates an electric signal. The generated electric signal may include identification information (i.e., a key identifier) of the switch 3200. The controller 3500 receives the electric signal and outputs a key value corresponding to the button 3100 that received the push input as a keyboard input on the basis of the received electric signal.

Here, the key value, which is reflected or included in the keyboard input, may be a character value. However, the key value is not always a character value. For example, buttons 3100 corresponding to function keys (F1 to F12 keys, an END key, a SHIFT key, a Print Screen key, an ESC key, direction keys, etc.) may have function values as key values instead of character values. However, in this description, there is no benefit in distinguishing between the key value and the character value in most cases, and thus the key value and the character value are considered to conceptually correspond to each other when necessary.

The key value and the key identifier have different concepts. For example, two or more keys may be set for one button 3100. For example, a lowercase "a" may be allocated to a button to which an uppercase "A" is allocated. In this case, even when the same key identifier is received from the switch 3200, the controller 3500 may select one of "A" and "a" as a key value depending on whether the point-device-integrated text input device 3000 is in an uppercase input mode or a lowercase input mode.

Figure 32:
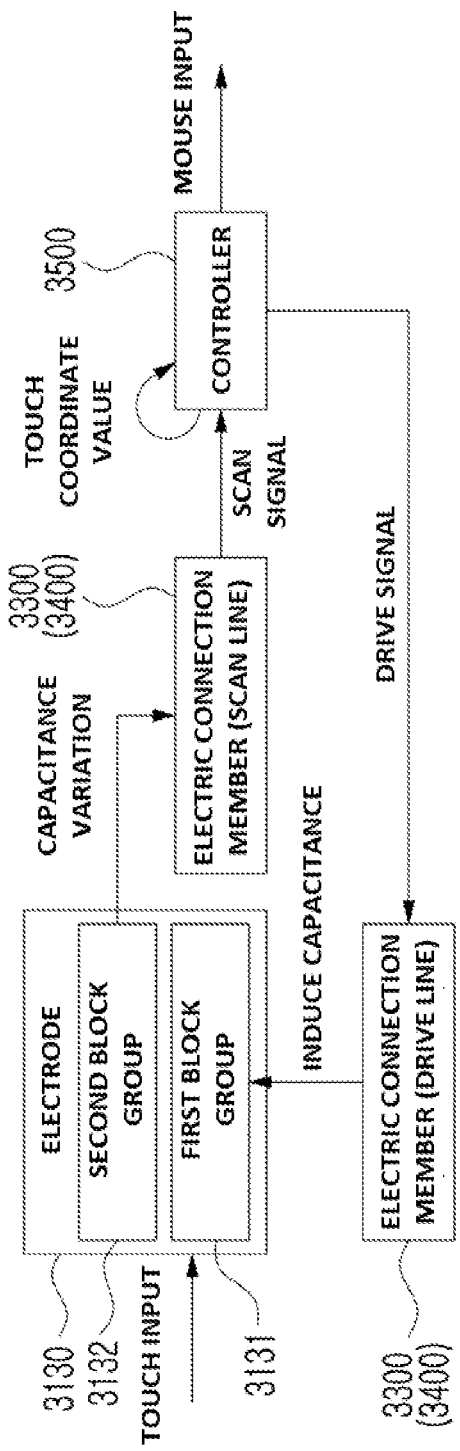
FIG. 32 is an example in which the pointing-device-integrated text input device of FIG. 30 performs signal processing on a mouse input.

FIG. 32 is an example in which the pointing-device-integrated text input device 3000 of FIG. 30 performs signal processing on a mouse input.

Referring to FIG. 32, the pointing-device-integrated text input device 3000 may apply and/or receive a drive signal and a scan signal to and/or from the electrode 3130. The drive signal and the scan signal may be output by the controller 3500 and then transmitted to and/or received from the first block group 3131 and the second block group 3132 through the drive line and the scan line formed by the electric connection member 3300, respectively. Capacitance induced by the drive signal in the electrode 3130 may change due to a touch input of a user, and the controller 3500 receives a scan signal that reflects the amount of change.

The controller 3500 may calculate a touch coordinate value in consideration of a drive signal period, a scan signal period, and a change in capacitance reflected by a scan signal for each scan signal period in a plurality of drive lines and a plurality of scan lines, and may acquire and output touch information including the calculated touch coordinate value. Typically, the touch coordinate value may have a form of (x, y) including an x coordinate value corresponding to a lateral direction on a display and a y coordinate value corresponding to a longitudinal direction on the display. Also, the controller 3500 may acquire touch information including time information as well as the touch coordinate value. The touch information may have a form of (x, y, t) further including a touch input time t of the touch input that caused the touch coordinate value. However, in this description, there is no benefit in distinguishing between the touch coordinate value and the touch information in most cases, and thus the touch coordinate value and the touch information should be interpreted as being interchangeably used unless specially stated otherwise.

The controller 3500 may acquire a mouse input on the basis of the touch coordinate value (or the touch information) and output the acquired mouse input. Here, the mouse input may be slightly different from the touch coordinate value. Typically, the mouse input may have a form of (x', y') or (x', y', t). A difference between the mouse input and the touch coordinate value will be described in detail below.

Here, the mouse input may refer to an input that is mainly output by a mouse interface to control the position of the pointer P displayed on the display. For example, an electronic device such as a personal computer (PC), a notebook, a smartphone, a tablet, or the like may use a mouse input to control the position of the pointer P displayed on the display. The controller 3500 of the pointing-device-integrated text input device 3000 may generate a mouse input on the basis of the touch coordinate value or the touch information, and transmit the generated mouse input to the electronic device. When the mouse input is received, the electronic device may move the position of the pointer P displayed on the display according to the mouse input by means of an operating system or a mouse driver interface.

It should be appreciated that, when the pointing-device-integrated text input device 3000 is embedded in the electronic device as shown in FIG. 8, the controller 3500 may move the position of the pointer P according to an autonomously generated mouse input or may deliver a mouse input to a separate operation unit for processing an operating system or a mouse driver interface so that the operation unit can control the position of the pointer P.

The aforementioned mouse input may be generated through the following process.

When a user enters a touch input in a touch region 3010 formed on the pointing-device-integrated text input device 3000, the controller 3500 may receive a scan signal reflecting a change in capacitance detected by the electrode 3130 in real time from a scan line and may calculate a touch coordinate value on the basis of the scan signal. Here, the touch region 3010, which is a region formed on the pointing-device-integral text input device 1000, refers to a region in which the controller 3500 may detect the user's touch input and calculate a touch coordinate value thereof. Generally, the touch region 3010 may be formed on buttons 3100 having an electrode 3130 among a plurality of buttons 3100.

Next, the controller 3500 may calculate a touch coordinate variation on the basis of the touch coordinate value. Here, the touch coordinate value may correspond to the above-described form (x, y), and the touch coordinate variation may correspond to a form (x', y'). In detail, the controller 3500 may calculate the touch coordinate variation through a difference operation of a current touch coordinate value and a previous touch coordinate value. In this case, the current touch coordinate value may be a touch coordinate value calculated using a scan signal acquired over a current scan signal period, and the previous touch coordinate value may be a touch coordinate value calculated using a scan signal acquired over a scan signal period directly before the current scan signal period.

Here, the touch coordinate variation may refer to a "relative coordinate value" because the touch coordinate variation is a difference between the current touch coordinate value and the previous touch coordinate value.

The controller 3500 may acquire the touch coordinate variation as a mouse input and output the mouse input. An electronic device, a separate internal operation unit, or the controller 3500 that acquires the mouse input may move the pointer P on the display or control the position of the pointer P according to the mouse input.

Unlike the above description, instead of acquiring a touch coordinate variation as a mouse input and outputting the acquired touch coordinate variation, the controller 3500 may deliver touch information and also identification information indicating that the touch information is a mouse input to an electronic device or a separate internal operation unit, and may induce the electronic device or the internal operation unit to autonomously generate a mouse input and perform position control on the pointer P.

Figure 33:
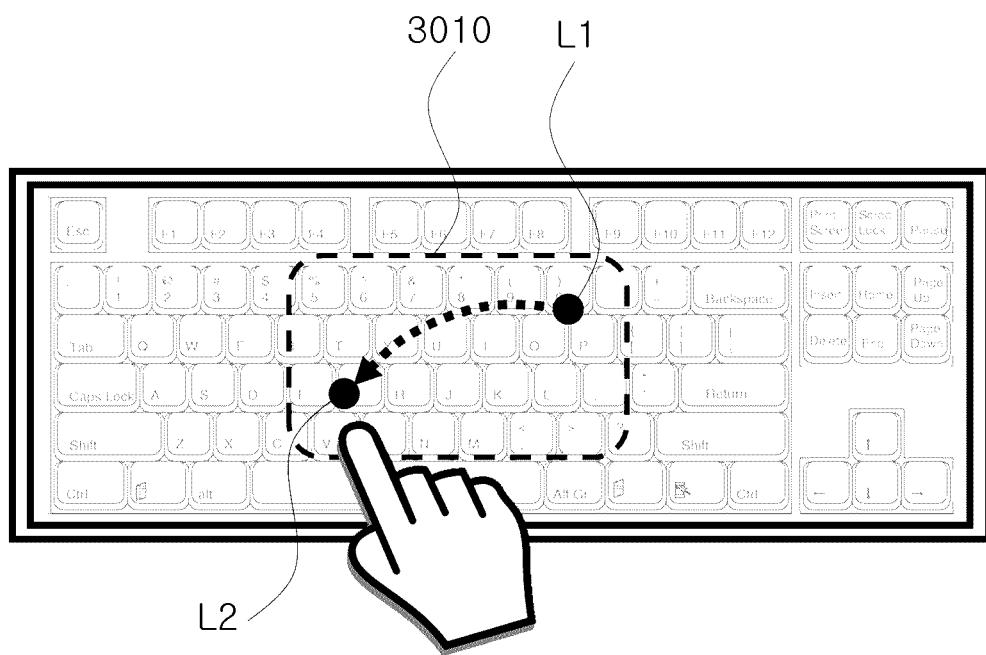
FIGS. 33 and 34 are an example of an operation of a pointer corresponding to the mouse input of FIG. 32.
Figure 34:
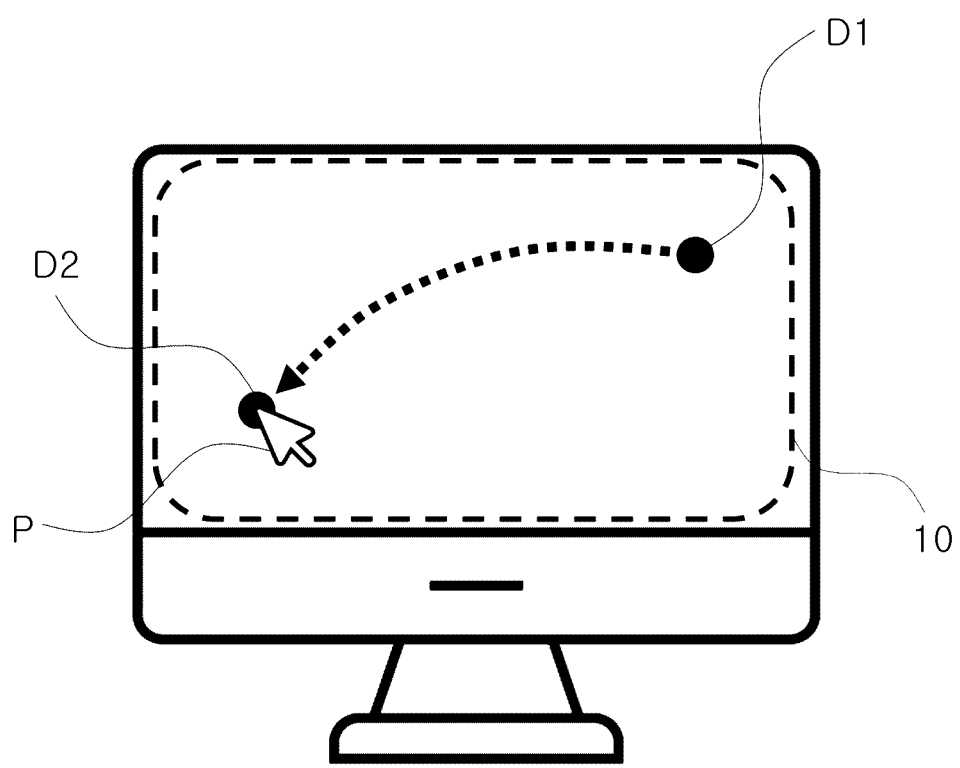

FIGS. 33 and 34 are an example of an operation of the pointer P corresponding to the mouse input of FIG. 32.

Referring to FIG. 33, a user may enter a touch input for dragging the pointer P from a first location L1 to a second location L2 in the touch region 3010. The controller 3500 may calculate a touch coordinate value corresponding to the touch input in real time, acquire a touch coordinate variation through a difference operation of the calculated coordinate value, and output the touch coordinate variation as a mouse input.

Referring to FIG. 34, the pointer P being displayed on the screen 10 may be processed by such a mouse input to move along a path corresponding to a drag path. As a result, the pointer P may be moved from a first point D1 on the screen 10 corresponding to the first location L1 in the touch region 3010 to a second point D2 corresponding to the second location L2.

Figure 35:
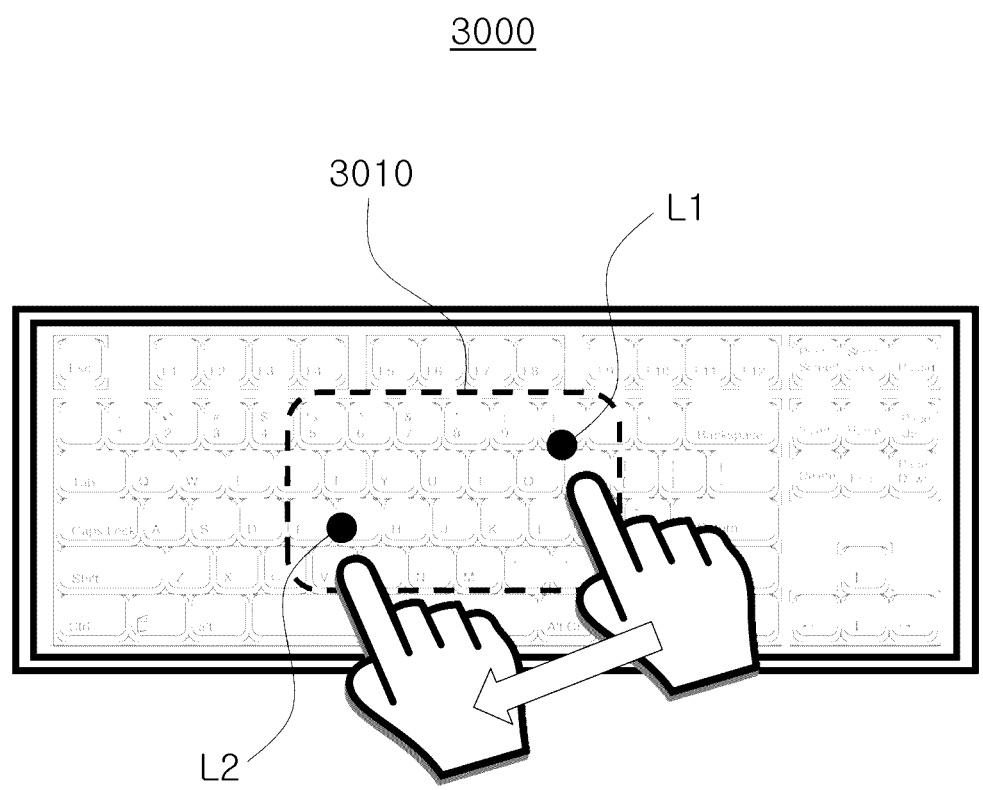
FIGS. 35 and 36 are another example of an operation of the pointer corresponding to the mouse input of FIG. 32.
Figure 36:
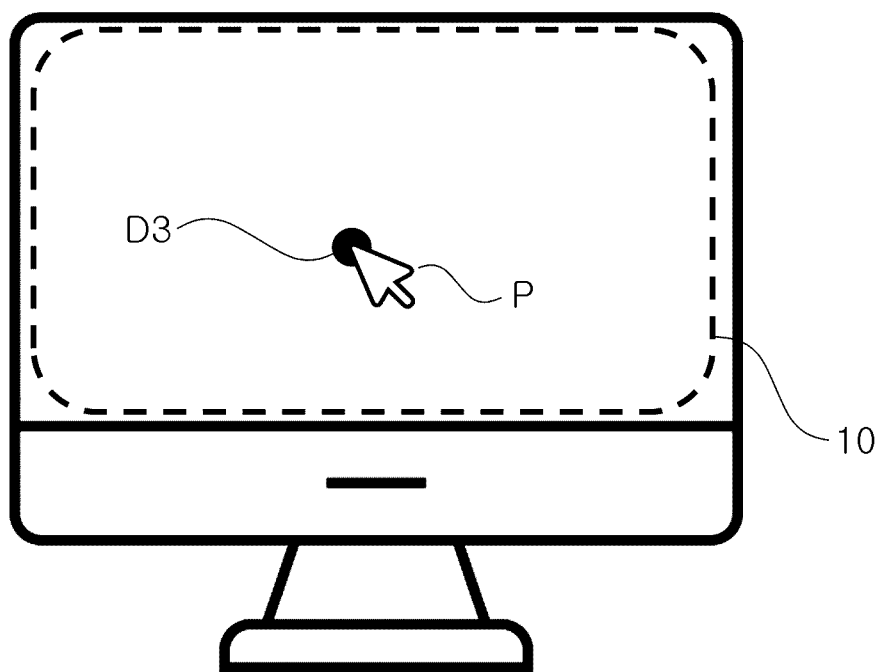

FIGS. 35 and 36 are another example of an operation of the pointer P corresponding to the mouse input of FIG. 32.

Referring to FIG. 35, a user may enter a touch input in which the first location L1 in the touch region 3010 is touched and then enter a touch input in which the second location L2 is touched without any other touch input. For example, this is a case in which the user touches the first location L1, lifts his or her finger, and then touches the second location L2. When two such touch inputs are generated, the controller 3500 does not generate a touch coordinate variation because the two touch inputs have an interval of a predetermined time period or more, and thus a continuous difference in touch coordinate value does not occur. That is, the controller may calculate "0" as the relative coordinate value, which is the mouse input.

Accordingly, referring to FIG. 36, the pointer P displayed on the screen 10 may be processed by the mouse input so as not to move from a third point D3 at which the pointer P is displayed on the screen 10 when the first location L1 is touched.

Figure 37:
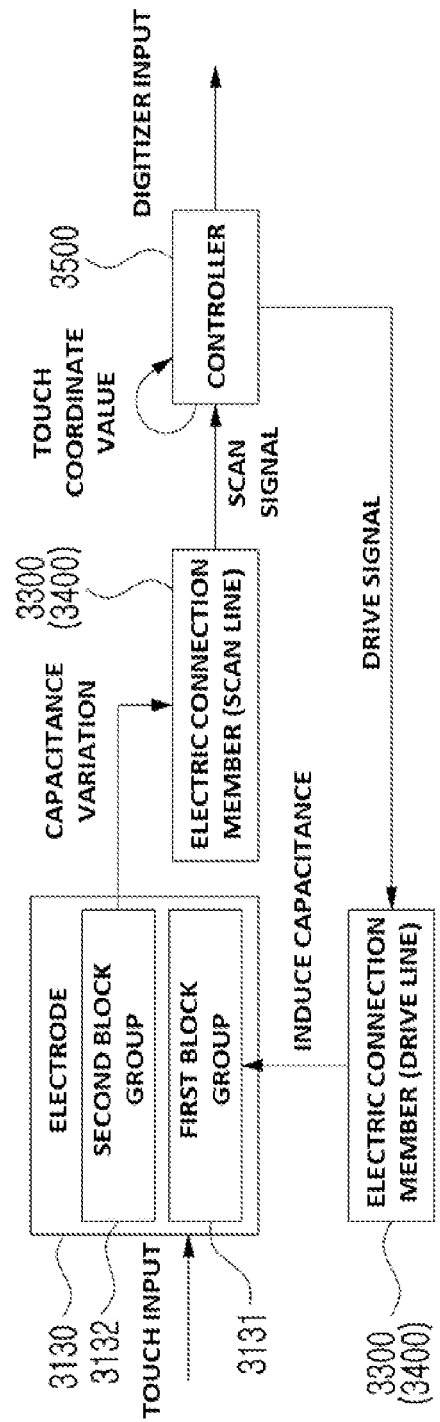
FIG. 37 is an example of digitizer input signal processing of the pointing-device-integrated text input device of FIG. 30.

FIG. 37 is an example of digitizer input signal processing of the pointing-device-integrated text input device 3000 of FIG. 30.

Touch information to be described with reference to FIG. 37 may be processed as a digitizer input that is slightly different from the mouse input.

The mouse input has a form of a sensing point difference value that is generated while a mouse moves or a touch moves on a touch screen, that is, a form of a relative coordinate value. The mouse input is used to move the position of the pointer P. The digitizer input is an input having a form in which the touch region 3010 corresponds to the displayed screen 10. That is, the digitizer input has touch coordinate values of touch regions 3010 corresponding to specific points on the screen 10. Typically, the digitizer input has advantages in creating drawings, designs, or design drawings because the touch region 3010 itself is matched to the screen 10. Accordingly, conventional digitizer interfaces are frequently used in various industrial areas or art and design areas in place of a mouse.

In this description, the controller 3500 of the pointing-device-integrated text input device 3000 may generate a digitizer input on the basis of the touch coordinate value or the touch information and transmit the digitizer input to an electronic device such as a PC, a notebook, a smartphone, or a tablet that controls the position of the pointer P according to the digitizer input. When the digitizer input is received, the electronic device may move the position of the pointer P displayed on the display according to the digitizer input by means of an operating system or a digitizer driver interface. It should be appreciated that, when the pointing-device-integrated text input device 3000 is embedded in the electronic device as shown in FIG. 8, the controller 3500 may control the position of the pointer P according to an autonomously generated digitizer input or may deliver a digitizer input to a separate operation unit for processing an operating system or a digitizer driver interface so that the operation unit can control the position of the pointer P.

The aforementioned digitizer input may be generated through the following process.

When a user enters a touch input in a touch region 3010 formed on the pointing-device-integrated text input device 3000, the controller 3500 may receive a scan signal reflecting a change in capacitance detected by the electrode 3130 from a scan line and may calculate a touch coordinate value on the basis of the scan signal.

Next, the controller 3500 may calculate a point value of the screen 10 corresponding to the touch coordinate value in consideration of a relationship between the touch region and a resolution of the screen 10, acquire the point value as a digitizer input, and output the digitizer input. Here, the point value of the screen 10 may be a resolution coordinate value of the screen 10.

An electronic device, an operation unit, or the controller 3500 that acquires the digitizer input may control the position of the pointer P on the display according to the digitizer input. In detail, the position of the pointer P is set as the point value of the screen 10.

Here, the digitizer input may refer to an "absolute coordinate value" because the touch coordinates in the touch region 10 is matched to the points in the screen 10 on the display.

Unlike the above description, instead of converting a touch coordinate value into a point value on the screen 10 in consideration of the resolution of the screen 10 to acquire a point value as a digitizer input, the controller 3500 may output the touch coordinate value itself as the digitizer input and may induce the electronic device or the operation unit to autonomously calculate the point value (a resolution value) and control the position of the pointer P.

Figure 38:
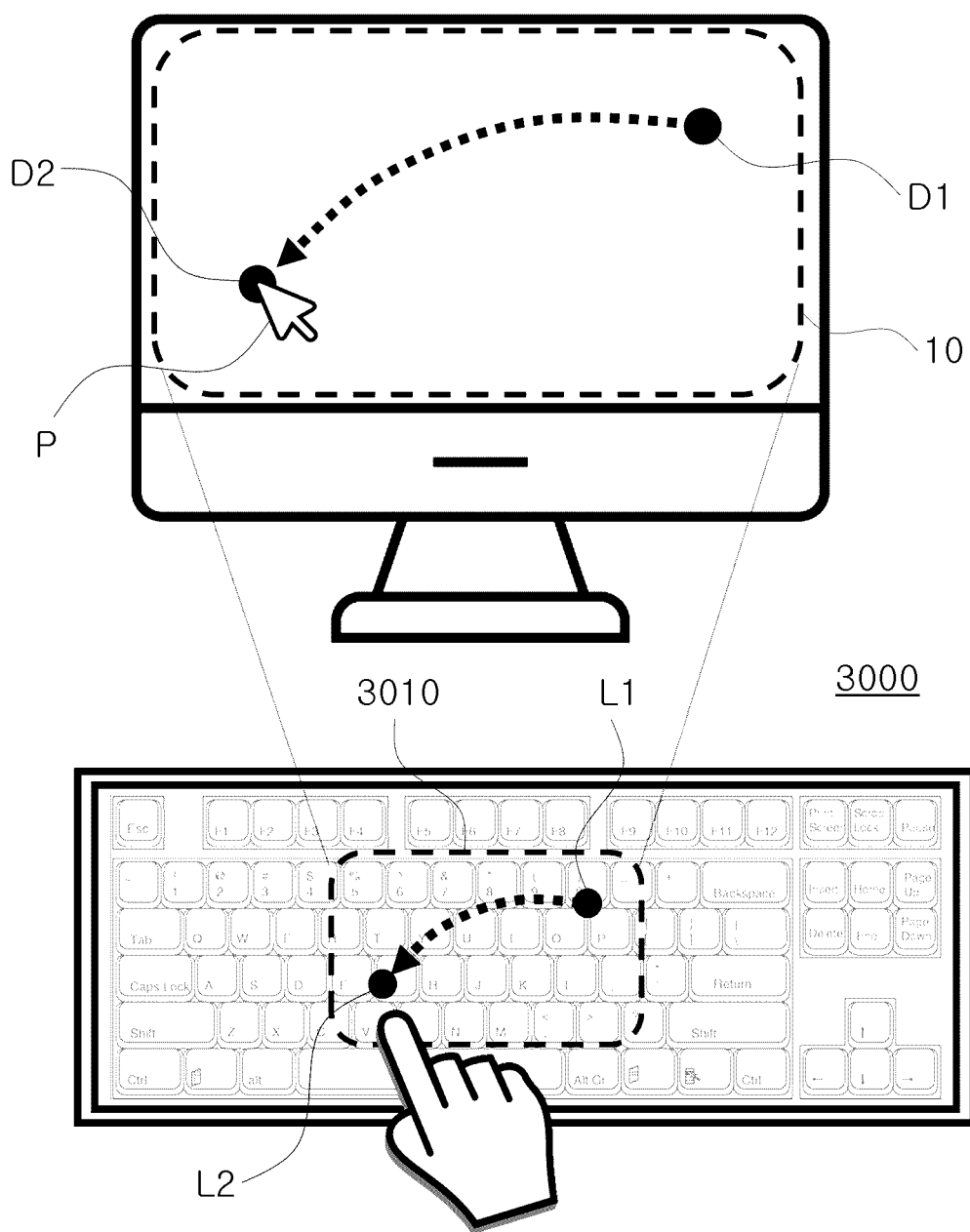
FIG. 38 is an example of an operation of a pointer corresponding to a digitizer input of FIG. 37.

FIG. 38 is an example of an operation of the pointer P corresponding to the digitizer input of FIG. 37.

Referring to FIG. 38, a user may enter a touch input in which the pointer P is dragged from a first location L1 to a second location L2 in the touch region 10. The controller 3500 may calculate a touch coordinate value corresponding to the touch input in real time and output a digitizer input on the basis of the calculated coordinate value.

The pointer P being displayed on the screen 10 may be processed by such a digitizer input to move along a path corresponding to a drag path. As a result, the pointer P may be moved from a first point D1 on the screen 10 corresponding to the first location L1 in the touch region 3010 to a second point D2 corresponding to the second location L2.

Figure 39:
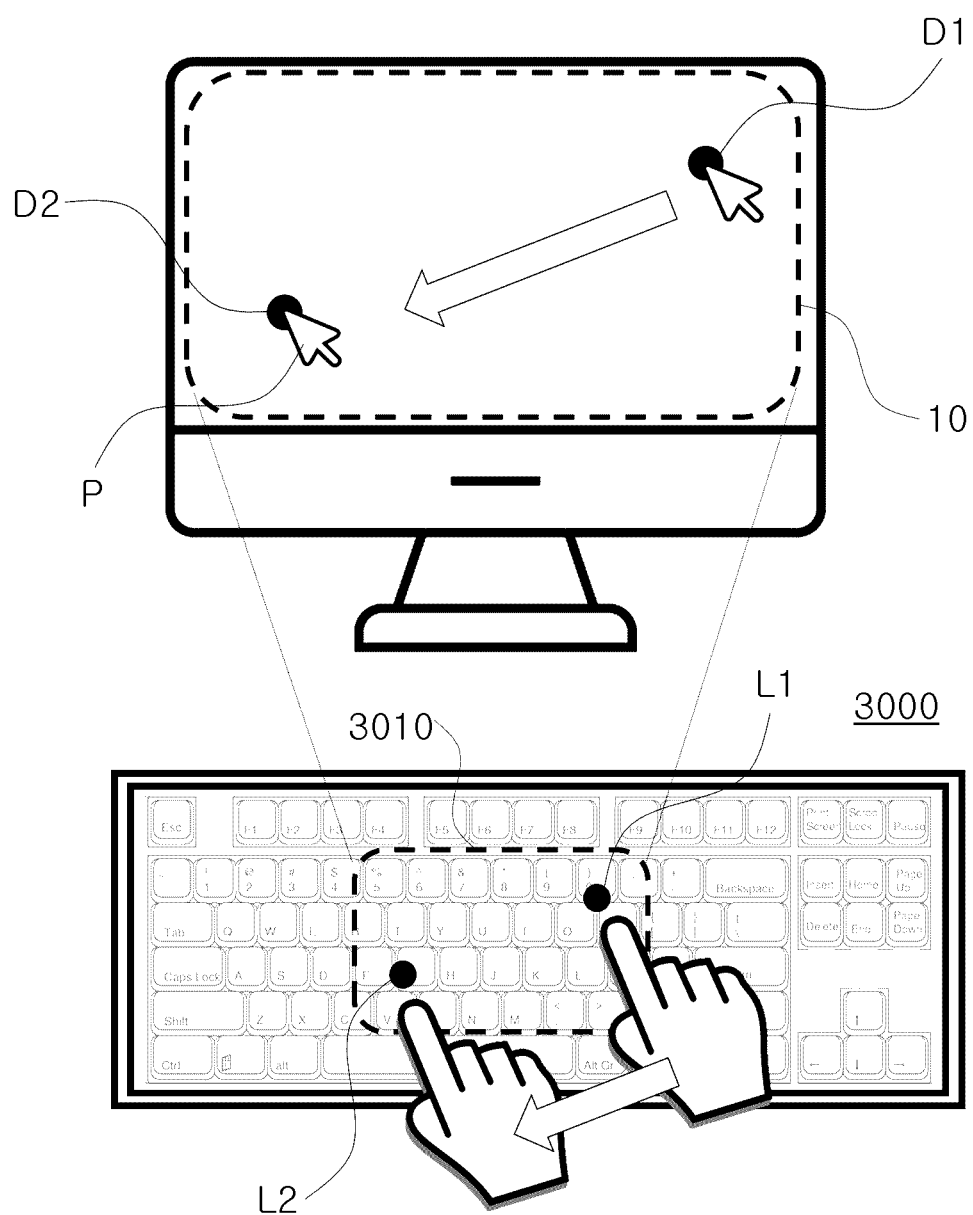
FIG. 39 is another example of an operation of the pointer corresponding to the digitizer input of FIG. 37.

FIG. 39 is an example of an operation of the pointer P corresponding to a digitizer input of FIG. 37.

Referring to FIG. 39, a user may enter a touch input in which the first location L1 in the touch region 10 is touched and then a touch input in which the second location L2 is touched without dragging or the like. When two such touch inputs are generated, the controller 3500 determines that the two touch inputs have an interval of a predetermined time period or more. However, since the first location L1 and the second location L2 are matched to the first point D1 and the second point D2 on the screen 10, respectively, a digitizer input corresponding to the first location L1 may indicate the first point D1, and a digitizer input corresponding to the second location L2 may indicate the second point D2. Accordingly, the pointer P displayed on the screen 10 may be processed by such a digitizer input to stay at the first point D1 on the screen 10 when the first location L1 is touched and then to jump from the first point D1 to the second point D2 when the second location L2 is touched.

Figure 40:
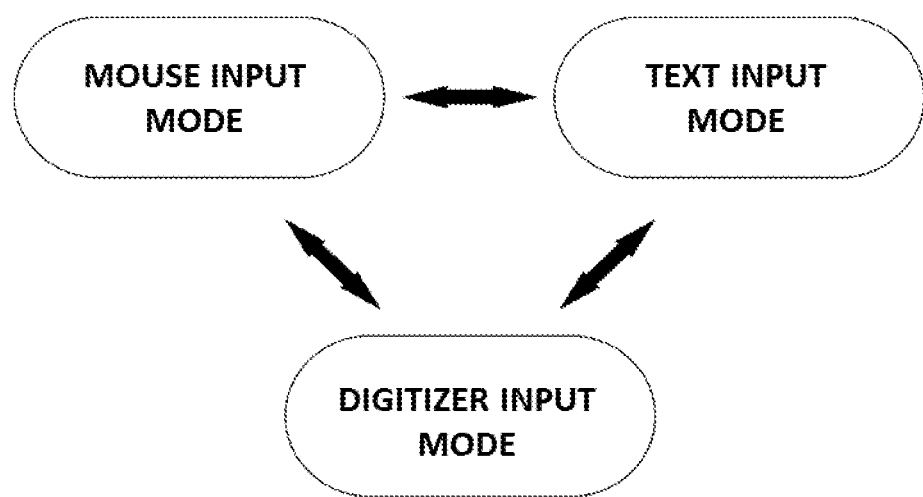
FIG. 40 is an example of mode switching of the pointing-device-integrated text input device of FIG. 30.

FIG. 40 is an example of mode switching of the pointing-device-integrated text input device of FIG. 30.

Referring to FIG. 40, the pointing-device-integrated text input device 3000 may operate in the keyboard mode, a mouse mode, and a digitizer mode.

Here, the keyboard mode is a mode in which, when a user performs a vertical push input on a button 3100 arranged in a keyboard layout so that the button 3100 can be moved downward by the push input to activate a switch 3200, the pointing-device-integrated text input device 3000 is allowed to input a keyboard input reflecting a key value allocated to the button 3100 to which the push input is applied. The keyboard mode is mainly used for text input, and thus may be referred to as a "text mode" or "text input mode."

Also, the mouse mode is a mode in which, when a user performs a touch input in the touch region 3010 formed by the electrode 3130, the pointing-device-integrated text input device 3000 is allowed to control movement of the pointer P by means of the above-described mouse input.

Also, the digitizer mode is a mode in which when a user performs a touch input in the touch region 3010 formed by the electrode 3130, the pointing-device-integrated text input device 3000 is allowed to control the movement of the pointer P by means of the above-described digitizer input.

The mouse mode and digitizer mode are mainly used to control the pointer P, and thus may be referred to as a "pointing mode." Also, both the mouse mode and the digitizer mode are based on a touch input, and thus may be referred to as a "touch mode" or "touch input mode."

In this embodiment, the controller 3500 of the pointing-device-integrated text input device 3000 may switch among the three modes. A mode switching method may be similar to the above-described mode switching method of the mode switching unit, and thus a detailed description thereof will be omitted. However, direct switching between the keyboard mode and the digitizer mode may not be allowed during operation mode switching of the pointing-device-integrated text input device 3000. In this case, the switching between the text mode and the digitizer mode may be achieved only via the mouse mode.

When the pointing-device-integrated text input device 3000 enters the digitizer mode through the mode switching, the controller 3500 may process a touch input as a digitizer input.

To this end, the pointing-device-integrated text input device 3000 may set the touch region 3010 corresponding to the screen 10.

Figure 41:
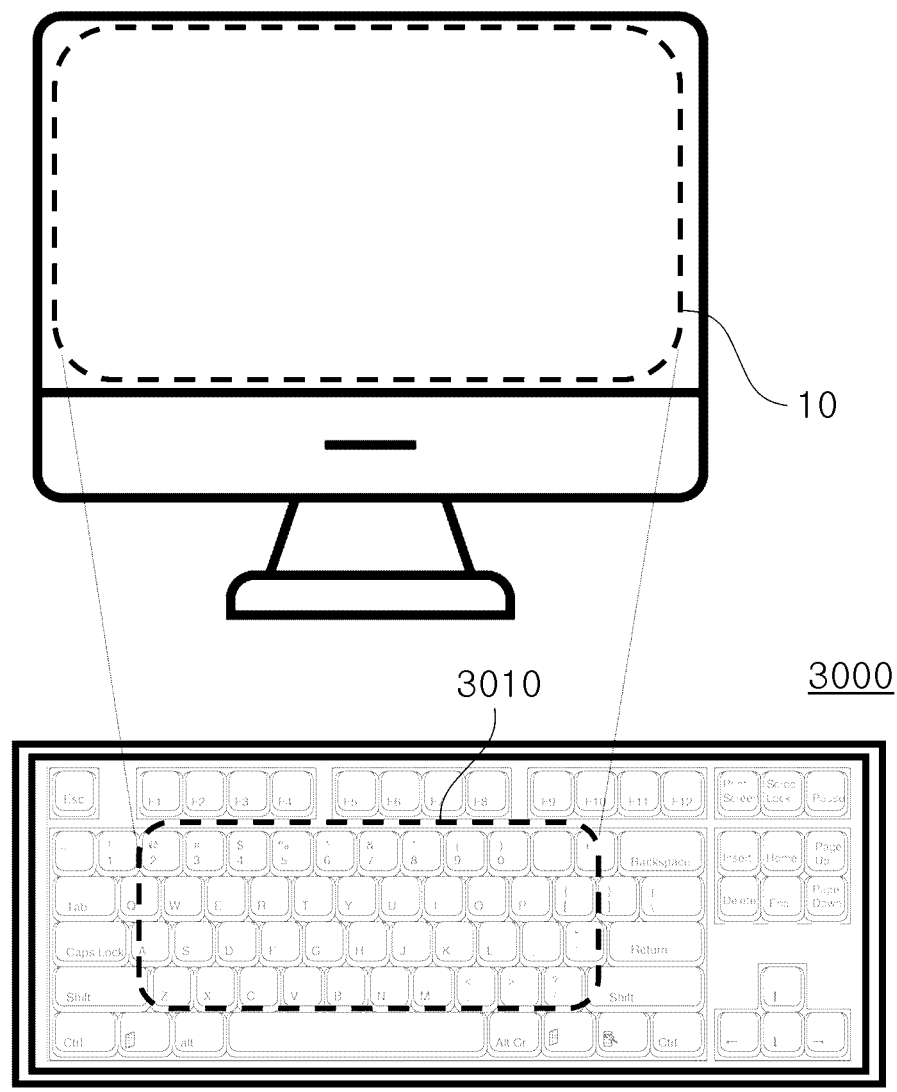
FIG. 41 is an example in which the pointing-device-integrated text input device of FIG. 30 sets a touch region according to a digitizer mode.

FIG. 41 is an example of setting of the touch region 3010 corresponding to the digitizer mode of the pointing-device-integrated text input device of FIG. 30.

Referring to FIG. 41, the touch region 3010 may be formed by the button 3100 including the electrode 3130 for sensing a touch input. Typically, the touch region 3010 for a digitizer input may be formed in the shape of a rectangle or the like on the keyboard layout. The rectangular touch region 3010 may be matched to the screen 10.

As described above, a touch region for a mouse input may be implemented as right-hand and left-hand touch regions 108*a* and 108*b*, as shown in FIG. 1.

Figure 42:
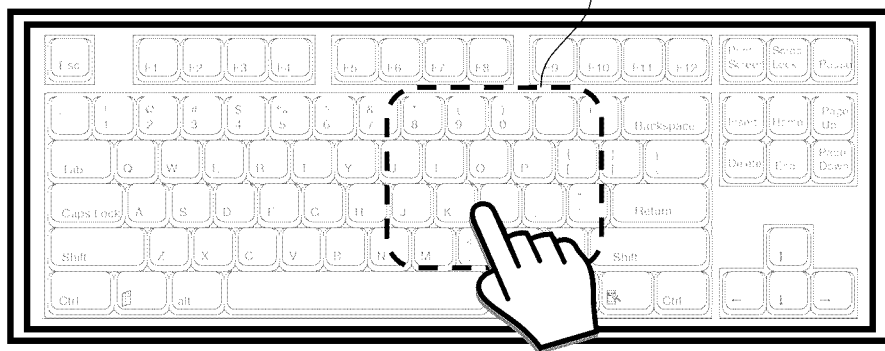
FIGS. 42 and 43 are an example of a relationship between a touch region corresponding to the digitizer mode of FIG. 41 and a touch region corresponding to a mouse mode.
Figure 42:
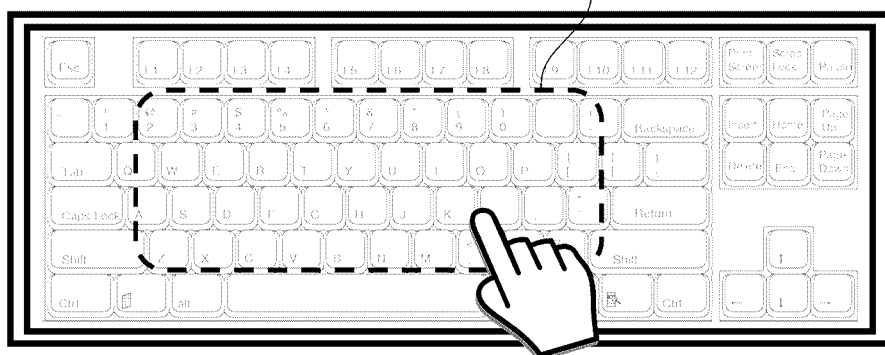
Figure 43:
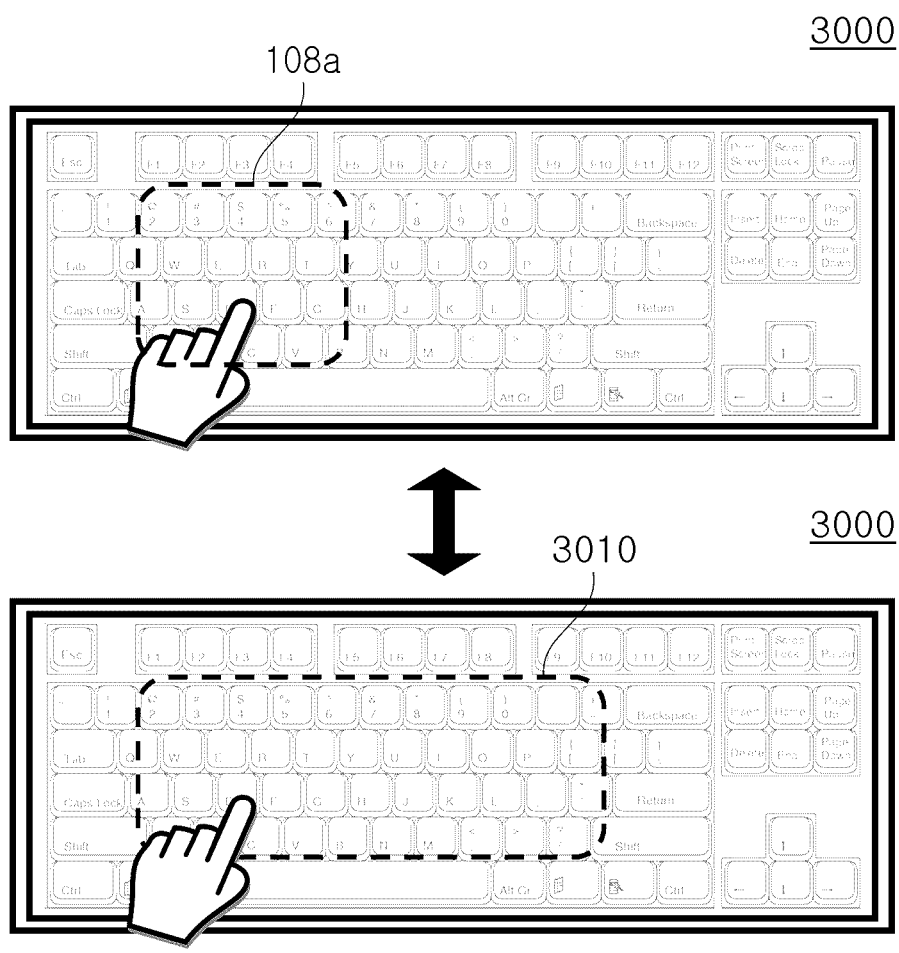

FIGS. 42 and 43 are an example of a relationship between the touch region 3010 corresponding to the digitizer mode of FIG. 41 and the touch region corresponding to the mouse mode.

Referring to FIGS. 42 and 43, an entire touchable region 3010' included in the pointing-device-integrated text input device 3000 is set as the touch region 3010 used for the digitizer mode. Since such a touch region 3010 is matched to the screen 10, the touch region 3010 may be set to include both the right-hand and left-hand touch regions 108*a* and 108*b*.

For example, as shown in FIG. 42, when the pointing-device-integrated text input device 3000 enters the digitizer mode from a right-hand mouse mode in which a touch input is received from a user through the right-hand touch region 108*b* of FIG. 1, the entire region formed by the right-hand and left-hand touch regions 108*a* and 108*b* being combined may be changed into the touch region 3010. It should be appreciated that, when the digitizer mode is switched back to the mouse mode, the pointing-device-integrated text input device 3000 may sense a touch input through the right-hand touch region 108*b* again.

On the other hand, for example, as shown in FIG. 43, when the pointing-device-integrated text input device 3000 enters the digitizer mode from a left-hand mouse mode in which a touch input is received from a user through the left-hand touch region 108a of FIG. 1, the entire region formed by the right-hand and left-hand touch regions 108a and 108b being combined may be changed into the touch region 3010. It should be appreciated that, when the digitizer mode is switched back to the mouse mode, the pointing-device-integrated text input device 3000 may sense a touch input through the left-hand touch region 108a again.

An example in which the touch region 3010 is matched to the entire screen 10 in the digitizer mode has been described above. However, in this description, the pointing-device-integrated text input device 3000 may set the touch region 3010 for the digitizer mode on the basis of the position of the pointer P on the screen 10 when the digitizer mode is entered.

Figure 44:
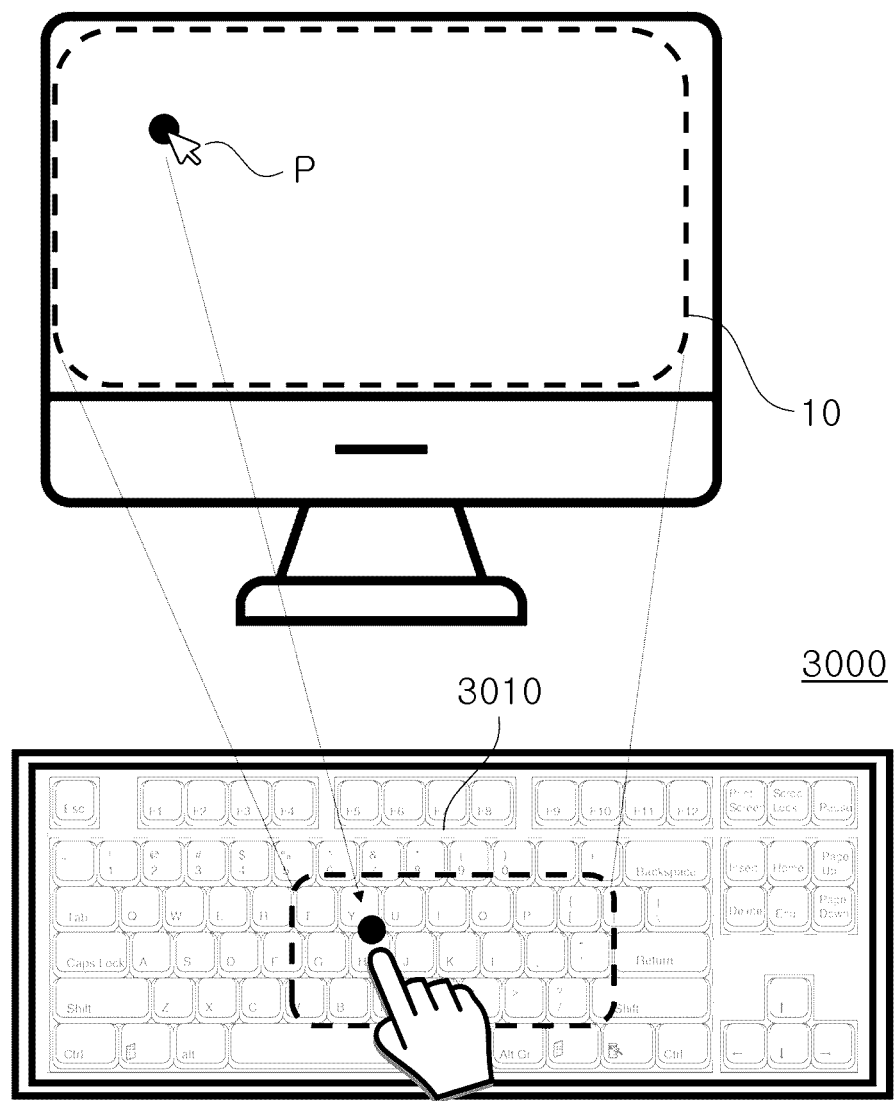
FIGS. 44 and 45 are another example of setting a touch region according to the digitizer mode of the pointing-device-integrated text input device of FIG. 30.
Figure 45:
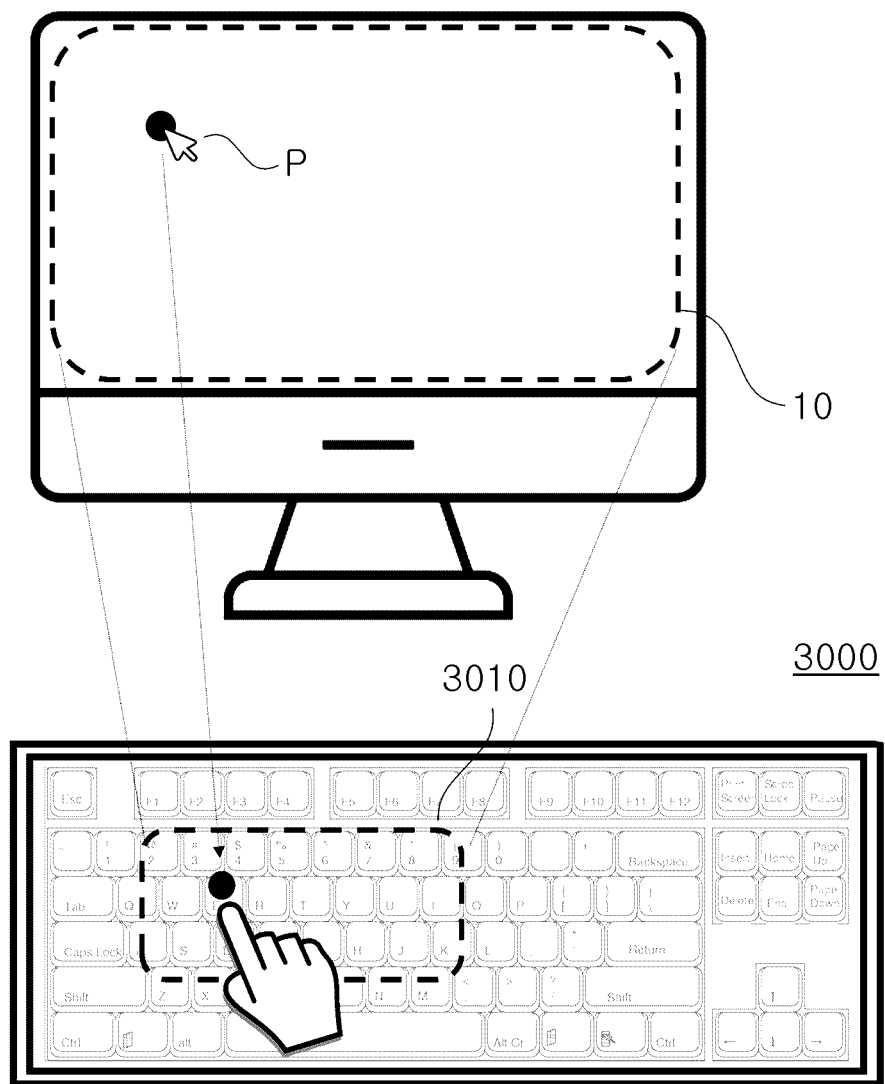

FIGS. 44 and 45 are an example of setting of the touch region 3010 corresponding to the digitizer mode of the pointing-device-integrated text input device of FIG. 30.

Referring to FIGS. 44 and 45, when the pointing-device-integrated text input device 3000 enters the digitizer mode and then a touch input is first generated after entering into the digitizer mode, the controller 3500 may calculate a touch input value of the corresponding touch input and may set the touch region 3010 such that the calculated touch coordinate value is matched to a point value of the pointer P on the screen 10. Accordingly, as shown in FIGS. 44 and 45, although the digitizer mode is entered, a matching relationship between the screen 10 and the touch region may be different when a touch input is first input to a different position after entering into the digitizer mode.

That is, an example in which an entire touchable region 3010' on the pointing-device-integrated text input device 3000 is set as the touch region 3010 for the digitizer mode and the pointing-device-integrated text input device 3000 matches the touch region 3010 for the digitizer mode to the entire screen 10 has been described in FIG. 4. Thus, the touch region 3010 is always fixed on the screen 10. Accordingly, when the touch region 3010 is set in the same way as shown in FIG. 41, a user cannot be aware of a precise touch coordinate value corresponding to the position of a pointer P in the touch region 3010. Accordingly, it may be difficult for a user to perform a predetermined task at the position of the pointer P on the screen 10. For example, it is assumed that a user who performed a task in the mouse mode switches the mouse mode to the digitizer mode to make an electronic signature at the point at which the pointer P is present on the display. In this case, in order to start signing, the user must go through a cumbersome task of finding a point at which the pointer P is present, that is, a start point of the signature, before entering into the digitizer mode.

However, unlike this, in this embodiment, the point at which the pointer P is present is matched to the touch coordinate value of the touch input that is first applied after the digitizer mode is entered, and the touch region 3010 is set according to the matching. Thus, the position at which the touch input is first applied is the point at which the pointer P is present. Accordingly, when the touch region 3010 is set in the same way as shown in FIG. 44 or 45, a user may perform a predetermined task at the point at which the pointer P is present on the screen immediately after the digitizer mode is entered without needing to be aware of a precise touch coordinate value corresponding to the position of the pointer P within the entire touch region 3010. For example, it is assumed that a user who performed a task in the mouse mode switches the mouse mode to the digitizer mode to make a signature at the point at which the pointer P is present on the display. In this case, the user may perform a signing task from the point at which the pointer P is present only by starting signing at any touch position without going through a cumbersome task of finding a point at which the pointer P is present before entering into the digitizer mode to start signing.

However, as shown in FIGS. 44 and 45, when the touch region 3010 is set such that the point at which the pointer P is present on the screen 10 when the digitizer mode is entered is matched to a touch coordinate value of a touch input that is first applied after the digitizer mode is entered, the touch region 3010 may cover only a portion of the screen depending on cases.

Figure 46:
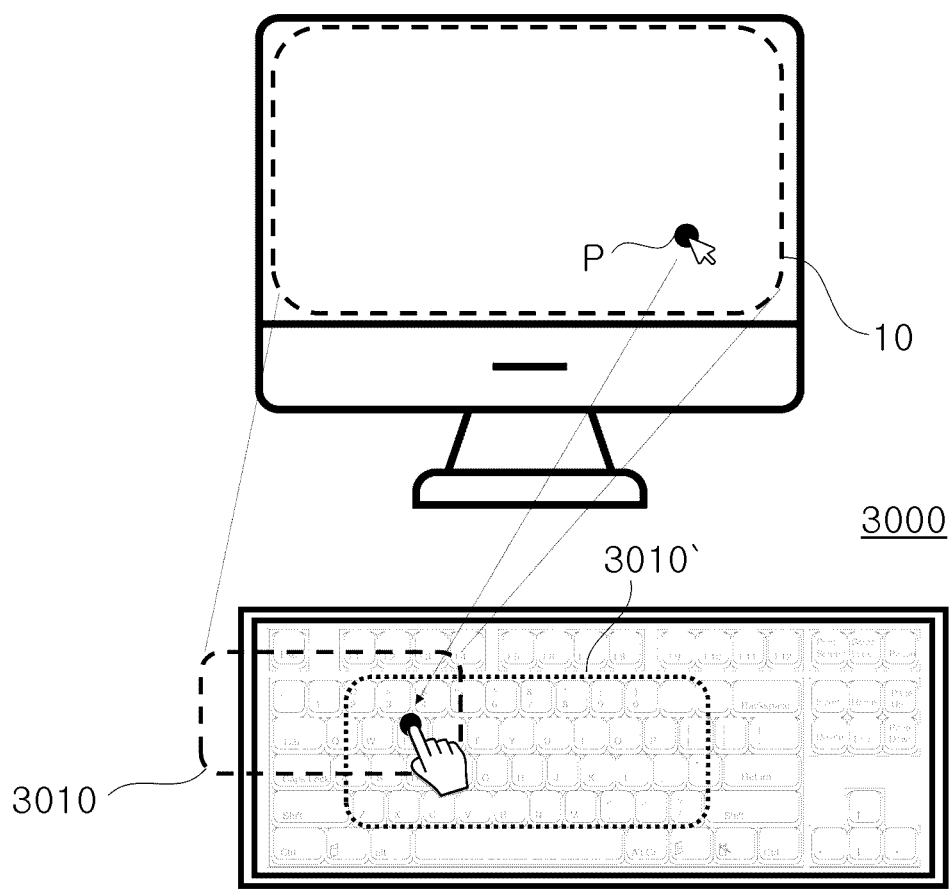
FIG. 46 is an example in which the outside of a touchable region is set as a touch region during the touch region setting of FIGS. 44 and 45.

FIG. 46 is an example in which the outside of the touchable region 3010' is set as the touch region 3010 during the touch region setting of FIGS. 44 and 45.

As a detailed example, as shown in FIG. 46, when the pointer P is located at a lower right portion of the screen 10, a user may first apply a touch input to an upper left portion of the actual touchable region 3010' of the pointing-device-integrated text input device after the digitizer mode is entered. In this case, the touch region 3010 for the digitizer mode is intended to be matched to the actual screen 10, and a portion of the touch region 3010 to be set may be outside the entire actual touchable region 3010'.

Also, when the touch region 3010 is set in this way, the remaining portion of the actual touchable region 3010' in the pointing-device-integrated text input device 3000 other than a portion overlapping the touch region 3010 may not be matched to the screen 10, and thus may not be utilized as the touch region 3010 for the digitizer mode.

Accordingly, when touch coordinates of a touch input that is first applied after the digitizer mode is entered are matched to coordinates of the pointer P on the screen 10 and then the touch region 3010 for the digitizer mode is set, a user can conveniently start a digitizer-type touch input from a position at which the digitizer input is desired to be applied, that is, from a position at which the pointer P is present on the screen 10 when the digitizer mode is entered. However, when the touch coordinates at which a touch is first applied to the entire touchable region 3010' is significantly different from the position of the pointer P on the screen 10 (e.g., when the pointer P is located in a left portion, a right portion, an upper portion, or a lower portion of the screen 10 and the coordinates of the touch that is first applied after the digitizer mode is entered are located at the right portion, the left portion, the lower portion, or the upper portion), a portion of the screen 10 may not be matched to the touch region 3010 or many portions of the entire touchable region 3010' may not be matched to the screen 10.

Figure 47:
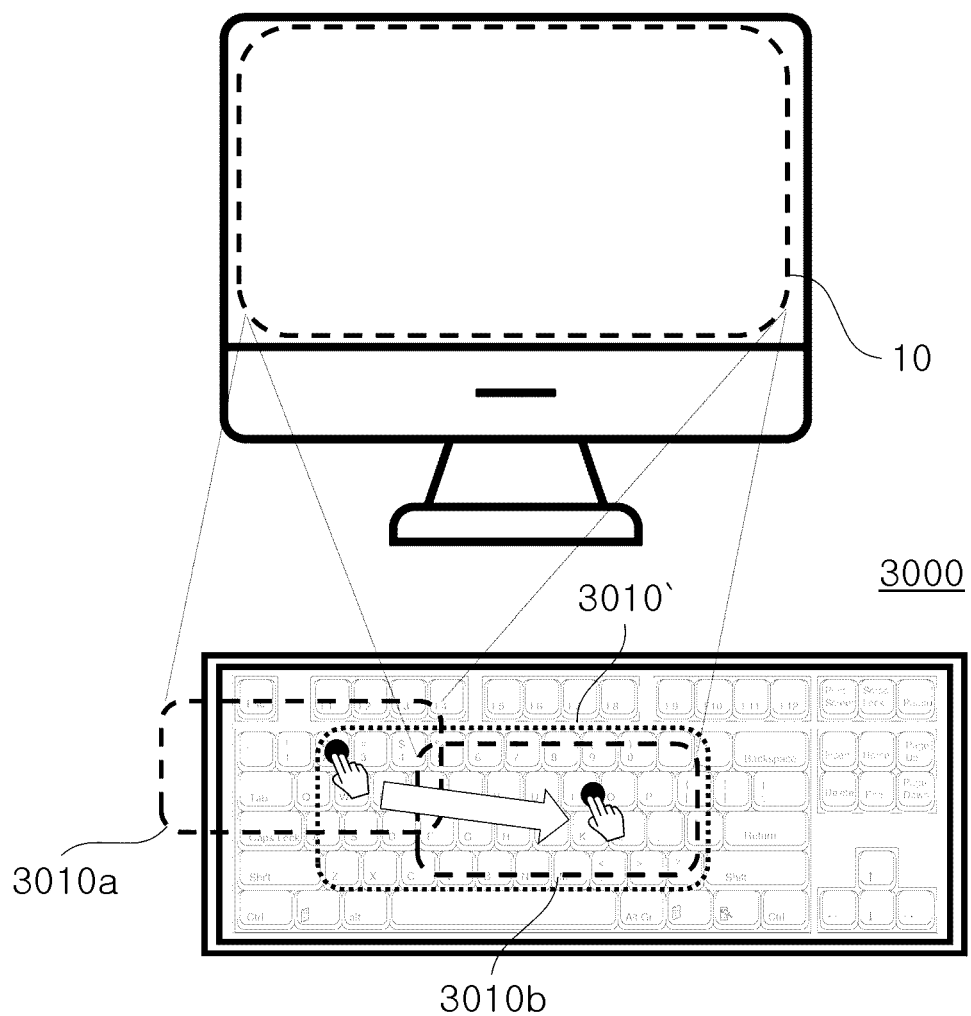
FIG. 47 is an example of resetting a touch region according to the digitizer mode of FIG. 46.
Figure 48:
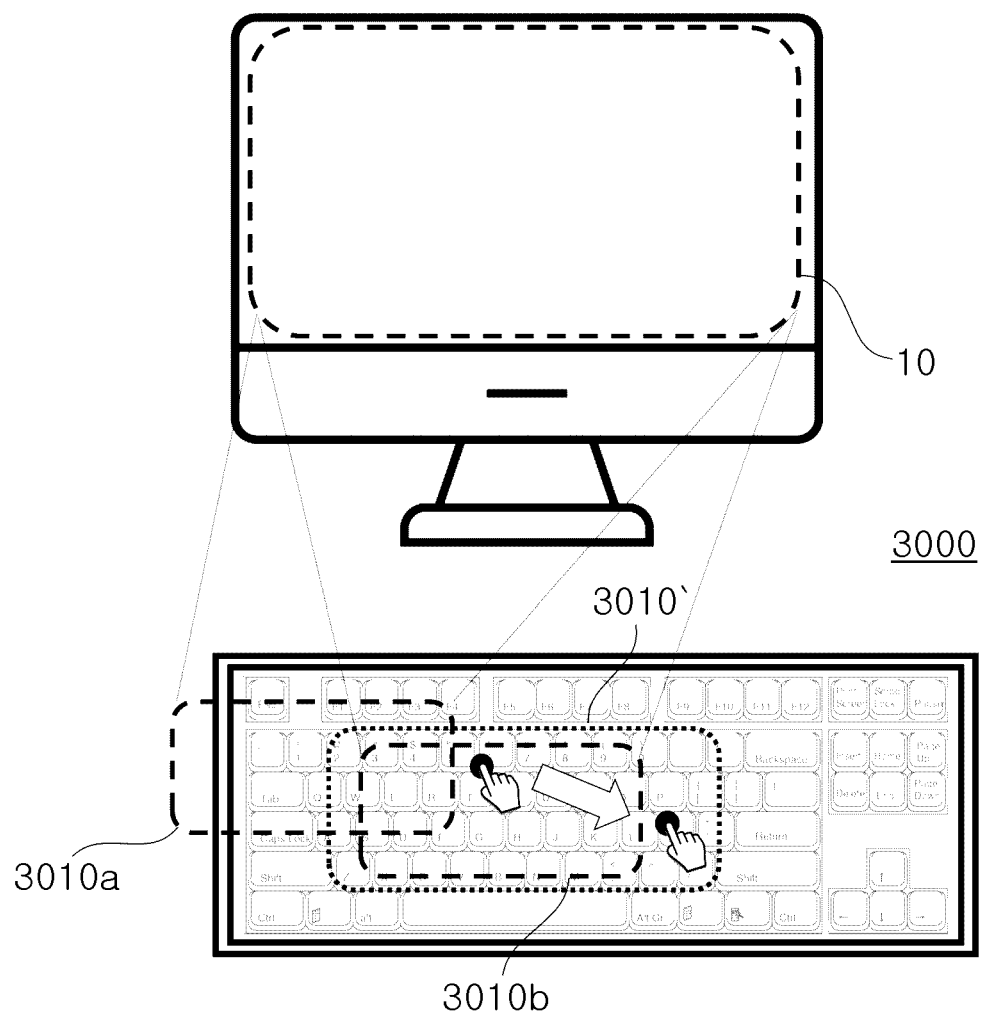
FIG. 48 is another example of resetting a touch region according to the digitizer mode of FIG. 46.

FIG. 47 is an example of resetting the touch region 3010 according to the digitizer mode of FIG. 46, and FIG. 48 is another example of resetting the touch region 3010 according to the digitizer mode of FIG. 46.

Referring to FIGS. 47 and 48, a coordinate value of the pointer P located at a lower right portion of the screen 10 is matched to a touch coordinate value located at an upper left portion of the entire touchable region 3010', and a touch region 3010a corresponding to the screen 10 when the digitizer mode is entered is set on the basis of the matching. In this case, a portion of the touch region 3010a is outside the touchable region 3010' described above with reference to FIG. 46. Accordingly, a touch input cannot be applied to a region of the screen 10 that is matched to the touch region 3010a outside the touchable region 3010'. In this case, many portions of the touchable region 3010' do not correspond to the screen 10 described above with reference to FIG. 46, and thus utilization of the touchable region 3010' is also low.

Accordingly, it is necessary to move the touch region 3010a so that the touch region 3010a and the screen 10 can be properly matched to each other.

Accordingly, the pointing-device-integrated text input device 3000 may reset the touch region 3010 for the digitizer mode that is matched to the screen 10.

According to an example, referring to FIG. 47, when a multi-finger touch input (a touch input with two fingers in FIG. 47) applied to the predetermined touch region 3010a is received in the digitizer mode, the pointing-device-integrated text input device 3000 may reset the touch region 3010 by changing a touch region 3010b according to movement of touch coordinates of the multi-finger touch input.

According to another example, referring to FIG. 48, when a touch input is received in an external region of the touchable region 3010', which is not included in the predetermined touch region 3010a, in the digitizer mode, the pointing-device-integrated text input device 3000 may reset the touch region 3010 by changing the touch region 3010b according to movement of touch coordinates of the touch input.

According to still another example, the pointing-device-integrated text input device 3000 may enter a standby state in which the touch region 3010 for the digitizer mode receives an input for resetting the touch region 3010 by a predetermined user input through a mode switching unit while the touch region 3010 is matched to the screen 10. When a touch input is received in the standby state, the pointing-device-integrated text input device 3000 may reset the touch region 3010 by moving the touch region 3010 according to the movement of the touch input.

In addition to the aforementioned examples, the pointing-device-integrated text input device 3000 may determine various conditions as a touch region resetting request, may wait to receive a touch region resetting input when the touch region resetting request is generated, and may move the touch region 3010 according to movement of a touch input which will occur later to move the touch region 3010 for the digitizer mode.

Some methods of the pointing-device-integrated text input device 3000 performing control operations associated with the digitizer mode will be described below.

Figure 49:
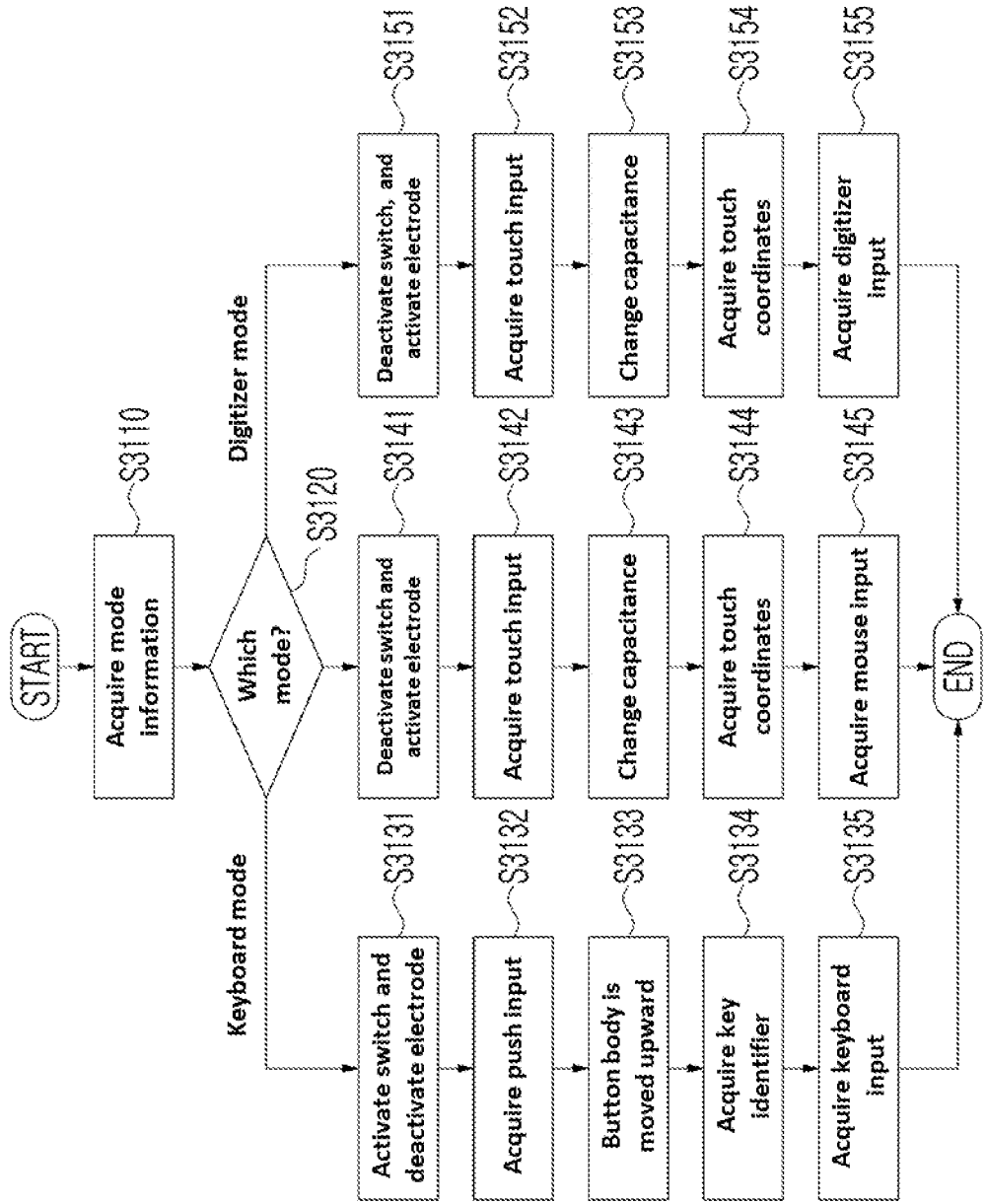
FIG. 49 is a flowchart showing an example of a mode switching method of the pointing-device-integrated text input device of FIG. 30.

FIG. 49 is a flowchart showing an example of a mode switching method of the pointing-device-integrated text input device 3000 of FIG. 30.

Referring to FIG. 49, the method may include acquiring information regarding an input mode (S3110), determining the input mode (S3120), activating the switches 3200 when the input mode is the keyboard mode and deactivating the electrode 3130 (S3131), acquiring a push input (S3132), raising or lowering the button body 3120 (S3133), acquiring a key identifier (S3134), acquiring a key value (S3135), deactivating the switches 3200 and activating the electrode 3130 when the input mode is the mouse mode (S3121), acquiring a touch input (S3122), changing capacitance (S3123), acquiring a touch coordinate value (S3124), acquiring a mouse input (S3125), deactivating the switches 3200 and activating the electrode 3130 when the input mode is the digitizer mode (S3131), acquiring a touch input (S3132), changing capacitance (S3133), acquiring a touch coordinate value (S3134), and acquiring a digitizer input (S3135).

The above-described steps will be described in detail below.

The pointing-device-integrated text input device 3000 may acquire information regarding an input mode (S3110) and may determine the input mode according to the acquired information (S3120). Here, the input mode may include the keyboard mode, the mouse mode, and the digitizer mode, and switching among these modes by the pointing-device-integrated text input device 3000 may be either completely free or limited.

When the input mode is the keyboard mode, the pointing-device-integrated text input device 3000 may output a key value as a keyboard input according to a push-input-type user input.

First, the pointing-device-integrated text input device 3000 may activate the switch 3200 and deactivate the electrode 3130 (S3131).

Here, the activation of the switch 3200 may refer to a state in which, when the switch 3200 is touched or pressed by the button body 3120 according to the push input, the controller 3500 may receive a key identifier from the switch 3200, acquire a key value according to the key identifier, and transmit a keyboard input reflecting the key value to a device or unit that uses the pointing-device-integrated text input device 3000 as an input interface.

Conversely, the deactivation of the switch 3200 may refer to a state in which the pointing-device-integrated text input device 3000 does not perform some or all of the process of finally transmitting the keyboard input according to the user's push input during the above-described activation state of the switch 3200 such that the keyboard input is not output in response to the push input.

Here, the activation of the electrode 3130 may refer to a state in which, when a user performs a touch input, the controller 3500 may apply a drive signal to the electrode 3130 to generate capacitance in the electrode 3130, detect a change in the capacitance of the electrode 3130 as a scan signal according to the touch input, calculate a touch coordinate value and touch information according to the scan signal, acquire a mouse input or a digitizer input on the basis of the touch coordinate value and the touch information, and transmit the mouse input or the digitizer input to a device or unit that uses the pointing-device-integrated text input device 3000 as an input interface.

Conversely, the deactivation of the electrode 3130 may refer to a state in which the pointing-device-integrated text input device 3000 does not perform some or all of the process of finally transmitting the mouse input or the digitizer input according to the user's touch input during the above-described activation state of the electrode 3130 such that the mouse input or the digitizer input is not output in response to the touch input.

The pointing-device-integrated text input device 3000 may acquire a push input through the keycap 3110 (S3132). Thus, the button body 3120 may be moved downward (S3133), the switch 3200 may acquire a key identifier (S3134), and the controller 3500 may receive the key identifier, acquire a key value, and acquire a keyboard input including the key value (S3135).

The pointing-device-integrated text input device 3000 may function as a keyboard by delivering the keyboard input to an entity that uses the pointing-device-integrated text input device 3000 as an input interface.

When the input mode is the mouse mode, the pointing-device-integrated text input device 3000 may output a mouse input according to a touch-input-type user input.

First, the pointing-device-integrated text input device 3000 may deactivate the switch 3200 and activate the electrode 3130 (S3141). However, only some of the switches 3200 may be deactivated or all of the switches 3200 may be activated as necessary.

When a touch input is applied to the pointing-device-integrated text input device 3000 through the keycap 3110

(S3142), the capacitance of the electrode 3130 generated by the drive signal may change (S3143). The controller 3500 may receive a scan signal reflecting the change in the capacitance, and thus may acquire a touch coordinate value (S3144).

When the touch coordinate value is acquired, the controller 3500 may calculate a touch coordinate variation through a difference operation between a touch coordinate value acquired during a previous scan period and a current touch coordinate value, and generate a mouse input reflecting the calculated touch coordinate variation (3145).

The pointing-device-integrated text input device 3000 may function as a mouse by delivering the mouse input to an entity that uses the pointing-device-integrated text input device 3000 as an input interface.

When the input mode is the digitizer mode, the pointing-device-integrated text input device 3000 may output a digitizer input according to a touch-input-type user input.

First, the pointing-device-integrated text input device 3000 may deactivate the switch 3200 and activate the electrode 3130 (S3151). However, only some of the switches 3200 may be deactivated or all of the switches 3200 may be activated as necessary.

When a touch input is applied to the pointing-device-integrated text input device 3000 through the keycap 3110 (S3152), the capacitance of the electrode 3130 generated by the drive signal may change (S3153). The controller 3500 may receive a scan signal reflecting the change in the capacitance, and thus may acquire a touch coordinate value (S3154).

When the touch coordinate value is acquired, the controller 3500 may generate a digitizer input indicating a specific point on the screen 10 from the touch coordinate value in consideration of a matching relationship between the screen 10 and the touch region 3010 for the digitizer mode (S3155).

The pointing-device-integrated text input device 3000 may function as a digitizer by delivering the digitizer input to an entity that uses the pointing-device-integrated text input device 3000 as an input interface.

Figure 50:
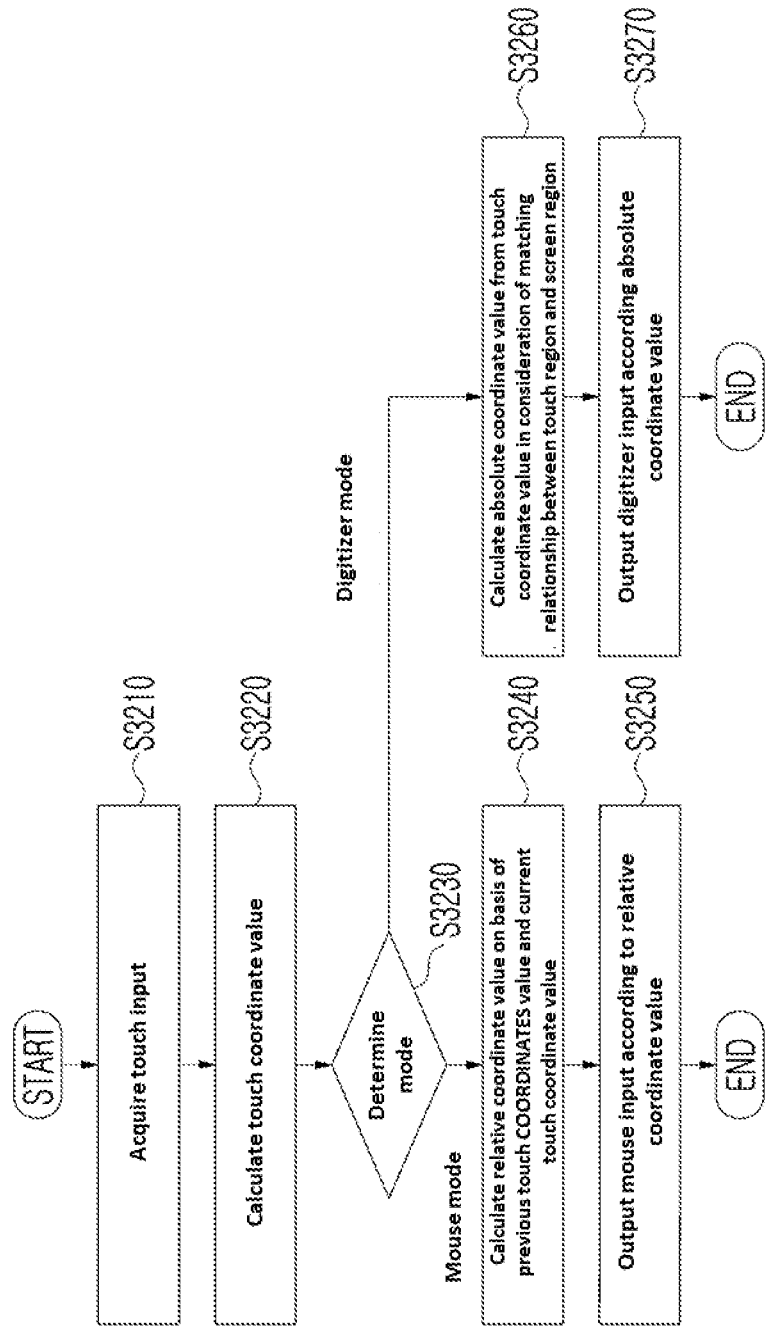
FIG. 50 is a flowchart showing a method of the pointing-device-integrated text input device of FIG. 30 processing a touch input in the mouse mode and the digitizer mode.

FIG. 50 is a flowchart showing a touch input processing method in the mouse mode and the digitizer mode of the pointing-device-integrated text input device 3000 of FIG. 30.

Referring to FIG. 50, the method may include acquiring a touch input (S3210), calculating a touch coordinate value (S3220), determining a mode (S3230), calculating a relative coordinate value on the basis of a previous touch coordinate value and a current touch coordinate value when the mode is the mouse mode (S3240), outputting a mouse input according to the relative coordinate value (S3250), calculating an absolute coordinate value from the touch coordinate value in consideration of a matching relationship between a touch region and a screen region when the mode is the digitizer mode (S3260), and outputting a digitizer input according to the absolute coordinate value (S3270).

The above-described steps will be described in detail below.

The pointing-device-integrated text input device 3000 may acquire a touch input (S3210) and calculate a touch coordinate value according to the touch input (S3220).

When the touch coordinate value is calculated, the controller 3500 may determine whether the current mode is the mouse mode or the digitizer mode (S3230).

When the mode is the mouse mode, the controller 3500 may calculate a relative coordinate value on the basis of a touch coordinate value during a previous scan period and a touch coordinate value during a current scan period (S3240), and may output a mouse input reflecting the relative coordinate value (S3250).

When the mode is the digitizer mode, the controller 3500 may calculate an absolute coordinate value from the touch coordinate value in consideration of a matching relationship between a touch region and a screen region (S3260), and may output a digitizer input according to the absolute coordinate value (S3270).

Here, the process of the controller 3500 acquiring the digitizer input from the touch coordinate value is as follows.

As an example, the matching relationship may be a matching table or a matching function between resolution coordinate values of the screen 10 corresponding to the coordinate values of the touch region 3010. In this case, the controller 3500 may change the touch coordinate value into a coordinate value on the screen 10 by using the matching table or the matching function, and may acquire a digitizer input reflecting the coordinate value on the screen 10.

As another example, the matching relationship may denote that a touch coordinate value of a touch input that is first applied after the digitizer mode is entered corresponds to a resolution coordinate value of the pointer P on the screen 10 when the first touch input is input. In this case, the controller 3500 may acquire a difference between a touch coordinate value of a start touch input and a touch coordinate value of a current touch input as the digitizer input. Such a method may be technically substantially the same as a method of setting a matching relationship between the screen 10 and the touch region 3010 according to the coordinate value of the first touch input and converting the touch coordinate value into an absolute coordinate value according to the matching relationship, but may have a slightly different signal/information processing/operating process.

Figure 51:
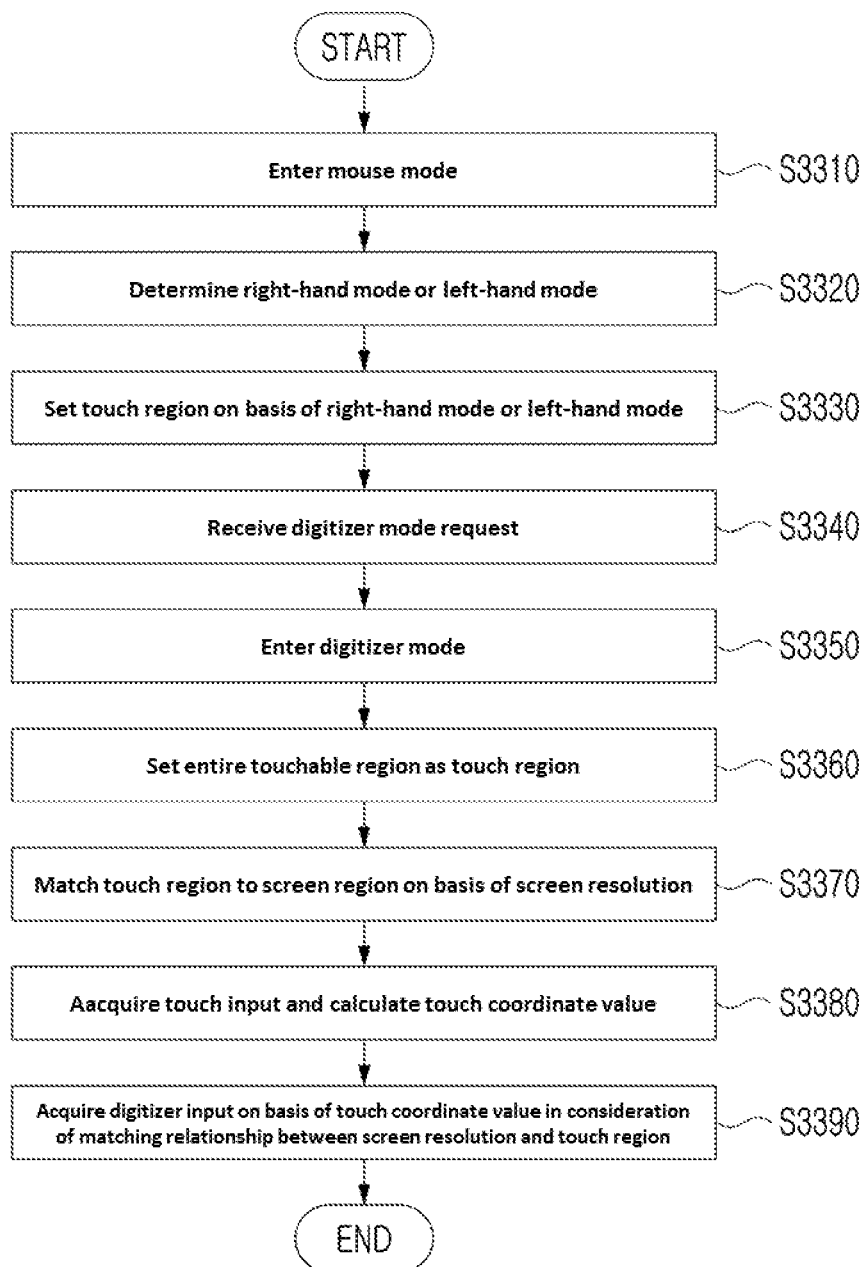
FIG. 51 is a flowchart showing an example of a method of the pointing-device-integrated text input device of FIG. 30 setting a touch region in the digitizer mode.

FIG. 51 is a flowchart showing an example of a method of the pointing-device-integrated text input device 3000 of FIG. 30 setting a touch region in the digitizer mode.

Referring to FIG. 51, the method may include entering the mouse mode (S3310), determining whether the mouse mode is a right-hand mode or a left-hand mode (S3320), setting a touch region on the basis of whether the mouse mode is the right-hand mode or the left-hand mode (S3330), receiving the digitizer mode request (S3340), entering the digitizer mode (S3350), setting an entire touchable region as the touch region (S3360), matching the touch region to a screen region on the basis of a screen resolution (S3370), acquiring a touch input and calculating a touch coordinate value (S3380), and acquiring a digitizer input on the basis of the touch coordinate value in consideration of a matching relationship between the screen resolution and the touch region (S3390).

The above-described steps will be described in detail below.

First, the pointing-device-integrated text input device 3000 enters the mouse mode (S3310). In this case, the pointing-device-integrated text input device 3000 may determine whether the mouse mode is a right-hand mode or a left-hand mode (S3320), and may set a different touch region depending on whether the mouse mode is the right-hand mode or the left-hand mode (S3330). The determination of whether the mouse mode is the right-hand mode or the left-hand mode and the setting of the touch region have been described above, and thus detailed descriptions thereof will be omitted.

The pointing-device-integrated text input device 3000 may receive a request to switch from the mouse mode to the digitizer mode through a mode switching unit or the like (S3340), and may enter the digitizer mode (S3350).

When the digitizer mode is entered, the pointing-device-integrated text input device 3000 may set the entire touchable region as the touch region (S3360) and match the touch region to the screen region on the basis of the resolution of the screen 10 (S3370). In detail, a matching table or function, which is a table or function for matching four corners of the touch regions 3010 to four corners of the screen 10, may be generated.

The pointing-device-integrated text input device 3000 may acquire a touch input and calculate a touch coordinate value corresponding to the touch input (S3380), and may acquire a digitizer input on the basis of the touch coordinate value in consideration of a matching relationship between the screen resolution and the touch region (S3390). In this case, the digitizer input may indicate a predetermined point on the screen 10. However, the pointing-device-integrated text input device 3000 may simply transmit the touch coordinate value to a device, and the device may convert the touch coordinate value into a coordinate value on the screen 10.

Figure 52:
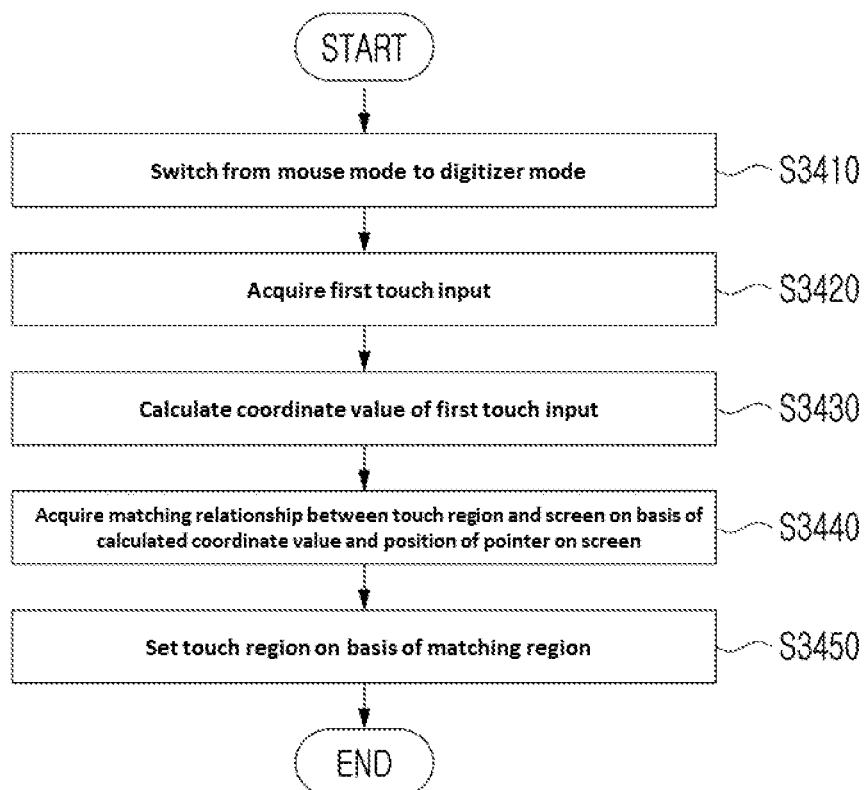
FIG. 52 is a flowchart showing another example of a method of the pointing-device-integrated text input device of FIG. 30 setting a touch region in the digitizer mode.

FIG. 52 is a flowchart showing another example of a method of the pointing-device-integrated text input device 3000 of FIG. 30 setting a touch region in the digitizer mode.

Referring to FIG. 52, the method includes switching from the mouse mode to the digitizer mode (S3410), acquiring a first touch input (S3420), calculating a coordinate value of the first touch input (S3430), acquiring a matching relationship between a touch region and a screen on the basis of the calculated coordinate value and a position of a pointer on the screen, and setting the touch region on the basis of the matching relationship (S3450).

The above-described steps will be described in detail below.

The pointing-device-integrated text input device 3000 may switch from the mouse mode to the digitizer mode (S3410), acquire a touch input that is first applied after the digitizer mode is entered (S3420), and calculate a touch coordinate value corresponding to the touch input (S3430).

The pointing-device-integrated text input device 3000 may acquire a matching relationship between the touch region and a screen on the basis of the calculated coordinate value and the position of the pointer P on the screen 10 (S3440). That is, the controller 3500 may generate a matching table or a matching function for making a touch point of the first touch correspond to the position of the pointer P on the screen 10.

When the matching relationship is formed, the pointing-device-integrated text input device 3000 may set the touch region on the basis of the matching relationship (S3450). The controller 3500 may set the touch region so that the touch coordinate value of the first touch in the touch region can correspond to a point at which a pointer is present when the first touch is input.

Thus, touch coordinate values in the touch region may be matched to resolution values of the screen 10 and used in the form in which the touch region receives a digitizer input.

Instead of implementing a matching table or function for forming the matching relationship, it is possible to control movement of the pointer on the screen on the basis of a difference between a coordinate value of the first touch input and a coordinate value of a subsequent touch input. In the mouse mode, a method of controlling movement of a pointer by calculating a touch coordinate variation through a difference operation between a touch coordinate value during a current scan period and a touch coordinate value during a previous scan period has been described. In the digitizer mode, although a matching relationship is not formed, a point at which the pointer is present when the first touch input is input is matched to a touch coordinate value of the first touch input in the touch region. Thus, it is also possible to control subsequent movements of the pointer by using the touch coordinate variation calculated through the difference operation between the touch coordinate value of the first touch input and the touch coordinate value of the current touch input.

Figure 53:
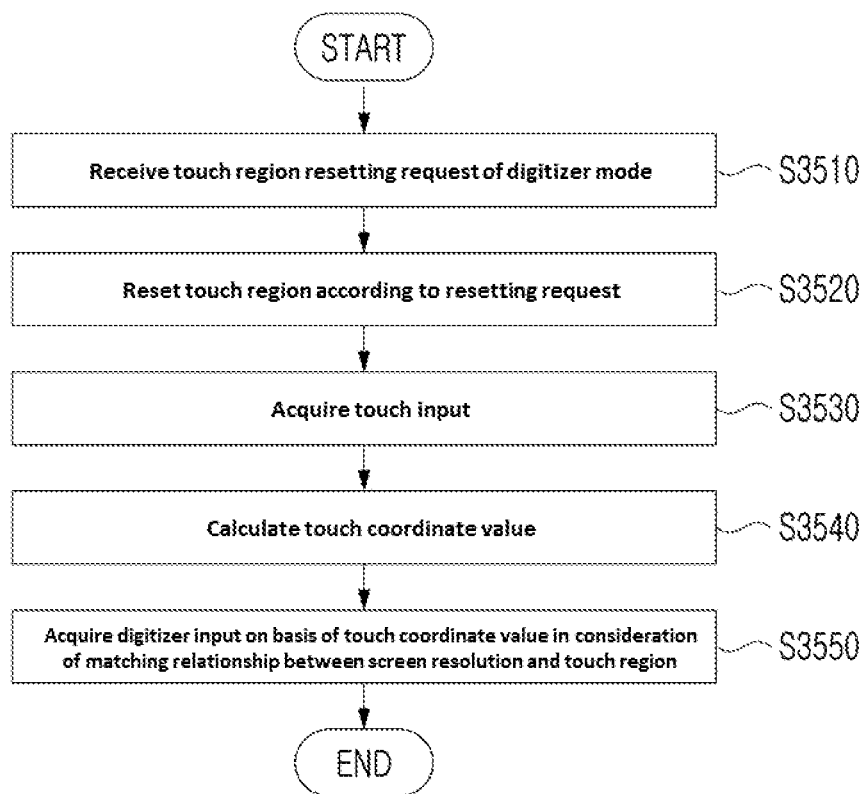
FIG. 53 is a flowchart showing a method of the pointing-device-integrated text input device of FIG. 30 resetting a touch region in the digitizer mode.

FIG. 53 is a flowchart showing a method of the pointing-device-integrated text input device 3000 of FIG. 30 resetting a touch region in the digitizer mode.

Referring to FIG. 53, the method may include receiving a touch region resetting request for the digitizer mode (S3510), resetting a touch region according to the resetting request (S3520), acquiring a touch input (S3530), calculating a touch coordinate value (S3540), and acquiring a digitizer input on the basis of the touch coordinate value in consideration of a matching relationship between a screen resolution and the touch region.

The above-described steps will be described in detail below.

The pointing-device-integrated text input device 3000 may receive the touch region resetting request for the digitizer mode (S3510). A detailed aspect of the resetting request has been described, and thus a detailed description thereof will be omitted.

When the resetting request is received, the pointing-device-integrated text input device 3000 may reset the touch region (S3520). In detail, the controller 3500 may reset the touch region by moving the touch region according to the movement of a touch input that is input after the resetting request.

In detail, the pointing-device-integrated text input device 3000 may acquire a touch input (S3530), calculate a touch coordinate value of the acquired touch input (S3540), and acquire a digitizer input on the basis of the touch coordinate value in consideration of a matching relationship between a screen resolution and the touch region (S3550).

When the touch region is reset using the above-described multi-touch input or when the touch region is reset using a touch input applied to a touchable region outside the touch region, a touch region resetting request and a subsequent touch region moving command may be interpreted as being merged.

In the above-description, by default, the pointing-device-integrated text input device 3000 receives only a key input and does not recognize a touch input in the keyboard mode or receives only a touch input and does not recognize a key input in the mouse mode.

Actually, when the pointing-device-integrated text input device 3000 senses a touch input in the keyboard mode, the pointer P on the screen 10 may not be moved consistently with a user's intent because of typing, and thus it may be advantageous for a touch input to not be recognized in the keyboard mode. Furthermore, the pointing-device-integrated text input device 3000 periodically processes a drive signal and a scan signal in order to sense the touch input, and thus may cause unnecessary power waste.

However, in the touch mode (the mouse mode or the digitizer mode), there is no great inconvenience in controlling the position of the pointer P even when the pointing-device-integrated text input device 3000 recognizes a key input.

A method of the pointing-device-integrated text input device 3000 utilizing a key input in the touch mode will be described below.

In a computing environment or the like, it may be necessary to adjust attributes that are tunable during operation of an operating system or execution of an application. The attributes are referred to below as "adjustment target attributes."

Figure 54:
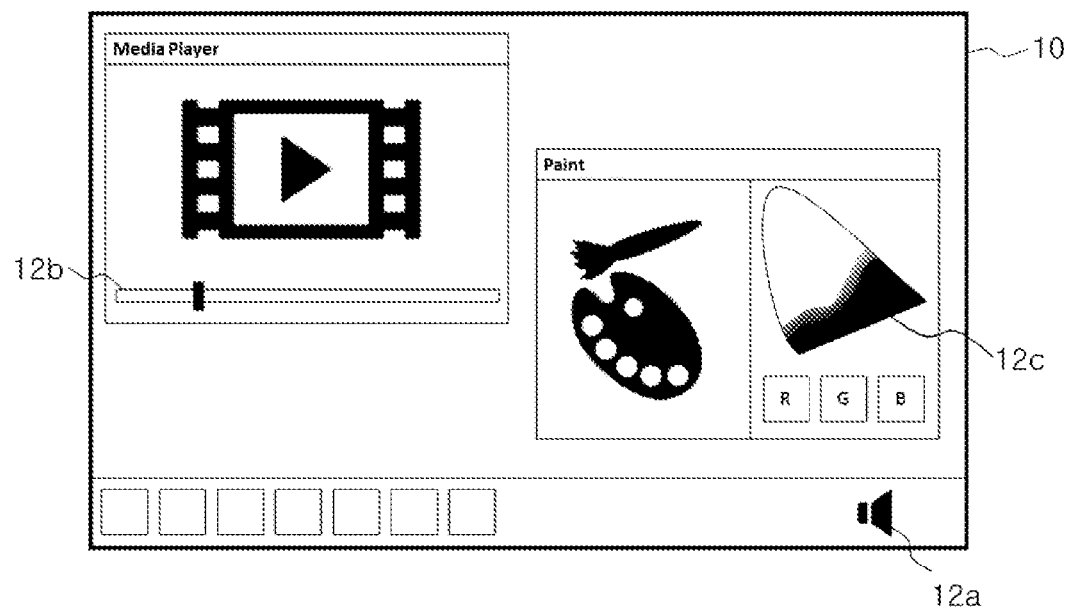
FIG. 54 is a view showing some examples of adjustment target attributes.

FIG. 54 is a view showing some examples of adjustment target attributes.

Representative examples of the adjustment target attributes include a volume attribute 12a related to sound volume of audio, a progress-bar attribute 12b related to progress of video playback, and a color space attribute 12c related to an adjustment of color values, as shown in FIG. 54, and also various other adjustment target attributes.

Conventionally, various methods have been designed to adjust attribute values of the adjustment target attributes.

As an example, a user may adjust adjustment target attributes by entering a character value or a key value allocated to the adjustment of the adjustment target attributes. In detail, an attribute value of the volume attribute may increase when a "+" key of a keyboard is entered and may decrease when a "−" key is entered.

As another example, a user may move an indicator located on a graphic object reflecting the attribute value of the adjustment target attribute by dragging the indicator.

However, when the attribute value of the adjustment target attribute is adjusted through a key input, a large number of key inputs may be repeatedly required. When the indicator located on the graphic object is moved by dragging the indicator corresponding to a mouse input, a user should perform a drag input after moving the pointer P to a position of the indicator of the graphic object.

In this description, the pointing-device-integrated text input device 3000 may adjust an adjustment target attribute by utilizing a keyboard input while operating in the touch mode. Some implementations thereof will be described below.

Figure 55:
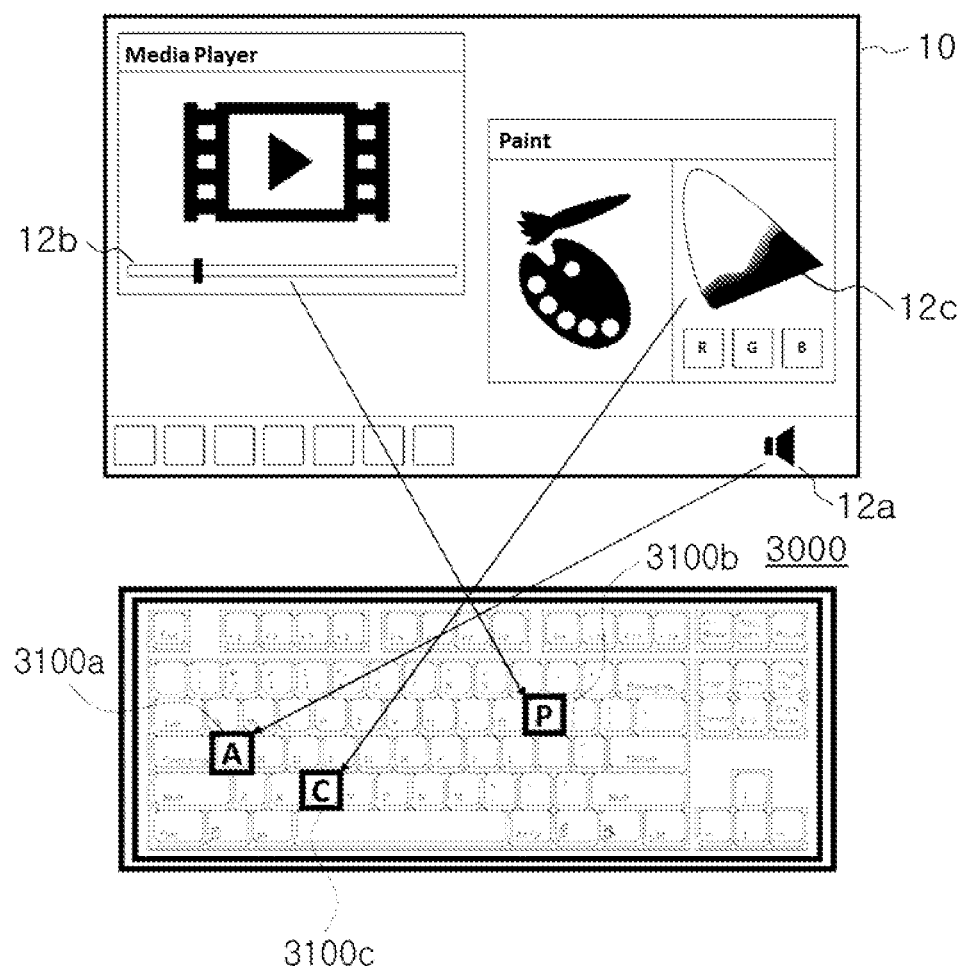
FIG. 55 is a diagram showing a matching relationship between an adjustment target attribute and a button of the pointing-device-integrated text input device.

FIG. 55 is a diagram showing a matching relationship between an adjustment target attribute and the button 3100.

Referring to FIG. 55, while the pointing-device-integrated text input device 3000 operates in the touch mode, the key input is deactivated by default. However, some keys may be set to recognize a key input. Also, adjustment target attributes may be allocated to key values of some of the buttons 3100 through which key inputs may be recognized.

That is, the controller 3500 may allocate an adjustment target attribute to a key value or a key identifier corresponding to at least one specific button 3100 in the touch mode. When a key input of the specific button 3100 is generated in the touch mode, the controller 3500 may acquire and output the corresponding key input as a keyboard input indicating a shortcut key of an adjustment target attribute. For example, an "A" button 3100a, a "P" button 3100b, and a "C" button 3100c may correspond to an attribute regarding audio volume, an attribute regarding a progress bar of a media player, and an attribute regarding a color space of a picture application, respectively.

When a key input is generated in the touch mode, the controller 3500 may determine whether a predetermined adjustment target attribute is allocated to a key identifier of a switch 3200 of a corresponding key or whether a key value having a predetermined adjustment target attribute is allocated to the key identifier of the switch 3200 of the corresponding key.

When an adjustment target attribute is allocated to a corresponding button 3100, the controller 3500 may recognize a subsequent touch input, acquire/transmit a mouse input or a digitizer input according to a touch coordinate value corresponding to the touch input, and enable an electronic device that received the mouse input or the digitizer input to adjust an attribute value of the adjustment target attribute according to the touch input.

To this end, the controller 3500 may generate shortcut key information for instructing that an adjustment target attribute be invoked or that an adjustment of the adjustment target attribute according to a key value, which is generated by a key input relative to the button 3100 to which the adjustment target attribute is allocated, be adjusted, and may deliver the generated shortcut key information to an electronic device.

As an example, a user may perform key input on the button 3100 to which an adjustment target attribute is allocated while the pointing-device-integrated text input device 3000 is operating in the touch mode. In this case, the controller 3500 may acquire a corresponding key identifier.

When the pointing-device-integrated text input device 3000 is operating in the keyboard mode, the controller 3500 may acquire and/or output the key value as a keyboard input reflecting a character value or a value used in a conventional keyboard (e.g., a value of an ESC key and a value of a Caps Lock key).

However, when the pointing-device-integrated text input device 3000 is operating in the touch mode, the controller 3500 may acquire a key identifier and determine whether an adjustment target attribute is allocated to the key identifier. When an adjustment target attribute is not allocated to the key identifier, the key input is ignored.

On the other hand, when an adjustment target attribute is allocated to the key identifier, the controller may output a subsequent touch input in the form of a mouse/digitizer input that is used to adjust an attribute value of the adjustment target attribute. Also, during this process, the controller 3500 may transmit and/or output information for identifying the adjustment target attribute or a signal for instructing that the adjustment target attribute be activated or invoked.

Here, when an adjustment target attribute is invoked or activated, a bar or plane for displaying an adjustment range of the adjustment target attribute and a graphic object including an indicator indicating a current attribute value may be output on the screen.

Figure 56:
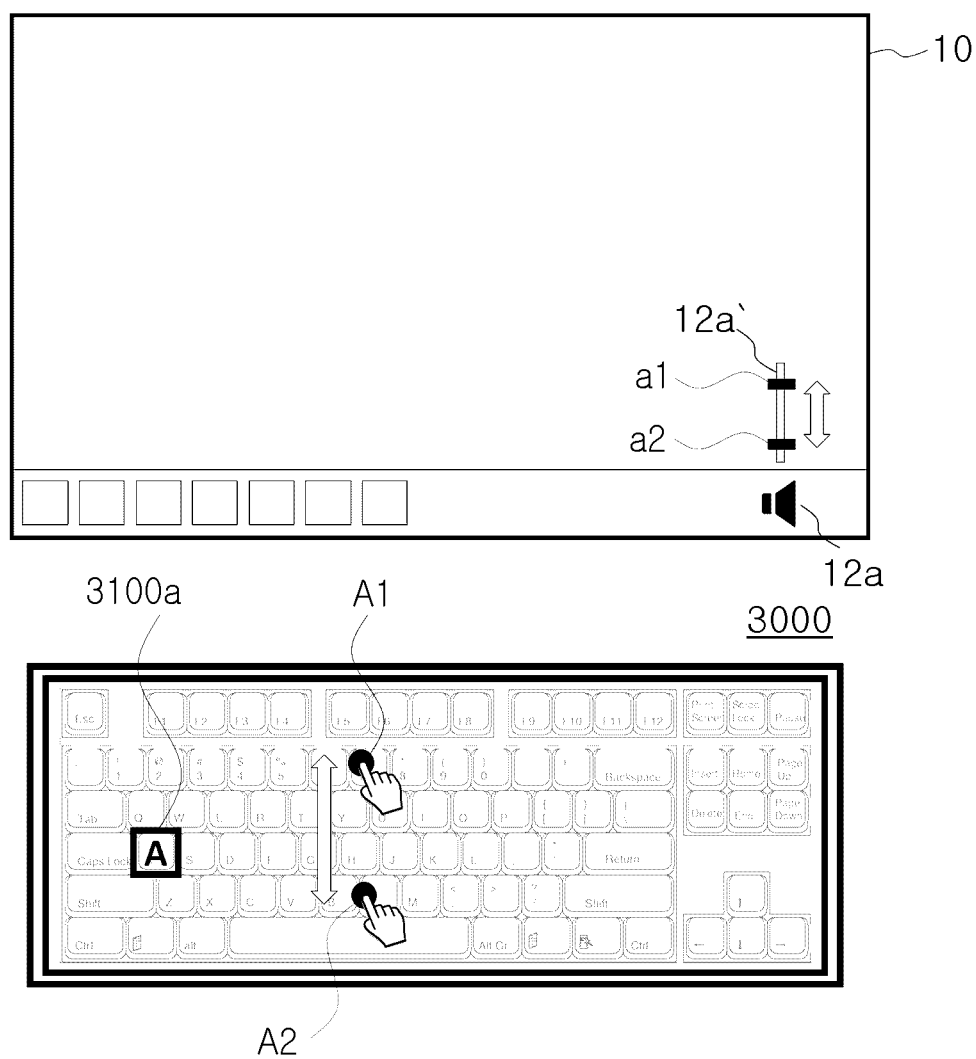
FIGS. 56 and 57 are diagrams showing an example in which the pointing-device-integrated text input device adjusts an adjustment target attribute.
Figure 57:
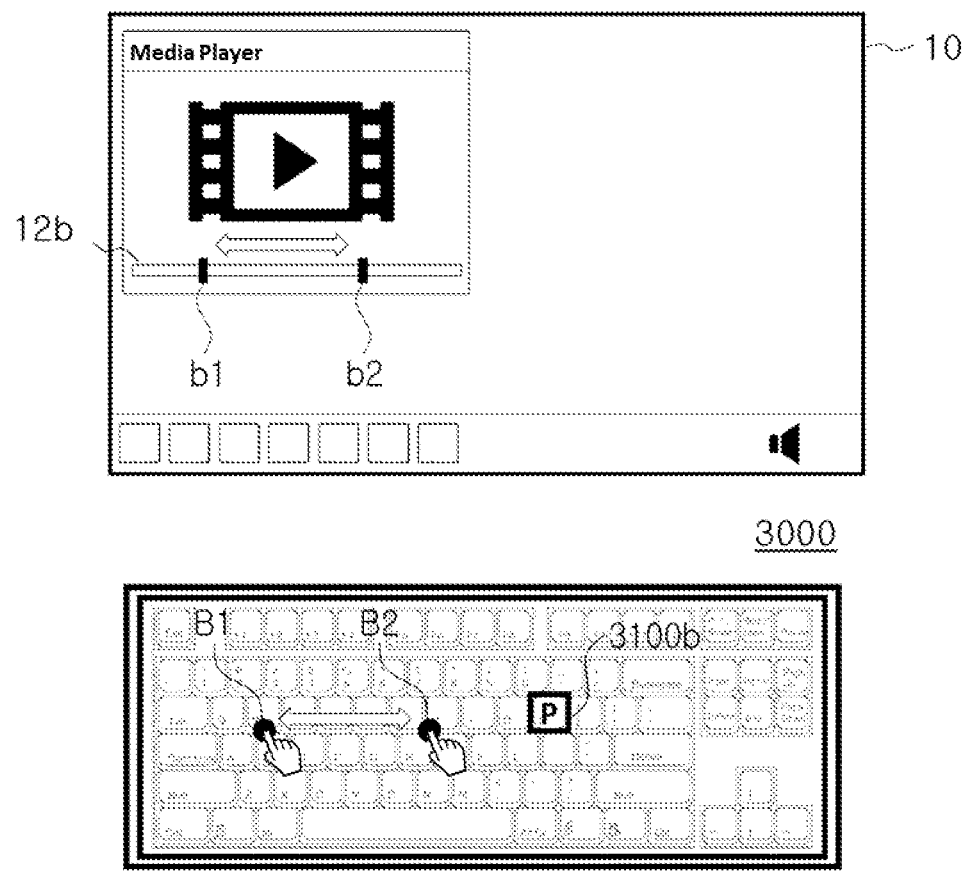

FIGS. 56 and 57 are diagrams showing an example in which the pointing-device-integrated text input device 3000 adjusts an adjustment target attribute.

The example will be described below with reference to FIG. 56.

When a key input relative to the "A" button is generated in a mode other than the touch mode, the pointing-device-integrated text input device 3000 may output a key value of the letter "A." Also, when a key input relative to the "A" button is generated in the touch mode, the pointing-device-integrated text input device 3000 may acquire a key value indicating an audio volume attribute from the key input relative to the "A" button and may output a signal for performing activation or invocation such that the audio volume attribute can be adjustable to an entity that uses the pointing-device-integrated text input device 3000 as an input interface.

Next, the controller 3500 may process a touch input that is applied after a key input associated with the adjustment target attribute is generated as an attribute adjustment value for adjusting an attribute value of the adjustment target attribute. The adjustment target attribute may be adjusted according to the attribute adjustment value.

In detail, a touch input that moves from a lower portion to an upper portion in a keyboard layout may increase an attribute value of the volume attribute. Also, a touch input that moves from the upper portion to the lower portion in the keyboard layout may decrease the attribute value of the volume attribute.

As described above, when the touch input is utilized as an input for adjusting a value of an adjustment target attribute rather than a mouse input for moving the position of the pointer P, the touch input may be referred to as an attribute adjustment input.

The attribute adjustment input may be provided by adding an adjustment target attribute to the mouse input, the digitizer input, or the like. Alternatively, the attribute adjustment input may be provided by making a touch coordinate value correspond to an attribute value.

That is, in FIG. 56, the pointing-device-integrated text input device 3000 may deliver a mouse input or a digitizer input corresponding to movement from a first touch position A1 to a second touch position A2 and information indicating an audio volume attribute, which is an adjustment target attribute, to an electronic device. The electronic device may output a graphic object corresponding to the audio volume attribute to a screen according to the information indicating the audio volume attribute and may adjust the attribute value from a first attribute value a1 to a second attribute value a2 according to a subsequent mouse input or digitizer input. In this case, the electronic device may move an indicator 12a' indicating the attribute value.

The example will be described below with reference to FIG. 57.

When a key input relative to the "P" button is generated in a mode other than the touch mode, the pointing-device-integrated text input device 3000 may output a key value of the letter "P." Also, when a key input relative to the "P" button is generated in the touch mode, the pointing-device-integrated text input device 3000 may acquire a key value indicating a media player playback attribute from the key input relative to the "P" button and may output a signal for performing activation or invocation so that the playback attribute can be adjustable to an entity that uses the pointing-device-integrated text input device 3000 as an input interface.

Subsequently, when a horizontal touch input is applied between a third touch position B1 and a fourth touch position B2, the playback attribute may be adjusted between a third attribute value b1 and a fourth attribute value b2.

Here, the adjustment target attribute may generally have a 1D attribute value. The adjustment target attribute having a 1D attribute value may be represented using a graphic object that includes a bar corresponding to an adjustment range represented with a minimum value and a maximum value and an indicator indicating a current attribute value on the bar. Also, the graphic object may be represented as a dial-type graphic object in which an attribute value is adjusted in a clockwise or counter-clockwise direction depending on cases.

However, all adjustment target attributes having a 1D attribute value are not represented using a graphic object.

The above-described adjustment target attribute having a 1D attribute value and represented with a graphic object including a bar and an indicator may be adjusted by vertically or horizontally moving a pointer. A direction in which the pointer is moved to adjust the attribute value may be defined as an attribute adjustment direction. For example, the above-described volume attribute has a vertical attribute adjustment direction, and the above-described playback attribute has a horizontal attribute adjustment direction.

Accordingly, when a touch input of the pointing-device-integrated text input device 3000 is used to adjust an attribute value of an adjustment target attribute. In detail, the controller 3500 may correct a touch coordinate value in consideration of the attribute adjustment direction and may acquire and/or output an attribute adjustment input on the basis of the corrected touch coordinate value.

Figure 58:
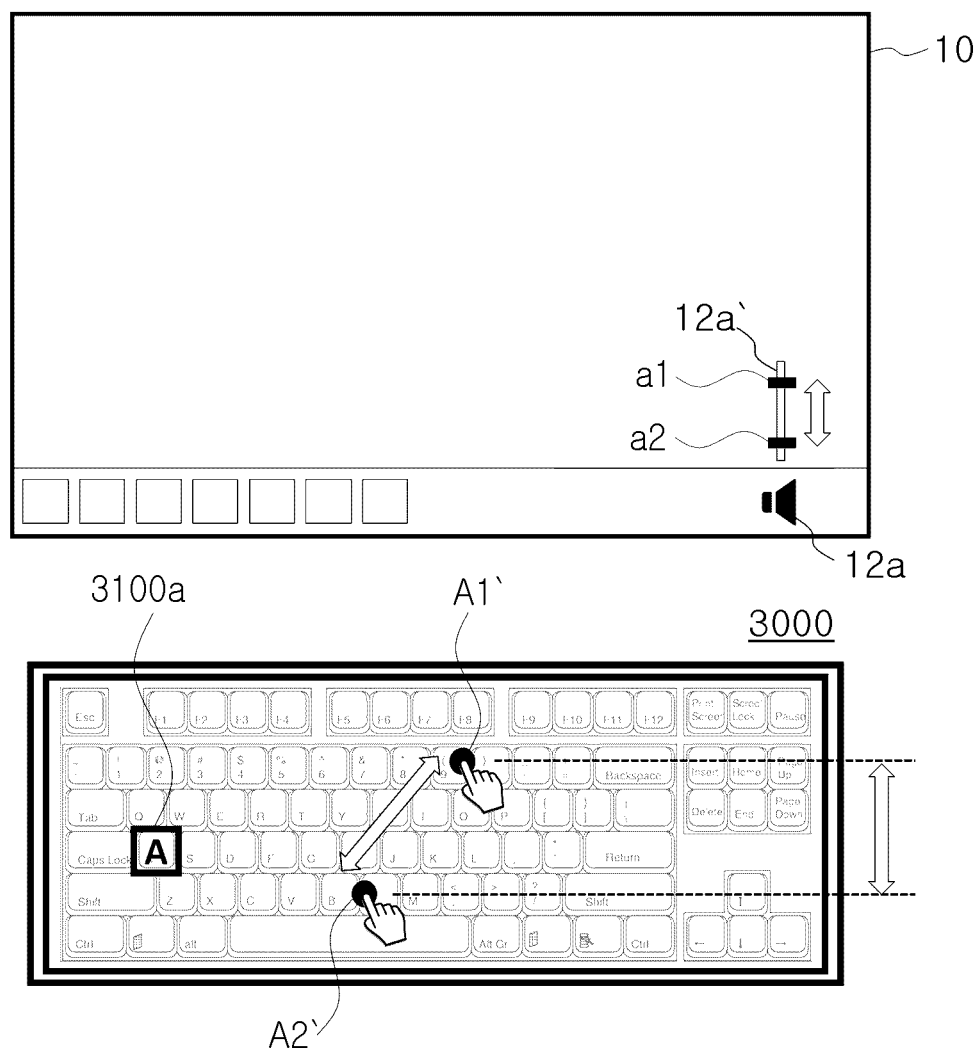
FIG. 58 is a diagram showing another example in which the pointing-device-integrated text input device adjusts an adjustment target attribute.

FIG. 58 is a diagram showing another example in which the pointing-device-integrated text input device 3000 adjusts an adjustment target attribute.

As an example, referring to FIG. 58, the volume attribute shown in FIG. 58 has a vertical attribute adjustment direction on the screen 10. In this case, when the pointing-device-integrated text input device 3000 receives a request to adjust the volume attribute through the "A" button 3100a, the controller 3500 may generate an attribute adjustment input according to a subsequent touch input. In this case, the controller 3500 may determine that the volume attribute is allocated to the "A" button and may determine that the attribute adjustment direction of the volume attribute is a vertical direction. When a subsequent touch input is generated, the controller 3500 may correct the touch coordinate value according to the attribute adjustment direction. That is, although a fifth touch A1' and a sixth touch A2' are performed in a diagonal direction, as shown in FIG. 58, the attribute adjustment direction of the volume attribute is the vertical direction in which the first attribute value a1 and the second attribute value a2 are arranged. Thus, the controller 3500 may process an attribute adjustment input for adjusting an attribute value by using only a vertical touch coordinate value obtained by removing a horizontal component from the diagonal touch input.

Figure 59:
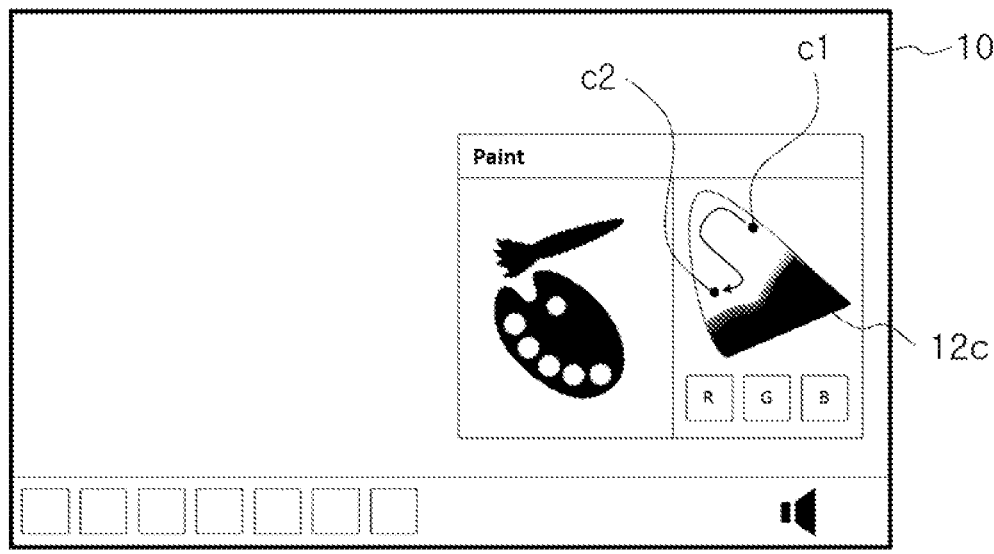
FIG. 59 is a diagram showing still another example in which the pointing-device-integrated text input device adjusts an adjustment target attribute.
Figure 59:
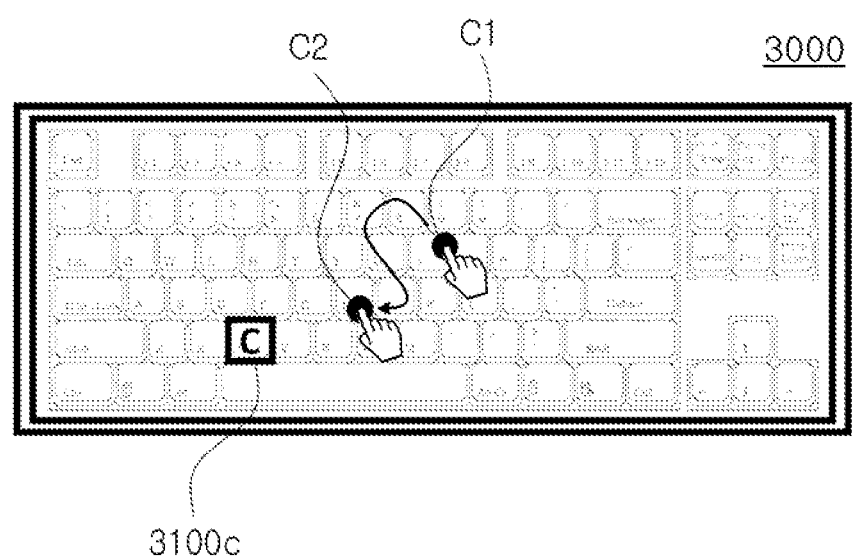

FIG. 59 is a diagram showing still another example in which the pointing-device-integrated text input device 3000 adjusts an adjustment target attribute.

The adjustment target attribute has been described as mainly having a 1D attribute value, but there is an adjustment target attribute having a two-dimensional (2D) attribute value such as a color space or a color coordinate depending on cases.

FIG. 59 shows a color plane 12c having a 2D attribute value. When the "C" button 3100c to which a color plane is applied is pressed, the pointing-device-integrated text input device 3000 may process a subsequent 2D touch coordinate value as an attribute adjustment input for adjusting a 2D attribute value.

As described above, when a keyboard input of a button associated with an adjustment target attribute is applied in a general touch mode, the pointing-device-integrated text input device 3000 may enter the touch mode for controlling an attribute value of the adjustment target attribute from the general touch mode. The attribute value of the adjustment target attribute may be interpreted as being adjusted according to a touch input in the touch mode.

Like this, there are various ways to process the touch input as an input for adjusting the attribute value of the adjustment target attribute. Some examples thereof will be described below.

First, when a key identifier allocated to a button 3100 indicating an adjustment target attribute is received in the touch mode, the controller 3500 may enter the attribute adjustment mode.

Here, a method of entering the attribute adjustment mode may be as follows.

As an example, when a key identifier of the button 3100 indicating the adjustment target attribute is received in the general touch mode, the controller 3500 may enter the attribute adjustment mode. Also, when the key identifier of the button 3100 indicating the adjustment target attribute is received in the attribute adjustment mode again, the controller 3500 may exit the attribute adjustment mode. In this case, the controller 3500 may return to the general touch mode again. The controller 3500 may process a touch input applied until the controller 3500 enters and then exits the attribute adjustment mode as an attribute adjustment input. Also, in this case, a key value indicating the attribute adjustment mode may be generally allocated to the ESC key or the like.

As another example, when the key identifier of the button 3100 indicating the adjustment target attribute is received in the general touch mode, the controller 3500 may enter the attribute adjustment mode. In this situation, the controller 3500 may process a one-time touch input as an attribute adjustment input. When the one-time touch input is ended, the controller 3500 may exit the attribute adjustment mode and return to the general touch mode.

As still another example, when the key identifier of the button 3100 indicating an adjustment target attribute is received in the general touch mode, the controller 3500 may maintain the attribute adjustment mode while the button 3100 is pressed. When the button 3100 is released, the controller 3500 exits the attribute adjustment mode. The controller 3500 may process a touch input that is applied until the controller 3500 enters and then exits the attribute adjustment mode as the attribute adjustment input. The controller 3500 may exit the attribute adjustment mode and return to the general touch mode.

Here, it has been described that the pointing-device-integrated text input device 3000 may enter the attribute adjustment mode and process a touch input applied in the attribute adjustment mode as an attribute adjustment input. However, there may not be a separate mode referred to as the attribute adjustment mode, and the pointing-device-integrated text input device 3000 may process, a touch input that is applied under a specific condition as the attribute adjustment input. Here, the specific condition may be similar to the above-described example.

Figure 60:
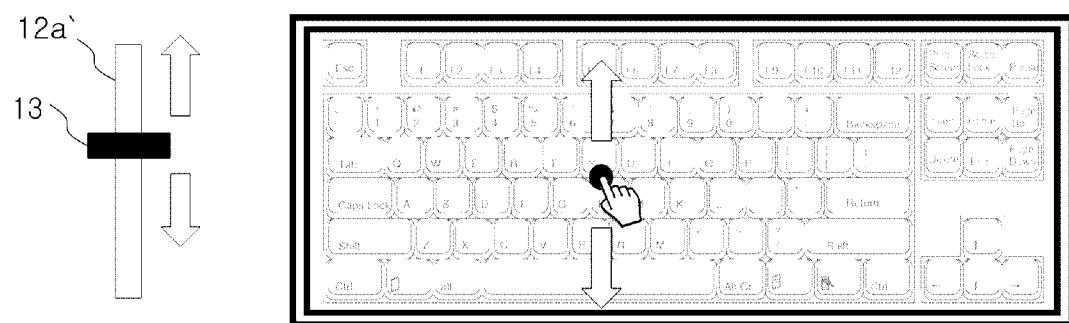
FIG. 60 is a diagram showing a first example in which the pointing-device-integrated text input device processes a touch input for adjusting an adjustment target attribute.

FIG. 60 is a diagram showing a first example in which the pointing-device-integrated text input device 3000 processes a touch input for adjusting an adjustment target attribute.

According to the first example, referring to FIG. 60, the touch input of the pointing-device-integrated text input device 3000 which is in the attribute adjustment mode is processed similarly to that of the above-described mouse input. However, instead of calculating a mouse input from a touch coordinate value, it is possible to calculate the mouse input by using a corrected touch coordinate value in consideration of an attribute adjustment direction. An attribute value of an adjustment target attribute may be increased or decreased depending on the attribute adjustment input processed similarly to that of the mouse input.

In detail, for the audio volume attribute 12*a*' having a vertical attribute adjustment direction, the attribute value and a position of an indicator 13 indicating the volume attribute value may be adjusted by a vertical touch input.

Figure 61:
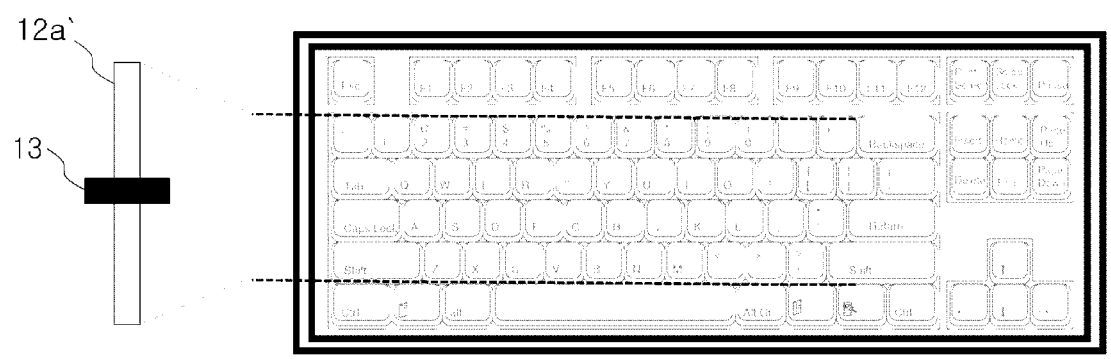
FIG. 61 is a diagram showing a second example in which the pointing-device-integrated text input device processes a touch input for adjusting an adjustment target attribute.

FIG. 61 is a diagram showing a second example in which the pointing-device-integrated text input device 3000 processes a touch input for adjusting an adjustment target attribute.

According to the second example, referring to FIG. 61, when the attribute adjustment mode is entered, the touch input of the pointing-device-integrated text input device 3000 may match a touch region to an adjustment range of an attribute value of an attribute target attribute to perform an attribute adjustment. The pointing-device-integrated text input device 3000 may process a subsequent touch input in a similar way to that of a digitizer input to acquire an attribute adjustment input.

In detail, for the audio volume attribute 12*a*' having a vertical attribute adjustment direction, the touch input of the pointing-device-integrated text input device 3000 may set a touch region for a touch input relative to the attribute adjustment input such that a maximum volume value and a minimum volume value are matched to a top portion and a bottom portion of the touchable region 3010'. To this end, the controller 3500 may acquire an attribute value range and may set the touch region on the basis of the attribute value range. By using a subsequent touch input for an attribute arrangement, the controller 3500 may determine that touch coordinate values of a top coordinate value and a bottom coordinate value of the touch region are a maximum attribute value and a minimum attribute value, respectively.

Figure 62:
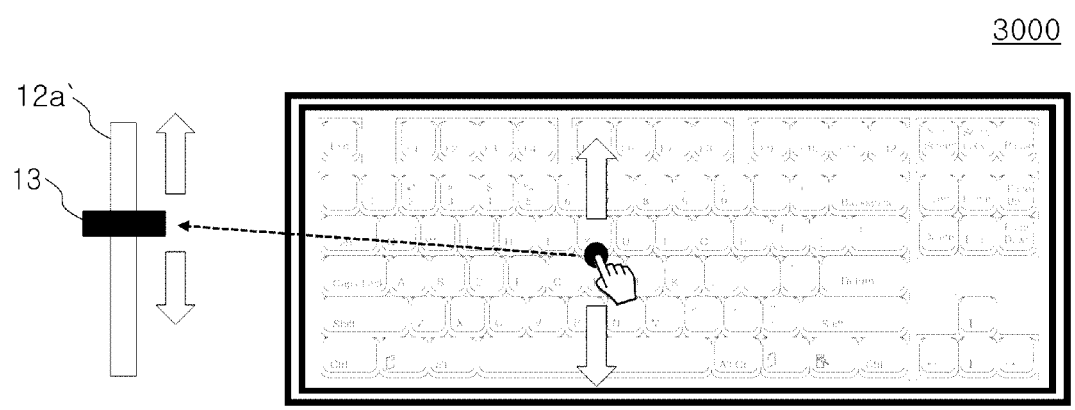
FIG. 62 is a diagram showing a third example in which the pointing-device-integrated text input device processes a touch input for adjusting an adjustment target attribute.

FIG. 62 is a diagram showing a third example in which the pointing-device-integrated text input device 3000 processes a touch input for adjusting an adjustment target attribute.

According to the third example, referring to FIG. 62, the touch input of the pointing-device-integrated text input device 3000 may match a touch coordinate value of a touch input that is first applied after the attribute adjustment mode (hereinafter, a touch input that is first applied after a specific mode is entered is referred to as a "start touch input," and a touch coordinate value of the start touch input is referred to as a "start touch coordinate value") is entered to a current attribute value of an adjustment target attribute. That is, the controller 3500 may make a start coordinate touch value correspond to a current attribute value, and then may generate an attribute adjustment input to adjust the attribute value by using a variation of a start coordinate touch value of a subsequent touch coordinate value.

Figure 63:
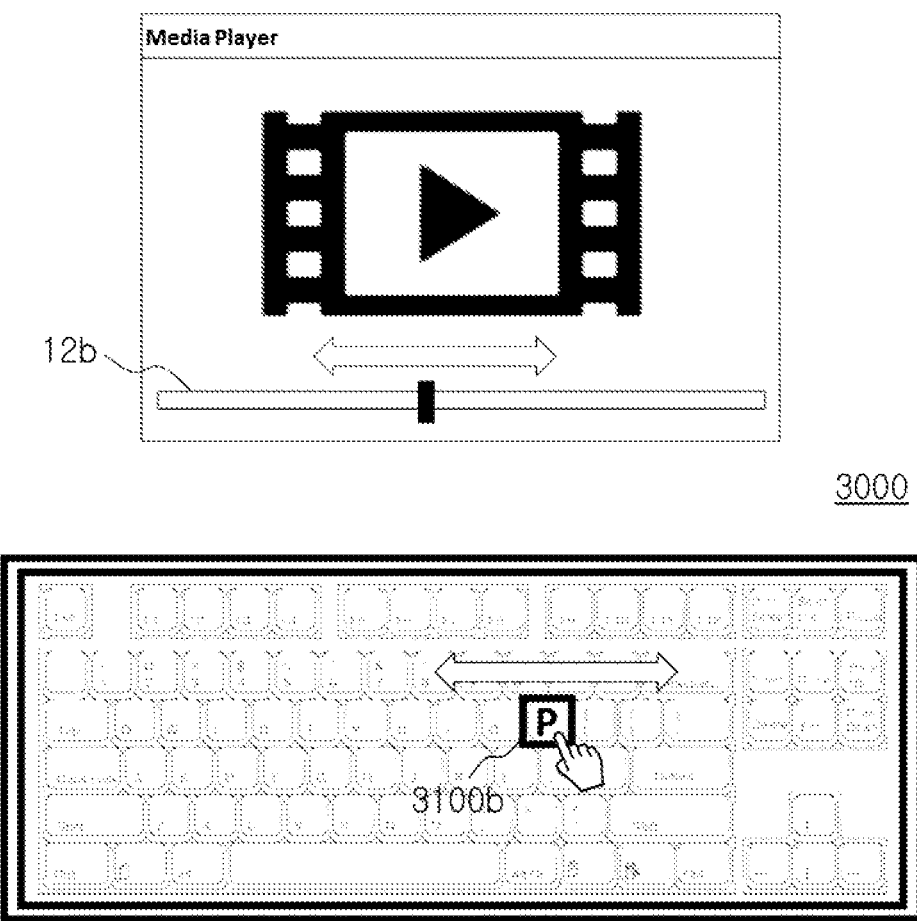
FIG. 63 is a diagram showing a fourth example in which the pointing-device-integrated text input device processes a touch input for adjusting an adjustment target attribute.

FIG. 63 is a diagram showing a fourth example in which the pointing-device-integrated text input device 3000 processes a touch input for adjusting an adjustment target attribute.

According to the fourth example, referring to FIG. 63, the pointing-device-integrated text input device 3000 may process a touch input that is continuously applied from a time point at which a touch input performed by a push input relative to a button 3100, to which an adjustment target attribute is allocated, is input as a touch input for attribute adjustment.

In detail, when a user pushes the "P" button 3100*b* indicating a media player playback attribute 12*b*, the pointing-device-integrated text input device 3000 may acquire a touch input starting from the "P" button 3100*b* in addition to the push input. The controller 3500 may process a touch coordinate value of a touch input that is performed until the touch input starting from the "P" button 3100*b* is released as an attribute adjustment input.

Figure 64:
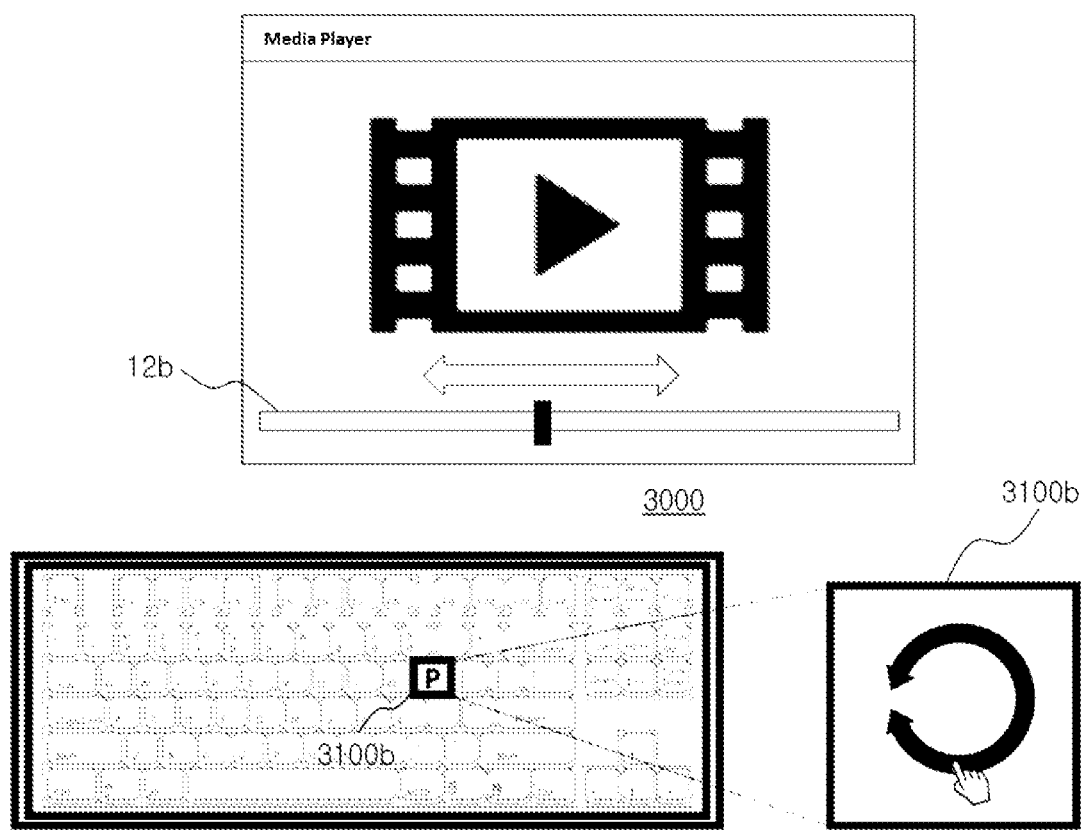
FIG. 64 is a diagram showing a fifth example in which the pointing-device-integrated text input device processes a touch input for adjusting an adjustment target attribute.

FIG. 64 is a diagram showing a fifth example in which the pointing-device-integrated text input device 3000 processes a touch input for adjusting an adjustment target attribute.

According to the fifth example, referring to FIG. 64, the pointing-device-integrated text input device 3000 may process a touch input that is continuously applied from a time point at which a touch input performed by a push input relative to a button 3100, to which an adjustment target attribute is allocated, is input as a touch input for an attribute adjustment.

In detail, when a user pushes the "P" button 3100b indicating the media player playback attribute 12b, the pointing-device-integrated text input device 3000 may acquire a touch input starting from the "P" button 3100b in addition to the push input. The controller 3500 may process a touch input that is subsequently sensed on the electrode 3130 in the "P" button 3100b as an attribute adjustment input.

A sensing region provided for a single button may not be sufficiently wide. In this case, the controller 3500 may process an attribute adjustment input on the basis of a touch input that rotates clockwise or counterclockwise about the button. For example, the clockwise touch input may be processed as an input for increasing an attribute value, and counterclockwise touch input may be processed as an input for decreasing an attribute value. As a detailed example, the clockwise touch input may be processed as an input for moving an indicator on a progress bar to the right and moving a play time of the playback attribute 12b backward, and the counterclockwise touch input may be processed as an input for moving the indicator on the progress bar to the left and moving the play time of the playback attribute 12b forward.

Figure 65:
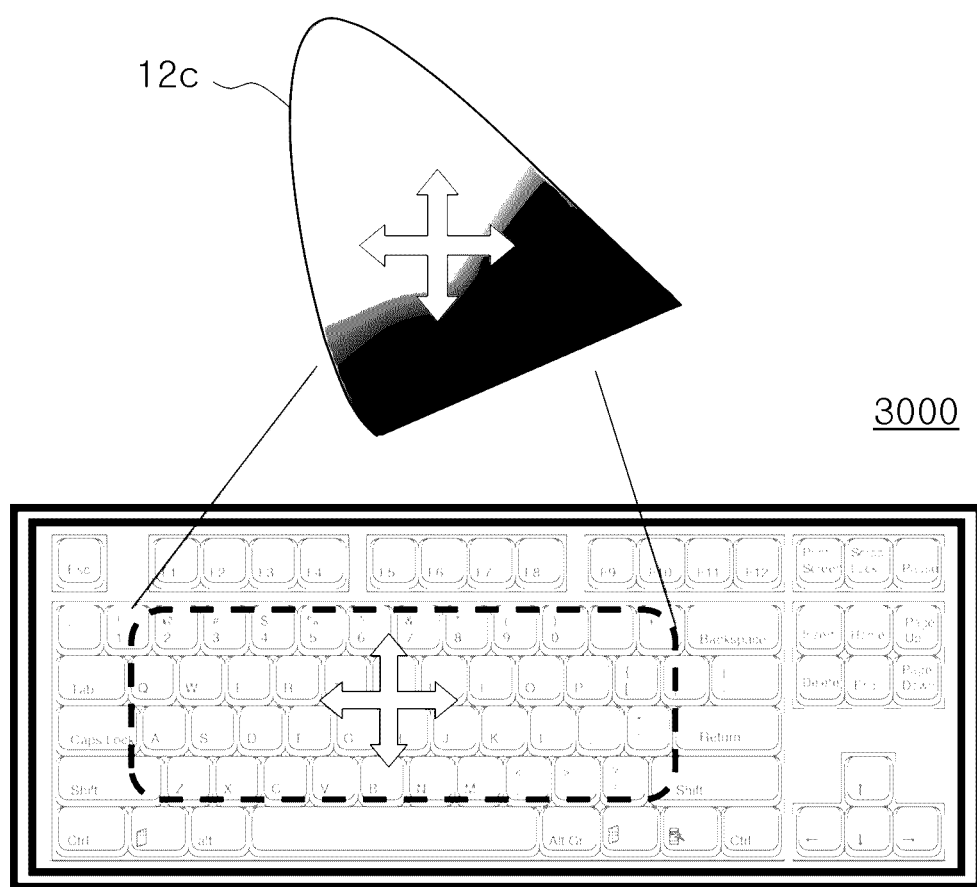
FIG. 65 is a diagram showing a sixth example in which the pointing-device-integrated text input device processes a touch input for adjusting an adjustment target attribute.

FIG. 65 is a diagram showing a sixth example in which the pointing-device-integrated text input device 3000 processes a touch input for adjusting an adjustment target attribute.

According to the sixth example, referring to FIG. 65, when an adjustment target attribute has a 2D attribute value, a touch region for receiving a touch input for adjusting the adjustment target attribute may also be set in the form of a 2D plane. That is, a touch region matched to a region of a graphic object reflecting the 2D attribute value may be set in the attribute adjustment mode. In FIG. 65, the color plane 12c and the entire touchable region 3010' may be matched to each other.

Figure 66:
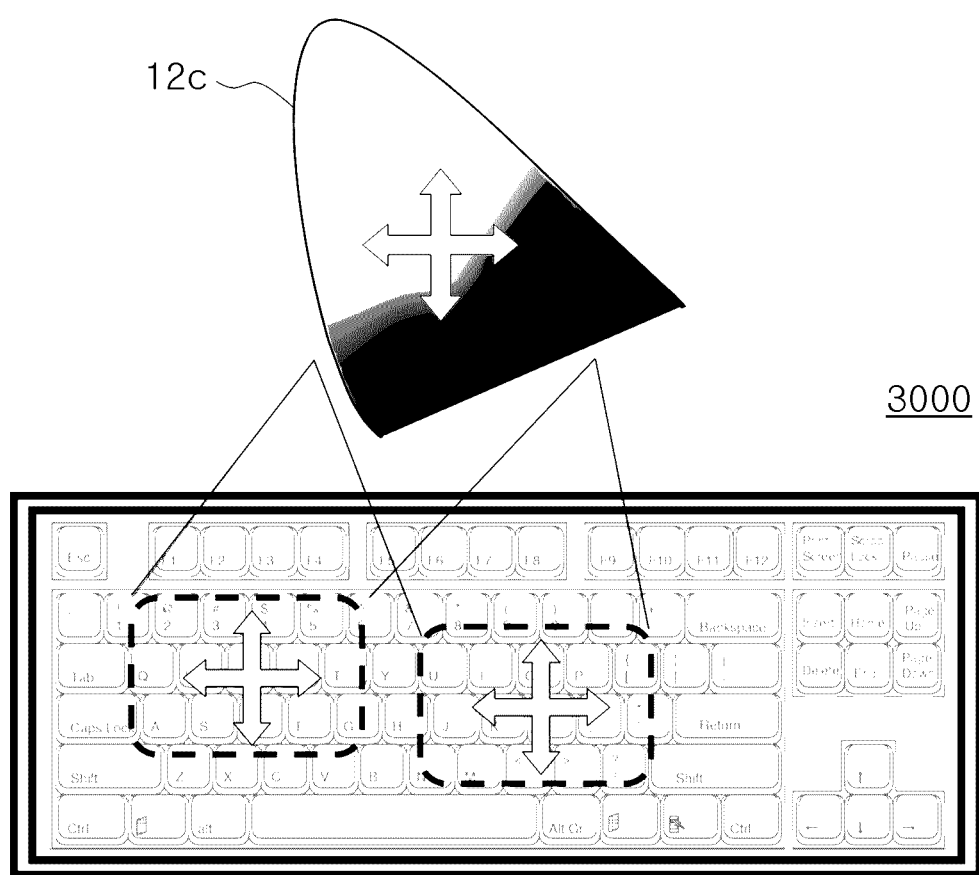
FIG. 66 is a diagram showing a seventh example in which the pointing-device-integrated text input device processes a touch input for adjusting an adjustment target attribute.

FIG. 66 is a diagram showing a seventh example in which the pointing-device-integrated text input device 3000 processes a touch input for adjusting an adjustment target attribute.

According to the seventh example, referring to FIG. 66, when an adjustment target attribute has a 2D attribute value, a touch region for receiving a touch input for adjusting the adjustment target attribute may also be set in the form of a 2D plane. That is, a touch region matched to a region of a graphic object reflecting the 2D attribute value may be set in the attribute adjustment mode. In FIG. 66, a touch region in which a touch coordinate value and a position of the pointer P on the color plane 12c may be set for each touch.

Some examples for processing a touch input as an attribute adjustment input have been described. However, it should be noted that the method of processing a touch input as an attribute adjustment input is not limited to the above examples.

Some methods in which the pointing-device-integrated text input device 3000 adjusts an attribute value of an adjustment target attribute will be described below.

Figure 67:
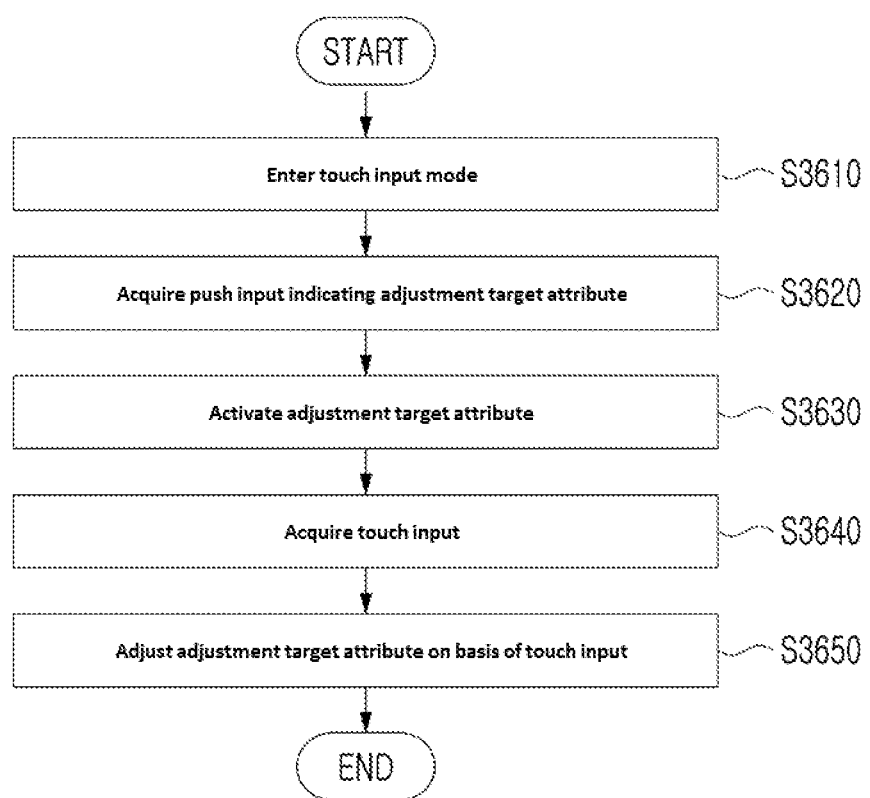
FIG. 67 is a flowchart showing an example in which the pointing-device-integrated text input device adjusts an adjustment target attribute.

FIG. 67 is a flowchart showing an example in which the pointing-device-integrated text input device 3000 adjusts an adjustment target attribute.

Referring to FIG. 67, the method may include entering a touch input mode (S3610), acquiring a push input indicating an adjustment target attribute (S3620), activating the adjustment target attribute (S3630), acquiring a touch input (S3640), and adjusting the adjustment target attribute on the basis of the touch input (S3650).

The above-described steps will be described in detail below.

The pointing-device-integrated text input device 3000 enters the touch input mode (S3610). In this case, the touch input mode may correspond to the above-described mouse mode or digitizer mode. Here, the pointing-device-integrated text input device 3000 may activate the electrode 3130 to detect a touch input. However, the pointing-device-integrated text input device 3000 does not deactivate all of the switches 3200 and activates at least those switches 3200 of buttons 3100 to which an adjustment target attribute is allocated.

The pointing-device-integrated text input device 3000 may acquire a push input indicating an adjustment target attribute (S3620). When a push input relative to a button 3100 having a key value or a key identifier to which the adjustment target attribute is allocated among a plurality of activated buttons 3100 is received, the controller 3500 may acquire the key value or the key identifier and activate the allocated adjustment target attribute according to the acquired key value or key identifier (S3630). While performing the activation, the pointing-device-integrated text input device 3000 may invoke the adjustment target attribute or deliver a signal for making a request to display a graphic object of the adjustment target to an electronic device.

When the adjustment target attribute is activated or when the pointing-device-integrated text input device 3000 enters the attribute adjustment mode for the adjustment target attribute, the pointing-device-integrated text input device 3000 may acquire a touch input (S3640), and may adjust the adjustment target attribute on the basis of the touch input (S3650). The controller 3500 of the pointing-device-integrated text input device 3000 may generate an attribute adjustment input on the basis of a touch coordinate value and may deliver the generated attribute adjustment input to an entity that uses the pointing-device-integrated text input device 3000 as an input interface.

Figure 68:
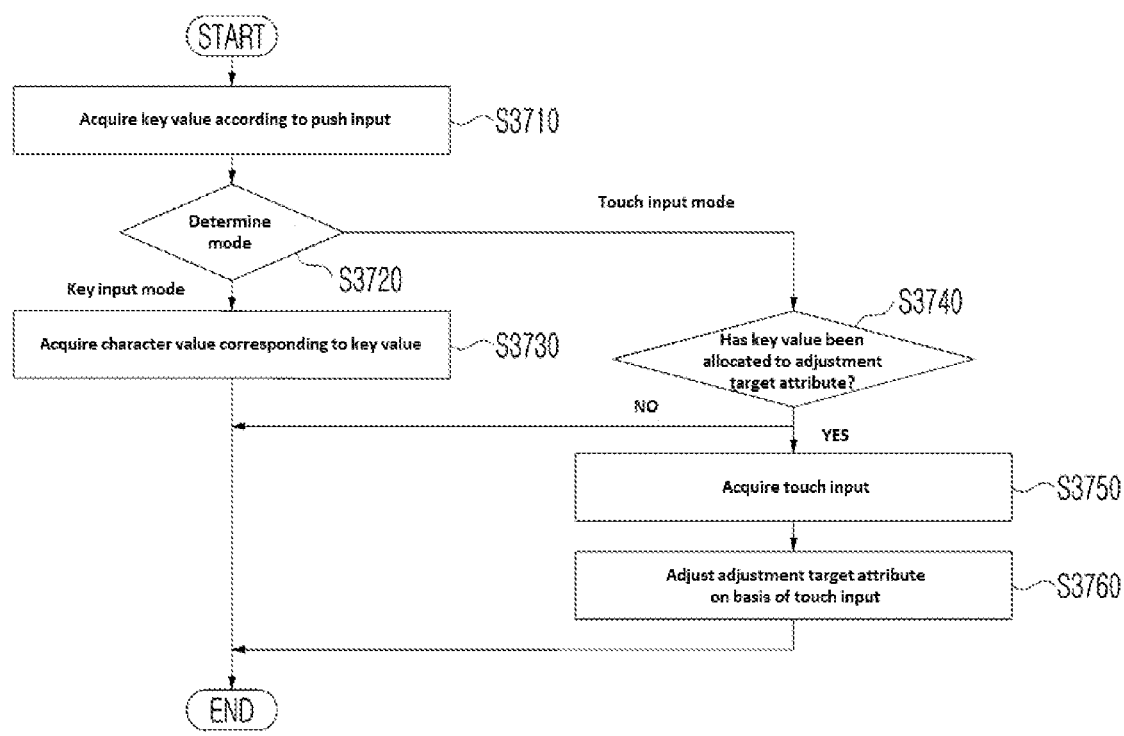
FIG. 68 is a flowchart showing another example in which the pointing-device-integrated text input device adjusts an adjustment target attribute.

FIG. 68 is a flowchart showing another example in which the pointing-device-integrated text input device 3000 adjusts an adjustment target attribute.

Referring to FIG. 68, the method may include acquiring a key identifier according to a push input (S3710), determining a mode (S3720), acquiring a character value corresponding to the key identifier (S3730), determining a key value to which an adjustment target attribute is allocated (S3740), acquiring a touch input (S3750), and adjusting the adjustment target attribute on the basis of the touch input (S3760).

The above-described steps will be described in detail below.

The pointing-device-integrated text input device 3000 may acquire a key identifier according to a push input (S3710). In detail, the controller 3500 may receive the key identifier from the switch 3200 that received the push input.

Next, the pointing-device-integrated text input device 3000 may determine a mode (S3720). In detail, the controller 3500 may determine whether the current mode is the touch mode or the keyboard mode.

When the current mode is the keyboard mode, the pointing-device-integrated text input device 3000 may acquire a character value corresponding to the key identifier as a key value (S3730). The key value may be delivered to an electronic device in the form of a keyboard input and used for text input.

When the current mode is the touch mode, the pointing-device-integrated text input device 3000 may acquire an adjustment target attribute allocated to the key identifier (S3740). On the basis of a touch input that is subsequently acquired (S3750), the pointing-device-integrated text input device 3000 may adjust an attribute value of the adjustment target attribute (S3760). The adjustment of the attribute value may be performed by the pointing-device-integrated text input device 3000 generating an attribute adjustment input by means of a touch coordinate value of the touch input and delivering the generated attribute adjustment input to the electronic device.

Figure 69:
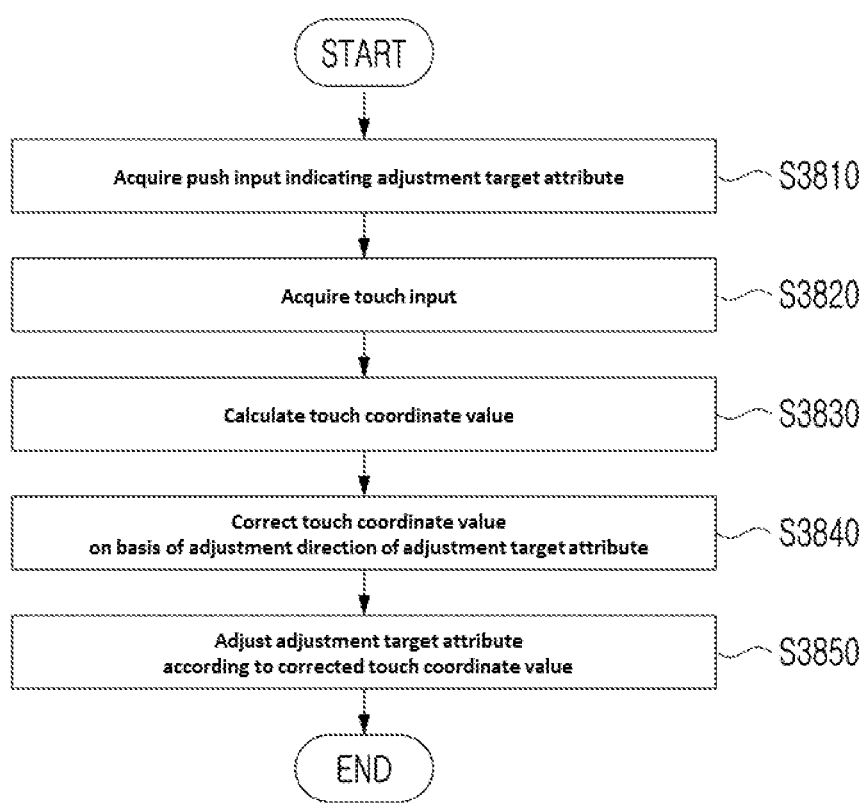
FIG. 69 is a flowchart showing still another example in which the pointing-device-integrated text input device adjusts an adjustment target attribute.

FIG. 69 is a flowchart showing still another example in which the pointing-device-integrated text input device 3000 adjusts an adjustment target attribute.

Referring to FIG. 69, the method may include acquiring a push input indicating an adjustment target attribute (S3810), acquiring a touch input (S3820), calculating a touch coordinate value (S3830), correcting the touch coordinate value on the basis of an adjustment direction of the adjustment target attribute (S3840), and adjusting the adjustment target attribute according to the corrected touch coordinate value (S3850).

The above-described steps will be described in detail below.

The pointing-device-integrated text input device 3000 may acquire a push input indicating an adjustment target attribute (S3810) and acquire a subsequent touch input (S3820). The controller 3500 may calculate a touch coordinate value (S3830).

Next, the pointing-device-integrated text input device 3000 may correct the touch coordinate value on the basis of an adjustment direction of the adjustment target attribute (S3840). Generally, the touch input is represented as a 2D touch coordinate value. When the adjustment target attribute has a 1D attribute value, the controller 3500 may correct the touch coordinate value as a 1D coordinate value according to the adjustment direction of the adjustment target attribute.

When the touch coordinate value is corrected, the pointing-device-integrated text input device 3000 may adjust the adjustment target attribute according to the corrected touch coordinate value (S3850). The adjustment of the adjustment target attribute may be performed by the controller 3500 generating an attribute adjustment input according to the corrected touch coordinate value and delivering the generated attribute adjustment input to an electrode device, and by the electronic device adjusting an attribute value of the adjustment target attribute according to the attribute adjustment input.

Figure 70:
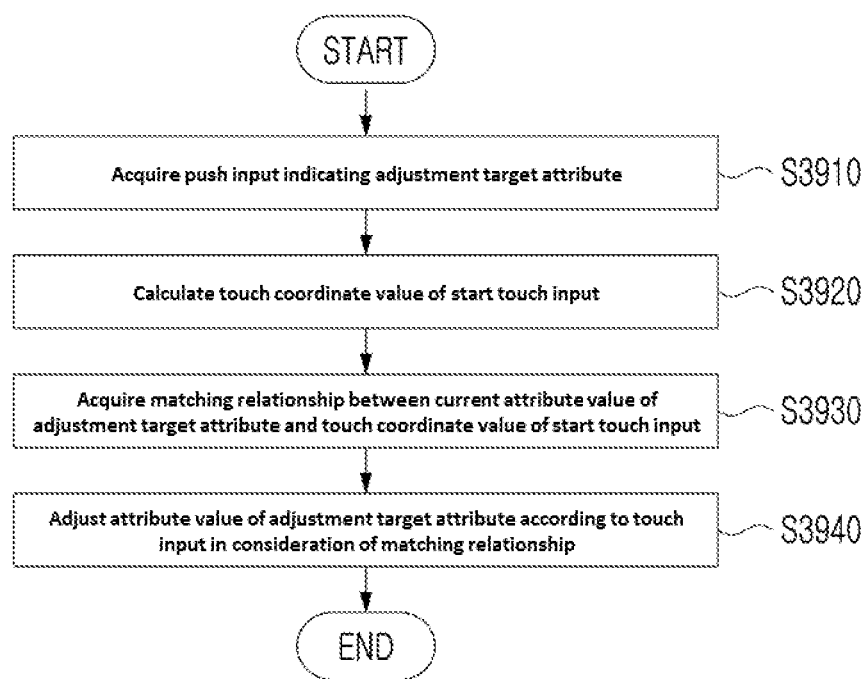
FIG. 70 is a flowchart showing still another example in which the pointing-device-integrated text input device adjusts an adjustment target attribute.

FIG. 70 is a flowchart showing still another example in which the pointing-device-integrated text input device 3000 adjusts an adjustment target attribute.

Referring to FIG. 70, the method may include acquiring a push input indicating an adjustment target attribute (S3910), calculating a touch coordinate value of a start touch input (S3920), acquiring a matching relationship between a current attribute value of the adjustment target attribute and the touch coordinate value of the start touch input (S3930), and adjusting the attribute value of the adjustment target attribute according to the touch input in consideration of the matching relationship (S3940).

The above-described steps will be described in detail below.

The pointing-device-integrated text input device 3000 may acquire a push input indicating an adjustment target attribute (S3910) and acquire a start touch input.

When the start touch input is acquired, the pointing-device-integrated text input device 3000 may calculate a start touch coordinate value (S3920).

Next, the pointing-device-integrated text input device 3000 may generate a matching relationship between a current attribute value of the adjustment target attribute and a touch coordinate value of the start touch input (S3930). The controller 3500 may acquire the current attribute value and generate a table or function that matches the acquired attribute value and the start touch coordinate value.

When the matching relationship is generated, the pointing-device-integrated text input device 3000 may adjust an attribute value of the adjustment target attribute according to the touch input in consideration of the matching relationship (S3940).

Here, the matching relationship does not have to be set. Instead of forming the matching relationship, the pointing-device-integrated text input device 3000 may generate an attribute adjustment input on the basis of a difference value between the touch coordinate value of the start touch input and a subsequent touch coordinate value. Since the pointing-device-integrated text input device 3000 calculates a touch coordinate variation according to a difference between a current touch coordinate value and the start touch coordinate value instead of performing a difference operation of a touch coordinate value for each period of a scan signal, the same effect as that obtained by substantially forming a matching relationship and matching the current touch coordinate value to the attribute value may be obtained.

Figure 71:
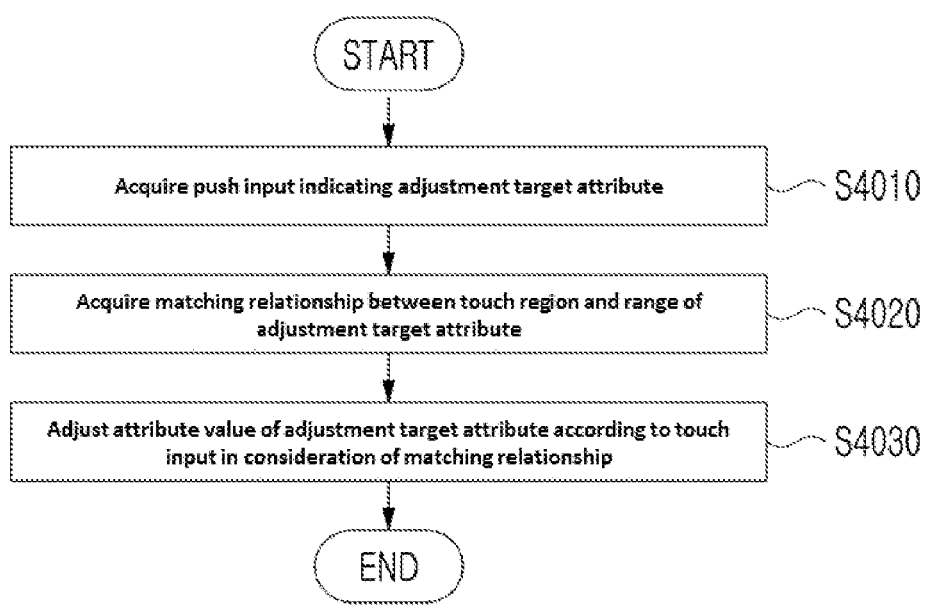
FIG. 71 is a flowchart showing still another example in which the pointing-device-integrated text input device adjusts an adjustment target attribute.

FIG. 71 is a flowchart showing still another example in which the pointing-device-integrated text input device 3000 adjusts an adjustment target attribute.

Referring to FIG. 71, the method may include acquiring a push input indicating an adjustment target attribute (S4010), acquiring a matching relationship between a touch region and a range of the adjustment target attribute (S4020), and adjusting an attribute value of the adjustment target attribute according to a touch input in consideration of the matching relationship (4030).

The above-described steps will be described in detail below.

The pointing-device-integrated text input device 3000 may acquire a push input indicating an adjustment target attribute (S4010) and set a touch region.

In this case, the pointing-device-integrated text input device 3000 may acquire a matching relationship between the touch region and a range of the adjustment target attribute (S4020). For example, when the adjustment target attribute has a 1D attribute value, the controller 3500 may generate a matching relationship such that a maximum value and a minimum value of the attribute value are matched to an upper side and a lower side or a left side and a right side of a touch region, and may set the touch region. As another example, when the adjustment target attribute has a 2D attribute value, the controller 3500 may match a maximum value and a minimum value of any one of two attribute values to the upper side and the lower side of the touch region and also match a maximum value and a minimum value of the other one of the two attribute values to the left side and the right side of the touch region. Here, it should be appreciated that the touch region does not have to be set as the entire touchable region.

The pointing-device-integrated text input device 3000 may adjust an attribute value of the adjustment target attribute according to a touch input in consideration of the matching relationship (S4030). This has been described above, and thus a detailed description thereof will be omitted.

In this description, the pointing-device-integrated text input device 3000 may detect a hovering input in addition to a key input and a touch input. Here, the hovering input may refer to an input in which a user's finger or body part is positioned in the vicinity of an upper portion of the button 3100 unlike a touch input in which the button 3100 is directly touched. Hereinafter, the touch input and the hovering input are collectively referred to as a gesture input.

Figure 72:
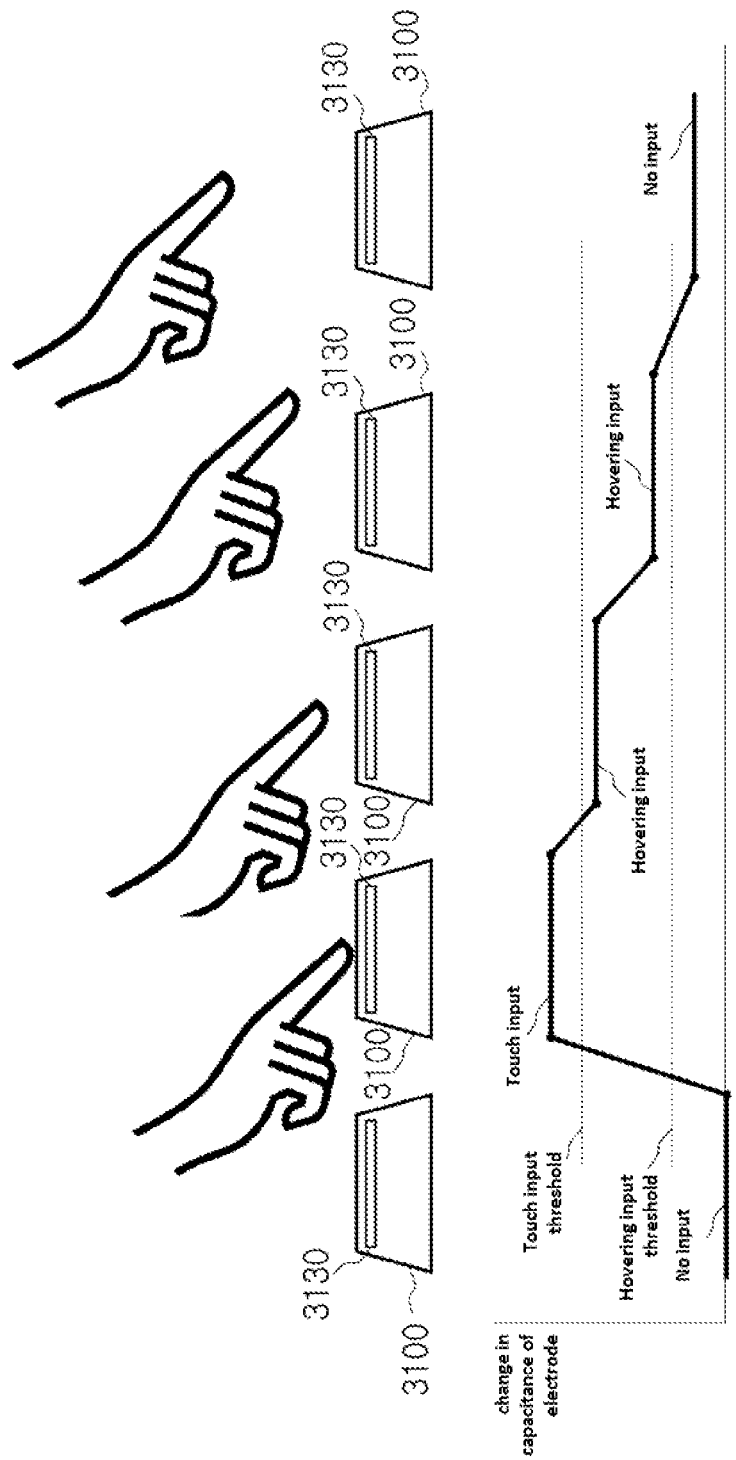
FIG. 72 is an example of a hovering input of the pointing-device-integrated text input device.

FIG. 72 is an example of a hovering input of the pointing-device-integrated text input device 3000 of FIG. 30.

In this description, the pointing-device-integrated text input device 3000 may detect a touch input by means of a change in capacitance of the electrode 3130 included in the button 3100 according to a user's touch input. Here, when the user's body part (e.g., a finger) is located over the button 3100, the capacitance of the electrode 3130 included in the button 3100 may change, but the amount of change is smaller than that of the touch input. The controller 3500 may acquire the amount of change through a scan signal to process the amount of change as a hovering input.

Referring to FIG. 72, it can be seen that a large change in capacitance occurs even when a hovering input is input although the amount of change is smaller than the amount of change in capacitance generated by a touch input.

In particular, depending on cases, the controller 3500 may sense a distance from a keyboard surface to the user's body part in a direction perpendicular to the keyboard layout as well as a horizontal position of the hovering input according to the amount of change in capacitance.

That is, the controller 3500 may calculate a value (x, y) on the basis of a scan signal reflecting the change in capacitance like that of a touch input. Further, when the change in capacitance is a predetermined threshold or more smaller than a change in capacitance occurring during input of a touch input, the controller 3500 may determine that the change is a hovering input. Also, when it is determined that the hovering input is applied, the controller 3500 may further calculate a z-value (a hovering coordinate value perpendicular to the keyboard layout) on the basis of the amount of change in capacitance.

In detail, the controller 3500 may detect a touch input when the amount of change in capacitance is greater than a touch input threshold, and may detect a hovering input when the amount of change in capacitance is both the touch input threshold or less and a hovering input threshold or more.

As shown in FIG. 72, when the electrode 3130 is touched with a finger, the amount of change in capacitance is a touch threshold value or more, and the pointing-device-integrated text input device 3000 may detect the touch as a touch input. For a second hand and a third hand each having a finger located a predetermined distance from the electrode 3130 in FIG. 72, the amount of change in capacitance is a hovering threshold value or more, and thus the pointing-device-integrated text input device 3000 may detect such changes as a hovering input.

Also, when a finger is far from the electrode 3130 such that a change in capacitance of the hovering threshold value or less is detected, the pointing-device-integrated text input device 3000 may process the change as no input.

In this description, the pointing-device-integrated text input device 3000 may control a plurality of electronic devices 20.

Figure 73:
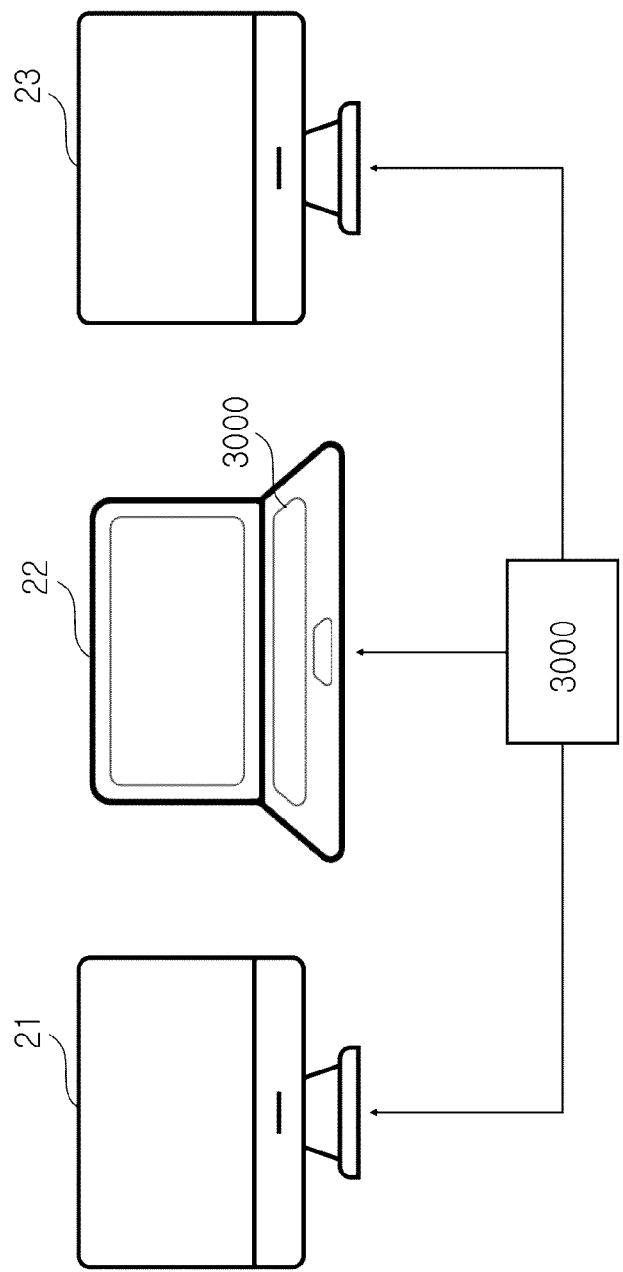
FIG. 73 is an example of a multi-device environment using the pointing-device-integrated text input device of FIG. 30.

FIG. 73 is an example of a multi-device environment using the pointing-device-integrated text input device 3000 of FIG. 30.

Referring to FIG. 73, the pointing-device-integrated text input device 3000 may control a first electronic device 21, a second electronic device 22, and a third electronic device 23. Here, the first to third electronic devices are electronic devices that are configured to independently control a display, and are thus configured to control an independently operating pointer P on the screen 10. Here, all of the electronic devices 20 may be electronic devices that are separate from the pointing-device-integrated text input device 3000, or any one of the electronic devices 20 may be an electronic device in which the pointing-device-integrated text input device 3000 is embedded. In the following description, for convenience of description, the first electronic device 21 and the third electronic device 23 are elements that are separate from the pointing-device-integrated text input device 3000, and the second electronic device 22 is provided integrally with the pointing-device-integrated text input device 3000. However, it should be noted that the multi-device environment is not limited thereto in this description.

Referring back to FIG. 73, the pointing-device-integrated text input device 3000 may operate as an input interface for any one of the plurality of electronic devices 20. For example, the pointing-device-integrated text input device 3000 may operate as an input interface for an electronic device that has the first communication connection established with the pointing-device-integrated text input device 3000 among the plurality of electronic devices 20. When the second electronic device 22 is a notebook in which the pointing-device-integrated text input device 3000 is embedded, the pointing-device-integrated text input device 3000 may operate as an input interface for the second electronic device 22 by default.

In this case, the pointing-device-integrated text input device 3000 acquires a mouse input, a digitizer input, or a keyboard input in the touch mode or the keyboard mode, and transmits the acquired input to the second electronic device 22. The second electronic device may move the pointer P or perform a character input on the screen 10 provided by a display connected to the second electronic device 22 on the basis of data delivered from the pointing-device-integrated text input device 3000. That is, the pointing-device-integrated text input device 3000 functions as an input interface for the second electronic device.

In this case, the pointing-device-integrated text input device 3000 may detect a hovering input.

Figure 74:
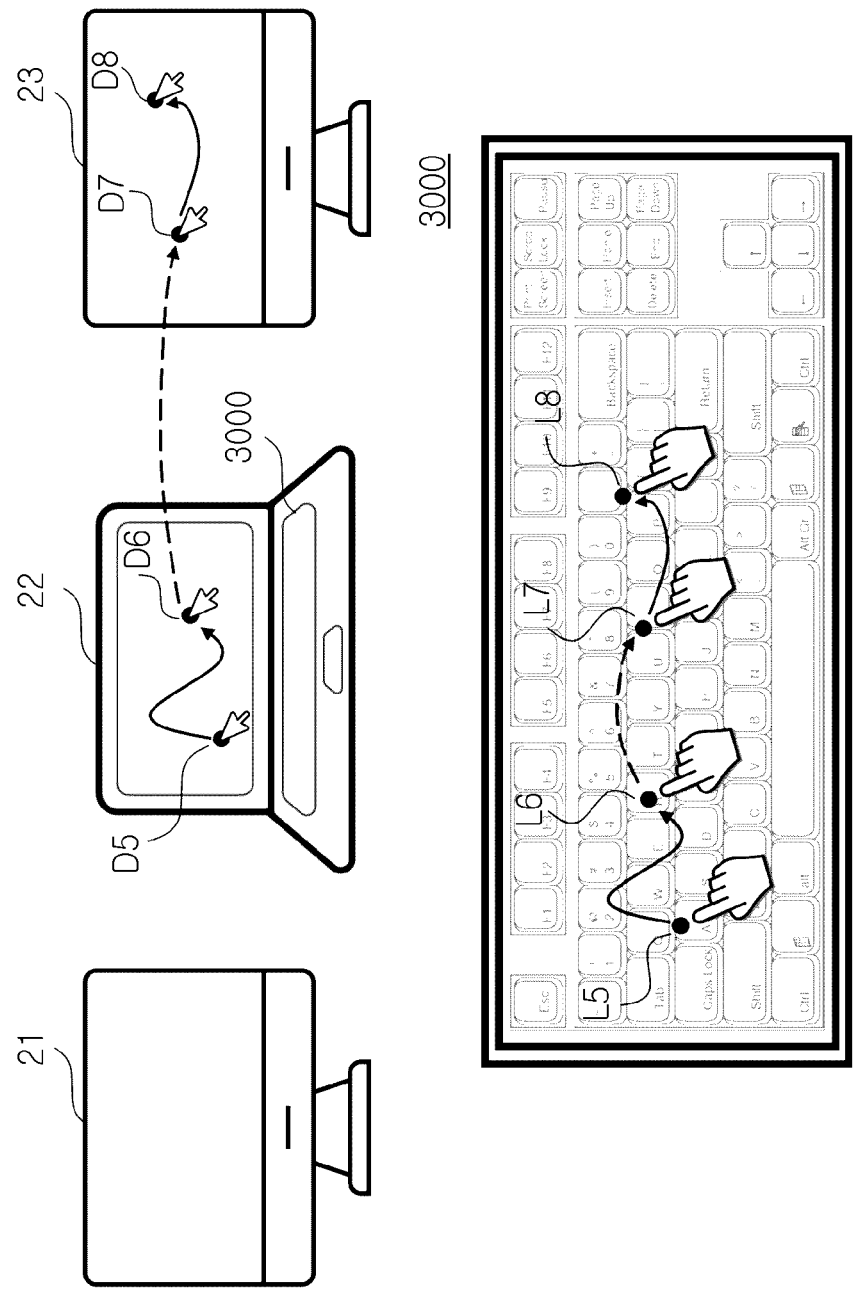
FIG. 74 is a diagram showing an example of selecting a control target device by using a hovering input in the multi-device environment of FIG. 73.

FIG. 74 is a diagram showing an example of selecting a control target device by using a hovering input in the multi-device environment of FIG. 70.

Referring to FIG. 74, the pointing-device-integrated text input device 3000 may input a hovering input in the touch mode. However, recognition of a hovering input in the touch mode may cause inconvenience in a touch operation. Accordingly, when necessary, the pointing-device-integrated text input device 3000 may additionally have a hovering mode and recognize a hovering input after entering the hovering mode.

When the hovering mode is entered, the pointing-device-integrated text input device 3000 receives a hovering input, detects whether the hovering input is received on the basis of a change in capacitance generated in the electrode 3130, and acquires a hovering plane coordinate value (x, y) corresponding to the hovering input. It should be appreciated that a hovering height coordinate value in a z-axis direction may be further acquired.

When the hovering coordinate value is acquired, the pointing-device-integrated text input device 3000 may calculate a position of a virtual 3D pointer P according to the hovering coordinate. While the touch coordinate value of the touch input indicates movement of a pointer P in a screen 10 provided by a display of an electronic device coupled with the pointing-device-integrated text input device 3000, the hovering coordinate value of the hovering input may be used to select the plurality of electronic devices 20 capable of connecting to the pointing-device-integrated text input device 3000.

In detail, referring back to FIG. 74, first, the pointing-device-integrated text input device 3000 operates as an input interface of the second electronic device 22. In this case, a touch input between a seventh touch input L5 and an eighth touch input L6 may be used as an input for controlling a pointer P of the second electronic device 22 to move the pointer of the second electronic device 22 from a seventh position D5 to an eighth position D6 on a screen of a corresponding device.

In this situation, a hovering input may be performed after the eighth touch input L6. The hovering input may be composed of the eighth hovering input L6 and a ninth hovering input L7. The pointing-device-integrated text input device 3000 may sense such a hovering input and move the pointer P from a spatial position corresponding to the eighth position D6 in a 3D space to a spatial position corresponding to the ninth position D7 in a virtual space.

Here, the spatial position corresponding to the eighth position D6 is a position indicating the second electronic device 22, and the spatial position corresponding to the ninth position D7 is a position indicating the third electronic device 23.

When a touch input is generated while the 3D pointer is located at the position indicating the third electronic device 23, the pointing-device-integrated text input device 3000 may change a control device to an electronic device currently indicated by the 3D pointer, that is, the third electronic device 23.

Thus, the pointing-device-integrated text input device 3000 operates as an input interface for the third electronic device 23. Accordingly, a subsequent touch input, that is, a touch input composed of the ninth touch input L7 and a tenth touch input L10, may be used to operate a pointer of the third electronic device 23 and may be used to move the pointer from the ninth position D7 to a tenth position D8 on a screen of the third electronic device 23.

The hovering region 3020 may be divided into a plurality of sub-regions. In this case, the controller 3500 may check the number of nearby electronic devices capable of connecting with the pointing-device-integrated text input device 3000 in a wired/wireless manner, and may divide the hovering region 3020 into as many sub-regions as the number of electronic devices or a maximum number of sub-regions. Also, the sub-regions may correspond to the plurality of electronic devices 20.

Figure 75:
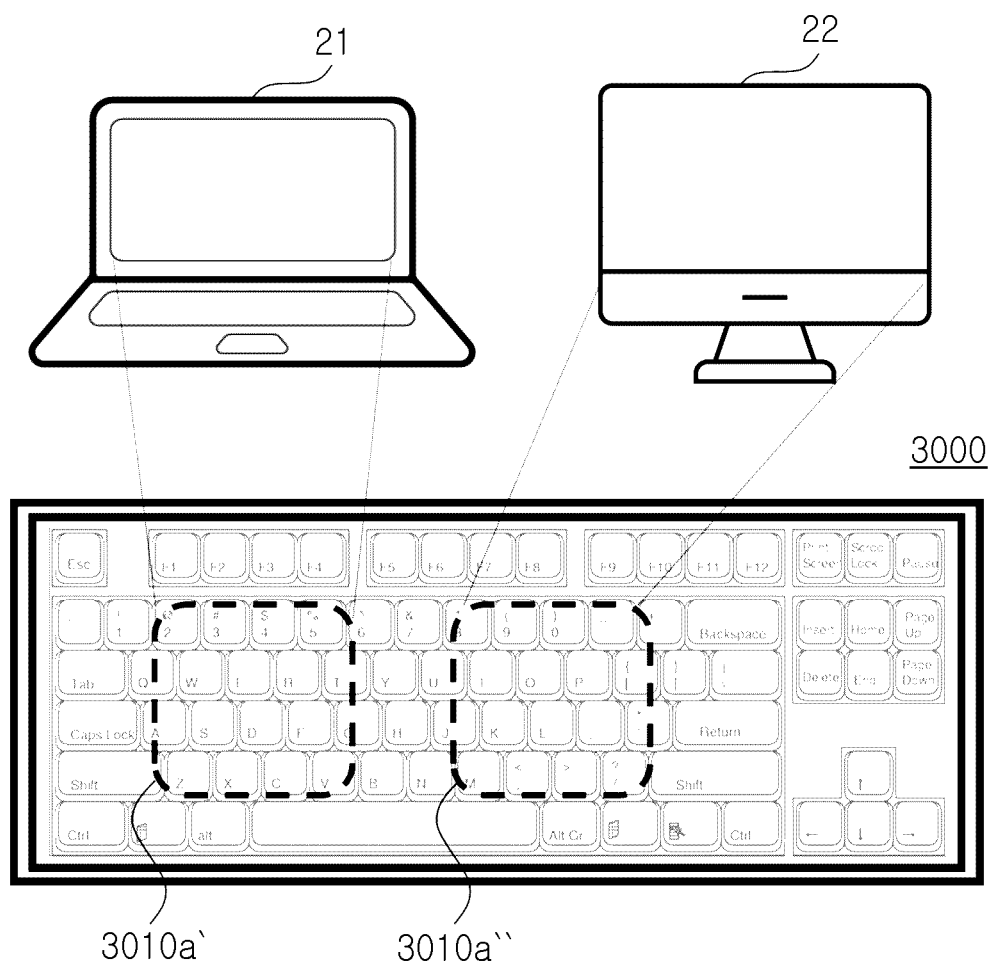
FIG. 75 is a diagram showing another example of selecting a control target device by using a hovering input in the multi-device environment of FIG. 73.

FIG. 75 is a diagram showing another example of selecting a control target device by using a hovering input in the multi-device environment of FIG. 70.

Referring to FIG. 75, as an example, in a multi-device environment with two devices, a hovering region of the pointing-device-integrated text input device 3000 may include a first region 3010*a*' and a second region 3010*a*". Here, the first region 3010*a*' may be a region indicating the first electronic device 21, and the second region 3010*a*" may be a region indicating the second electronic device 22.

When the pointing-device-integrated text input device 3000 enters the hovering mode (or an electronic control device selection mode), the controller 3500 may detect a hovering input and may calculate a hovering coordinate value. When the hovering input moves in the hovering region 3020, the controller 3500 may track the hovering input in real time. When a touch input is generated by bringing a user's body part into contact with a touch region during the hovering input, the electronic device 20 allocated to the hovering region 3020 corresponding to the touch region in which the touch input is generated may be selected as a control target device.

Subsequently, the pointing-device-integrated text input device 3000 operates as an input interface for the electronic device selected as the control target device. That is, when a keyboard input or a touch input is recognized, the pointing-device-integrated text input device 3000 may deliver a corresponding key value, character value, mouse input, or piece of touch information to the control target device.

Additionally, in this description, the pointing-device-integrated text input device 3000 may be connected with an AR device or a VR device to acquire a hovering input for controlling the pointer P' in a 3D space displayed in AR or VR.

Figure 76:
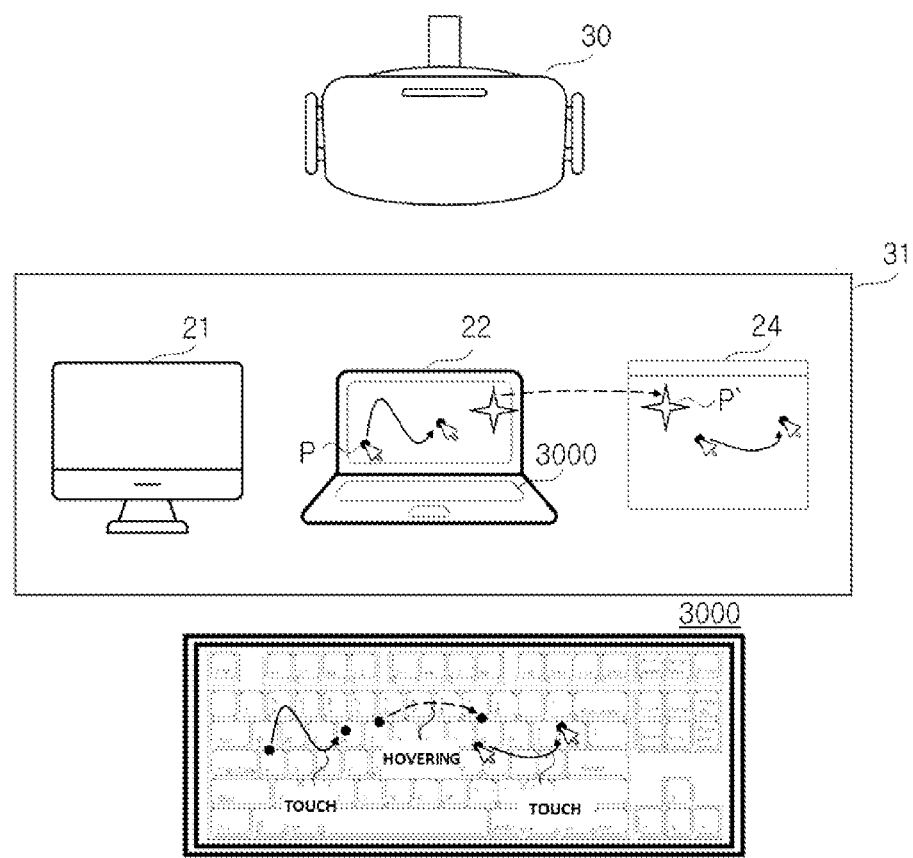
FIG. 76 is a diagram showing still another example of selecting a control target device by using a hovering input in the multi-device environment of FIG. 73.

FIG. 76 is a diagram showing still another example of selecting a control target device by using a hovering input in the multi-device environment of FIG. 70.

In this example, the hovering region 3020 is set in the pointing-device-integrated text input device 3000 and is matched to a 3D space in VR or AR provided by an HMD or the like.

The pointing-device-integrated text input device 3000 may calculate a hovering coordinate value according to a hovering input and may transmit the calculated hovering coordinate value to the HMD or an electronic device that controls the HMD. The electronic device may control a position of the pointer P in the 3D space by using the hovering coordinate value.

Here, when the pointer P is located at a position indicating one of the plurality of electronic devices 20 connectable with the pointing-device-integrated text input device 3000, the pointing-device-integrated text input device 3000 may receive a touch input or a pointer execution command for a touch region. In this case, the pointing-device-integrated text input device 3000 may select the electronic device 20 corresponding to the corresponding position as a control target device and operate as an input device for the control target device.

A VR or AR providing device such as an HMD may provide a virtual graphic object in a virtual space or an augmented space.

In FIG. 76, an AR object 24 may be displayed by the HMD. In this situation, when a touch input is received after a virtual pointer P' is moved to a position at which an AR/VR object is located through a hovering input of the pointing-device-integrated text input device 3000, the pointing-device-integrated text input device 3000 may select the object indicated by the virtual pointer P' as a control target object.

A subsequent touch input or keyboard input may be used to move a cursor or pointer included in the control target object or deliver a keyboard input to the control target object.

Figure 77:
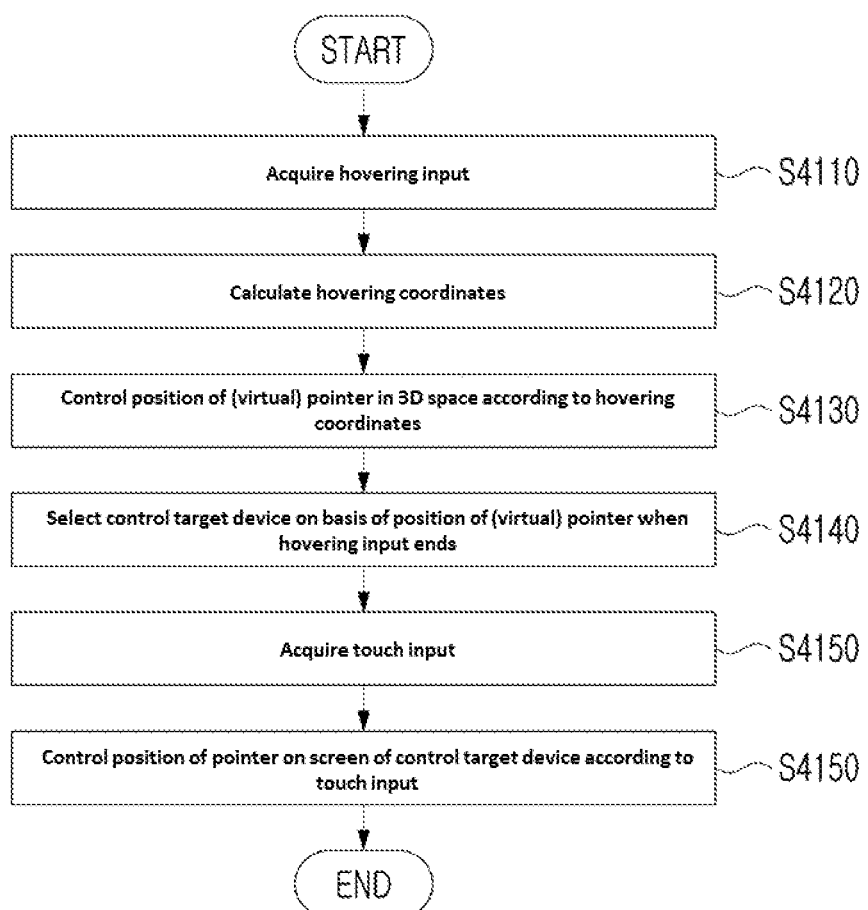
FIG. 77 is a flowchart showing an example in which the pointing-device-integrated text input device controls multiple devices.

FIG. 77 is a flowchart showing an example in which the pointing-device-integrated text input device 3000 controls multiple devices.

Referring to FIG. 77, the method may include acquiring a hovering input (S4110), calculating hovering coordinates (S4120), controlling a position of a virtual pointer in a 3D space according to the hovering coordinates (S4130), selecting a control target device on the basis of the position of the virtual pointer when the hovering input ends (S4140), acquiring a touch input (S4150), and controlling a position of a pointer on a screen of the control target device according to the touch input (S4160).

The above-described steps will be described in detail below.

The pointing-device-integrated text input device 3000 may acquire a hovering input (S4110). In this case, when a change in capacitance of the electrode 3130 is generated by a user input, the controller 3500 may determine whether the user input is a touch input or a hovering input according to the amount of change in capacitance.

When the hovering input is acquired, the pointing-device-integrated text input device 3000 may calculate hovering coordinates (S4120). Among the hovering coordinates, a coordinate value (x, y) may be calculated in a similar way to that of a touch coordinate value. Also, among the hovering coordinates, a z coordinate value may be calculated on the basis of the amount of change in capacitance. However, the z coordinate value among the hovering coordinates is not necessarily calculated.

The pointing-device-integrated text input device 3000 may control a position of a virtual pointer in a 3D space according to the hovering coordinates (S4130). Here, a plurality of devices may be disposed in a virtual space.

The pointing-device-integrated text input device 3000 may select a control target device on the basis of the position of the virtual pointer when the hovering input ends (S4130). Here, the end of the hovering input may refer to a case in which a touch input is generated or a case in which the change in capacitance is a hovering threshold or less because a finger is sufficiently far from the pointing-device-integrated text input device 3000. However, a selection of the control target device determined by a touch input on a UI may be more consistent with the user's intention.

When the hovering input ends, the controller may select a device selected by the virtual pointer as a control target device at a time point at which the hovering input ends. When the control target device is selected, the pointing-device-integrated text input device 3000 may operate as an input interface of the corresponding control target device.

Here, when the hovering input ends while the virtual pointer indicates a VR/AR object, the pointing-device-integrated text input device 3000 may operate an input interface for the corresponding object.

Subsequently, the pointing-device-integrated text input device 3000 may acquire a touch input or a keyboard input (S4140), and thus may control a position of a pointer on a screen of the control target device or perform a text input on the screen (S4150).

The above-described methods according to embodiments of the present invention may be used alone or in combination. Not all of the steps described in the methods according to embodiments of the present invention are necessary, and thus each method may include all or only some of the steps. Also, since the orders in which the steps are described are merely for convenience of description, the steps in the methods described in the present invention do not necessarily have to proceed in the described orders.

The above description is simply for the purpose of illustratively describing the technical spirit of the present invention, and various modifications and changes may be made to the embodiments by those skilled in the art without departing from the essential characteristics of the present invention. Accordingly, the embodiments of the present invention may be implemented separately or in combination.

Accordingly, the embodiments of the present invention are to be considered descriptive and not restrictive of the present invention, and do not limit the scope of the present invention. The scope of the invention should be construed by the appended claims, and the technical sprit within the scope of their equivalents should be construed as included in the scope of the invention.

MODE OF INVENTION

As described above, associated details are provided in the detailed description of the embodiments.

INDUSTRIAL APPLICABILITY

As described above, the present invention may be entirely or partially applied to an electronic device that uses a multi-functional human interface device including a text input device and a pointer location information input device.

The invention claimed is:

1. An electronic device having a multi-functional human interface with a keyboard layout, the electronic device comprising:
   a plurality of buttons configured to: be arranged according to the keyboard layout, receive a vertical push input from a user, and move upward or downward according to the push input;
   a plurality of switches configured to acquire a key input upon a movement of the plurality of buttons;
   a plurality of electrodes configured to form a touch region of which at least part is overlapped with the keyboard layout as viewed from above, and include a first plurality of electrodes forming a drive line, to which a drive signal for inducing a capacitance is applied, by being electrically connected in a first direction, and a second plurality of electrodes forming a scan line, from which a scan signal for detecting a change of the capacitance caused by a touch input is received, by being electrically connected in a second direction,
   a controller configured to:
      acquire a key value allocated to a button corresponding to a switch that acquires the key input,
      acquire a touch coordinate value based on the change of the capacitance corresponding to the touch input,
      output a keyboard signal reflecting the key value upon the push input is received, and
      output a signal for adjusting an attribute value of an adjustment target attribute when the touch input is applied to a specific button to which the adjustment target attribute is allocated,
      wherein the touch input corresponds to a touch movement from a first touch position to a second touch position, and
      wherein the first touch position and the second touch position both are included in the specific button.

2. The electronic device of claim 1, wherein the adjustment target attribute is adjusted based on a distance between the first touch position and the second touch position.

3. The electronic device of claim 1, the controller determines increment or decrement of the attribute value based on a direction from the first touch position to the second touch position.

4. The electronic device of claim 1, the controller further configures to operate as at least one of a keyboard mode and a touch mode, output the keyboard signal while the keyboard mode is activated and output the signal while the touch mode is activated.

5. The electronic device of claim 4, the electronic device further comprises a mode switching unit;

wherein the mode switching unit activates at least one of the keyboard mode and the touch mode upon at least one of predetermined conditions.

6. The electronic device of claim 4, the controller further operates as an attribute adjustment mode,
wherein the attribute adjustment mode is activated upon the touch input is received, in the keyboard mode, at a function button to which a function key value is allocated.

7. The electronic device of claim 6, the electronic device further comprises a mode switching unit;
wherein the mode switching unit activates at least one of the keyboard mode and the touch mode upon at least one of predetermined conditions.

8. The electronic device of claim 1, wherein a function key value is allocated to the specific button.

9. The electronic device of claim 1, wherein the plurality of buttons include at least one specific button which is used to adjust a specific attribute value when the touch input is received thereto.

10. The electronic device of claim 1, wherein the adjustment target attribute includes a color space attribute related to an adjustment of color values.

11. The electronic device of claim 1, wherein the adjustment target attribute includes a volume attribute related to a sound volume of audio, and
wherein the signal is used to increase or decrease an attribute value of the volume attribute.

12. The electronic device of claim 1, wherein the adjustment target attribute includes a playback attribute related to a play time of a media player, and
wherein the signal is used to move the play time of the playback attribute of the media player.

13. The electronic device of claim 1, wherein the touch region includes a specific region for adjusting a specific attribute value of a specific adjustment target attribute,
wherein the specific region is implemented by at least one specific button to which a function key is allocated.

14. The electronic device of claim 1, the controller generates the signal based on the touch coordinate value corresponding to the touch input at the specific button,
wherein the signal instructs a change of the attribute value according to a change of the touch coordinate value and a direction of change thereof on the specific button.

15. The electronic device of claim 1, wherein the controller generates the signal based on a touch coordinate value during a current scan period and a touch coordinate value during a previous scan period.

16. The electronic device of claim 1, wherein the controller sets a touch region for adjusting the adjustment target attribute corresponding to a range of an attribute value of the adjustment target attribute.

17. The electronic device of claim 1, wherein the controller generates the signal such that the touch coordinate value and a current attribute value of the adjustment target attribute correspond each other.

18. A control method of an electronic device having a multi-functional human interface with a keyboard layout, wherein the electronic device includes:
a plurality of buttons configured to be arranged according to the keyboard layout, receive a vertical push input from a user, and move upward or downward according to the push input;
a plurality of switches configured to acquire a key input upon a movement of the plurality of buttons;
a plurality of electrodes configured to: form a touch region of which at least part is overlapped with the keyboard layout as viewed from above, and include a first plurality of electrodes forming a drive line, to which a drive signal for inducing a capacitance is applied, by being electrically connected in a first direction, and a second plurality of electrodes forming a scan line, from which a scan signal for detecting a change of the capacitance caused by a touch input is received, by being electrically connected in a second direction,
a controller configured to acquire a key value allocated to a button corresponding to a switch that acquires the key input and acquire a touch coordinate value based on the change in the capacitance,
the control method comprising:
entering at least one of a keyboard mode and a touch mode,
outputting a keyboard signal reflecting the key value upon the push input is received, and
outputting a signal for adjusting an attribute value of an adjustment target attribute when the touch input is applied to a specific button to which the adjustment target attribute is allocated,
wherein the touch input corresponds to a touch movement from a first touch position to a second touch position, and
wherein the first touch position and the second touch position both are included in the specific button.

19. An electronic device having a multi-functional human interface with a keyboard layout, the electronic device comprising:
a plurality of buttons configured to: be arranged according to the keyboard layout, receive a vertical push input from a user, and move upward or downward according to the push input;
a plurality of switches configured to acquire a key input upon a movement of the plurality of buttons;
a plurality of electrodes configured to form a touch region of which at least part is overlapped with the keyboard layout as viewed from above, and include a first plurality of electrodes forming a drive line, to which a drive signal for inducing a capacitance is applied, by being electrically connected in a first direction, and a second plurality of electrodes forming a scan line, from which a scan signal for detecting a change of the capacitance caused by a touch input is received, by being electrically connected in a second direction; and
a controller configured to:
acquire a key value allocated to a button corresponding to a switch that acquires the key input,
acquire a touch coordinate value based on the change in the capacitance corresponding to the touch input,
output a keyboard signal reflecting a key value corresponding to the push input,
output a first signal for controlling a position of a pointer according to the touch coordinate value, and
output a second signal indicating an attribute value of an adjustment target attribute is adjusted if a specific key input relative to a specific button having a specific key value to which the adjustment target attribute is allocated is acquired.

20. The electronic device of claim 19, the controller operates at least one of a keyboard mode and a touch mode,
wherein the controller outputs the keyboard signal while the keyboard mode is activated and outputs the first signal while the touch mode is activated.

21. The electronic device of claim 20, wherein the touch mode includes an attribute adjustment mode, wherein the attribute adjustment mode is activated upon the push input is received, in the touch mode, at the specific button to which the specific key value is allocated, and wherein the controller outputs the second signal while the attribute adjustment mode is activated.

22. The electronic device of claim 19, the controller outputs a signal for instructing the adjustment target attribute to be activated when the push input is received at the specific button, wherein the activation of the adjustment target attribute includes displaying a graphic object for adjusting the adjustment target attribute.

23. The electronic device of claim 19, the controller generates the second signal based on only one of a vertical value and a horizontal value of the touch coordinate value when the adjustment target attribute has a one-dimensional attribute value.

24. The electronic device of claim 19, the controller generates the second signal according to a touch coordinate value acquired while the touch input is maintained in addition to the push input to the specific button.

25. The electronic device of claim 19, the controller generates the second signal for indicating any one of an increase and a decrease in the attribute value when the touch input detected at the specific button is in a counter-clockwise direction, and generate the second signal for indicating the other of the increase and decrease in the attribute value when the touch input detected at the specific button is in a clockwise direction.

26. A control method of an electronic device having a multi-functional human interface with a keyboard layout, wherein the electronic device includes:

a plurality of buttons configured to: be arranged according to the keyboard layout, receive a vertical push input from a user, and move upward or downward according to the push input;

a plurality of switches configured to acquire a key input upon a movement of the plurality of buttons;

a plurality of electrodes configured to: form a touch region of which at least part is overlapped with the keyboard layout as viewed from above, and include a first plurality of electrodes forming a drive line, to which a drive signal for inducing a capacitance is applied, by being electrically connected in a first direction, and a second plurality of electrodes forming a scan line, from which a scan signal for detecting a change of the capacitance caused by a touch input is received, by being electrically connected in a second direction, a controller configured to acquire a key value allocated to a button corresponding to a switch that acquires the key input and acquire a touch coordinate value based on the change in the capacitance, the control method comprising:

entering at least one of a keyboard mode and a touch mode, outputting a keyboard signal reflecting the key value upon the push input is received, outputting a first signal for controlling a position of a pointer according to the touch coordinate value, and outputting a second signal indicating an attribute value of an adjustment target attribute is adjusted if a specific key input relative to a specific button having a specific key value to which the adjustment target attribute is allocated is acquired.

* * * * *